United States Patent [19]

Hara et al.

[11] 4,086,209
[45] Apr. 25, 1978

[54] NOVEL NITROGEN-CONTAINING AROMATIC POLYMERS AND PROCESS FOR THEIR PREPARATION

[75] Inventors: Shigeyoshi Hara, Hino; Masao Senoo, Ehime; Koh Mori; Yutaka Taketani, both of Hino, all of Japan

[73] Assignee: Teijin Limited, Osaka, Japan

[21] Appl. No.: 551,311

[22] Filed: Feb. 20, 1975

[30] Foreign Application Priority Data

| Feb. 21, 1974 | Japan | 49-19883 |
| May 17, 1974 | Japan | 49-55148 |
| May 20, 1974 | Japan | 49-55627 |
| May 23, 1974 | Japan | 49-57292 |
| May 24, 1974 | Japan | 49-57792 |

[51] Int. Cl.$^2$ .............................................. C08G 65/34
[52] U.S. Cl. ..................... 260/49; 260/63 N; 260/50; 260/79.3 R
[58] Field of Search ................. 260/49, 50, 63, 79.3

[56] References Cited
U.S. PATENT DOCUMENTS

| 3,245,947 | 4/1966 | Hanson et al. | 260/49 |
| 3,745,141 | 7/1973 | Bonnard et al. | 260/49 |
| 3,746,684 | 7/1973 | Adachi et al. | 260/49 |
| 3,859,252 | 1/1975 | Cho | 260/49 |

FOREIGN PATENT DOCUMENTS 1,923,575  11/1969  Germany.

*Primary Examiner*—V. P. Hoke
*Attorney, Agent, or Firm*—Sherman & Shalloway

[57] ABSTRACT

Novel substantially linear, or at least partially cross-linked, nitrogen-containing polymers having an aryleneimine or arylenether unit in the main chain with an amino group or a group derived from it being bonded as a pendant group to a nuclear carbon atom of the arylene group of the above unit. According to the number and type of the pendant groups, the polymers can have various useful properties such as thermal stability, hydrophilicity, oxidative reducibility, photosensitivity, color formability or the ability to form coordination bonds. Furthermore, the polymers have good solubility in aprotic polar organic solvents. Permselective membranes having good performance can be prepared from solutions of the polymers in these solvents.

23 Claims, No Drawings

NOVEL NITROGEN-CONTAINING AROMATIC POLYMERS AND PROCESS FOR THEIR PREPARATION

This invention relates to novel substantially linear or at least partially cross-linked nitrogen-containing aromatic polymers and a process for preparing such polymers. More specifically, the invention relates to novel substantially linear or at least partially cross-linked nitrogen-containing aromatic polymers having an aryleneimine or arylenether unit in the main chain with an amino group or a group derived from it being bonded as a pendant group to a nuclear carbon atom of the arylene group of the above unit, and to a process for preparing such polymers.

An object of this invention is to provide novel reactive or functional nitrogen-containing polymers having an arylenimine or arylenether unit in the main chain, and a process for preparing such polymers.

Another object of this invention is to provide at least partially cross-linked nitrogen-containing aromatic polymers derived from the above reactive nitrogen-containing polymers, and a process for preparing such polymers.

Still another object of this invention is to provide novel polymers having various functionalities and reactivities such as thermal stability, hydrophilicity, oxidative-reducibility, photosensitivity, color formability, the ability to form coordination bonds or ion dissociability, which are rigid because of having an aryleneimine or arylenether unit in the main chain and are well soluble in solvents because an amino group or a group derived from it is bonded as a pendant group to a nuclear carbon atom of the aromatic ring in the main chain.

According to this invention, there is provided a substantially linear nitrogen-containing aromatic polymer comprising at least 40 mol%, based on its entire recurring units, of at least one recurring unit of the following formula

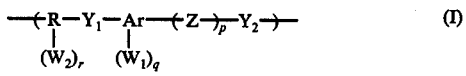
(I)

wherein Z is $-SO_2-$ or $-CO-$; $p$ is 0 or 1, and when $p$ is 0, $-Ar-$ is directly bonded to $-Y_2-$; Ar is an aromatic group having a valence of $(2 + q)$ with $Y_1$ and $+Z)_p Y_2$ being bonded respectively to the nuclear carbon atoms of the aromatic ring Ar; $q$ is an integer of 0 to 4; $r$ is an integer of 0 to 4, with the proviso that an average of $(q + r)$ is at least 0.2; $Y_1$ and $Y_2$ are identical or different and represent $-O-$ or

R' being a hydrogen atom or a monovalent or divalent hydrocarbon residue, preferably a hydrogen atom or an aliphatic hydrocarbon residue containing 1 to 6 carbon atoms and when R' is divalent, it is optionally bonded to R, or R' of $Y_1$ may be linked to R' of $Y_2$; R is an organic group having a valence of at least $(2 + r)$ and capable of having a valence of $(3 + r)$ or $(4 + r)$ according to the definition of R'; and $W_1$ and $W_2$ are identical or different, and represents at least one group selected from a primary amino group and mono- or di-substituted nitrogen-containing groups derived from it. Preferred species of $W_1$ and $W_2$ are selected from the following:

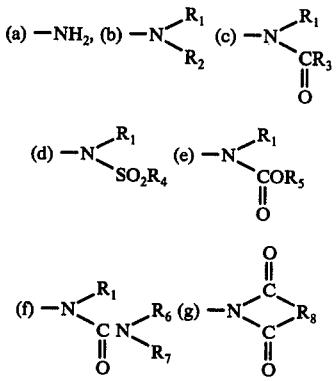

In the above formulae, $R_1$, $R_3$, $R_6$ and $R_7$ are identical or different and represent a hydrogen atom or an organic group containing 1 to 20 carbon atoms which in principle has a valence of 1; $R_2$ and $R_5$ represent an organic group containing 1 to 20 carbon atoms which in principle has a valence of 1; $R_4$ represents a hydroxyl group or an organic group containing 1 to 20 carbon atoms which in principle has a valence of 1; $R_8$ is a divalent organic group containing 1 to 20 carbon atoms; and $R_1$ and $R_2$, $R_1$ and $R_3$, $R_1$ and $R_4$, $R_1$ and $R_5$, $R_1$ and $R_6$, $R_6$ and $R_7$, respectively, can be bonded to each other directly or through a hetero atom.

Preferred species of the nitrogen-containing aromatic polymer comprise those having the recurring unit expressed by formula (I) above which $-Ar-$ is represented by the following formula

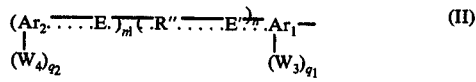
(II)

wherein $Ar_1$ is an aromatic ring group containing 6 to 20 carbon atoms and having a valence of $(q_1 + 2)$ or $(q_1 + 3)$; $Ar_2$ is an aromatic ring group containing 6 to 20 carbon atoms and having a valence of $(q_2 + 2)$ or $(q_2 + 3)$; $W_3$ and $W_4$ are identical or different and the same as defined with respect to formula (I); $q_1$ is an integer of 0 to 4; $q_2$ is an integer of 0 to 4, with the proviso that an average of $(q_1 + q_2 + r)$ is at least 0.2; $m$ and $n$ are 0 or 1, and when $m$ is 0, $n$ is also 0; the symbol ... represents the presence or absence of a bond; E and E' are identical or different and represent at least one non-aromatic bridging group selected

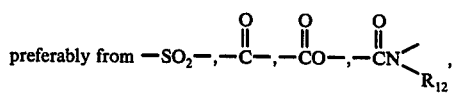

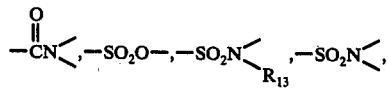

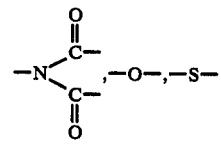

and alkylene groups containing 1 to 6 carbon atoms, $R_{12}$ and $R_{13}$ being identical or different and representing a hydrogen atom or an organic group containing 1 to 6 carbon atoms; and R" represents an organic group containing 2 to 30 carbon atoms and having a valence of 2 to 4 or two divalent alkylene groups,
and —R— represents an organic group containing 2 to 50 carbon atoms.

The invention also provides an at least partially cross-linked nitrogen-containing aromatic polymer comprising at least 40mol%, based on its entire recurring units, of a recurring unit of the formula

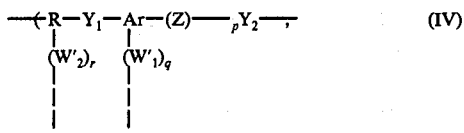  (IV)

where Z represents —$SO_2$— or —CO—; $p$ is 0 or 1, and when $p$ is 0, —Ar— is directly bonded to $Y_2$; Ar is an aromatic group having a valence of $(2 + q)$ with $Y_1$ and $+Z+_p Y$ being respectively bonded to the nuclear carbon atoms of the aromatic ring Ar; $q$ is an integer of 0 to 4 and $r$ is an integer of 0 to 4 with the proviso that an average of $(q + r)$ is at least 0.2; $R_1$ and $Y_2$ are identical or different, and represent —O— or

R' being a hydrogen atom or a monovalent or divalent hydrocarbon residue, preferably a hydrogen atom or an aliphatic hydrocarbon residue containing 1 to 6 carbon atoms, and when R' is divalent, it can be bonded to R, or R' of $Y_1$ can be bonded to R' of $Y_2$; R is an organic group having a valence of at least $(2 + r)$ and capable of having a valence of $(3 + r)$ or $(4 + r)$ according to the definition of R'; and $W'_1$ and $W'_2$ are identical or different and represent at least one group selected from

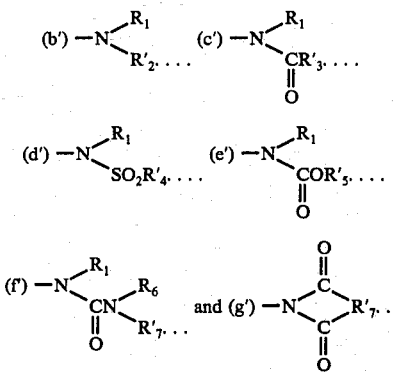

in which the symbol . . . represents the presence or absence of a bond; $R_1$ and $R_6$ are identical or different and represent an organic group containing 1 to 20 carbon atoms which in principle has a valence of 1, and $R_1$ and $R'_2$, $R_1$ and $R'_3$, $R_1$ and $R'_4$, $R_1$ and $R'_5$, $R_1$ and $R'_7$, or $R_6$ and $R'_7$ respectively can be bonded to each other directly or through a hetero atom; $R'_2$, $R'_3$, $R'_4$, $R'_5$ and $R'_7$ are identical or different groups, at least a part of each said group is an organic group having a valence of at least 2, and at least a part of $R'_8$ is an organic group having a valence of at least 3, and such groups respectively form an intermolecular bridging group bonded to $W'_1$ and $W'_2$ of another molecule through a bond represented by the symbol . . . , and when these groups do not form intermolecular bridging groups, $R'_2$, $R'_3$ and $R'_7$ represent a hydrogen atom or a monovalent organic group containing 1 to 20 carbon atoms, $R'_4$ and $R'_5$ represent a monovalent organic group containing 1 to 20 carbon atoms, and $R'_8$ is a divalent organic group containing 1 to 20 carbon atoms.

The processes for preparing the substantially linear or at least partially cross-linked nitrogen-containing aromatic polymers of this invention are described below.

[I-1] Process for preparing the polymers of this invention having a primary amino group as a pendant group:

The nitrogen-containing aromatic polymer having a recurring unit of formula (I) can be prepared advantageously, for example, by the following method.

A substantially linear primary amino-containing aromatic polymer comprising at least 40 mol%, based on its entire recurring unit, of a recurring unit of the formula

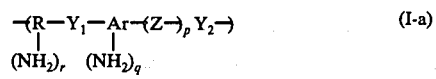  (I-a)

wherein R, $Y_1$, Ar, Z, $p$ and $Y_2$ are the same as defined in formula (I); $q$ and $r$ are identical or different and represent an integer of 0 to 4, $q$ is not more than $q'$ and $r$ is not more than $r'$, an average of $(q + r)$ is at least 0.2, preferably at least 0.5, and when $q$ is less than $q'$ or $r$ is less than $r'$, Ar and/or R can contain a nitro group corresponding to $(q' - q)$ and/or $(r' - r)$,
is prepared by reducing a substantially linear nitro-containing aromatic polymer comprising at least 40 mol %, based on its entire recurring units, of at least one recurring unit of the formula

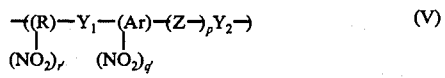  (V)

wherein Z is —$SO_2$— or —CO—; $p$ is 0 or 1, and when $p$ is 0, —Ar— is directly bonded to —$Y_2$—, (Ar) is an aromatic group having a valence of $(q' + 2)$ with $Y_1$ and $+Z+_p Y_2$ being bonded respectively to the nuclear carbon atoms of the aromatic ring Ar; $q'$ is an integer of 0 to 4 and $r'$ is an integer of 0 to 4, and an average of $(q' + r')$ is at least 0.2, preferably at least 0.5; $Y_1$ and $Y_2$ are identical or different, and represent —O— or

in which R' is a hydrogen atom or a monovalent or divalent hydrocarbon residue, and when R' is divalent, it can be bonded to R, or R' of $Y_1$ can be bonded to R' of $Y_2$; and (R) is an organic group having a valence of at least $(2 + r')$ and capable of having a valence of $(3 + r')$ or $(4 + r')$ according to the definition of R'.

A primary amino-containing aromatic polymer comprising at least 40 mol%, based on its entire recurring unit, of the recurring unit of formula (I-a) can be prepared from a polymer of formula (V) in which the nitro group is replaced by, for example, (i) —$CONH_2$, (ii)

—CONHNH$_2$ or (iii) —Cl. For example, the amino-containing polymer can be prepared by reacting the polymer (i) with HClO (Hoffmann decomposition), the polymer (ii) with NHO$_2$ (Curtius rearrangement reaction), and the polymer (iii) with ammonia.

Most advantageously, however, the primary amino-containing polymer (I-a) is prepared from the nitro-group containing polymer (V).

The nitro-containing polymer (V) can be prepared by nitrating a polyarylene ether such as poly-2,6-dimethylphenyl ether or polyphenylene ether sulfone with, for example, nitric acid in accordance with a known method.

Preferably, however, the nitro-containing aromatic polymer (V) is prepared, for example, by reacting an aromatic dihalogen compound of the formula

wherein $X_1$ and $X_2$ are identical or different halogen atoms; Z is —SO$_2$— or —CO—; $p$ is 0 or 1, and when $p$ is 0, —Ar— is directly bonded to $X_2$; $q'$ is an integer of 0 to 4; (Ar) is an aromatic group having a valence of $(2 + q')$ and not containing a primary or secondary amino group, a hydroxyl group or a group substantially reactive with said amino and hydroxyl groups; $X_1$ and —Z)$_p$X$_2$ are bonded respectively to the nuclear carbon atoms of the aromatic ring Ar; and a nitro group is bonded to the nuclear carbon atom of the aromatic ring Ar so that an average of $(q' + r')$ becomes at least 0.2, preferably at least 0.5,
with a difunctional compound of the formula

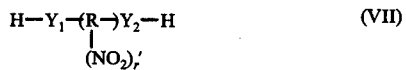

wherein $Y_1$ and $Y_2$ are identical or different and represent

or —O— in which R' is a hydrogen atom or a monovalent or divalent hydrocarbon residue, and when one or both of R' bonded to $Y_1$ and $Y_2$ are divalent hydrocarbon residues, R' can be bonded to group (R) or bonded to each other directly, and when $Y_1$ and/or $Y_2$ represent —O—, $Y_1$ and/or $Y_2$ are bonded to the nuclear carbon atoms of an aromatic ring R to be defined below, and therefore, in this case, —OH is a phenolic hydroxyl group; $r'$ is an integer of 0 to 4, and an average of $(q' + r')$ is at least 0.2, preferably at least 0.5; and (R) is an organic group capable of having a valence of $(2 + r')$, $(3 + r')$ or $(4 + r')$ according to the definition of R' above,
in an inert organic solvent in the presence of an acid acceptor.

If $p$ is 0 in formula (VI), the following types of nitro-containing aromatic polymers are obtained depending upon $Y_1$ and $Y_2$ in formula (VII).

i. When both of $Y_1$ and $Y_2$ are

(R' of $Y_1$ being identical to, or different from, R' of $Y_2$; the same will be true hereinbelow), at least 40 mol % of the entire recurring units constituting the main chain of the nitro-containing polymer (V) is composed of an arylenimine unit.

ii. When either one of $Y_1$ and $Y_2$ is

and the other is —O—, at least 40 mol% of the entire recurring units constituting the main chain of the nitro-containing polymer (V) is composed of an arylenimine-ether unit.

iii. When both of $Y_1$ and $Y_2$ are —O—, at least 40 mol% of the entire recurring units constituting the main chain of the nitro-containing polymer (V) is composed of an arylenether unit.

When a difunctional copolymer component of the following formula (VIII) is used in the reaction of the aromatic dihalogen compound (VI) with the difunctional compound (VII), nitro-containing aromatic polymers (V-a) can be obtained.

wherein B' represents an organic group containing 2 to 30 carbon atoms and having a valence of 2 to 4 or two divalent alkylene groups; the symbol .... represents the presence or absence of a bond; L$_1$ and L$_2$ are identical or different and represent at least one member selected from the group consisting of

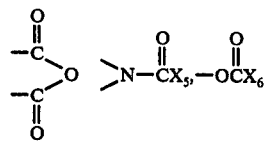

in which $X_3$, $X_4$ and $X_5$ are identical or different halogen atoms, —N═C═O, >NH, —NH$_2$ salts (organic or inorganic strong acid salts such as HCl or H$_2$SO$_4$ salts), and —OH.

When the difunctional copolymer component (VIII) is a diamine salt, aminophenol or bisphenol, it is included within the difunctional compound of formula (VII). Hence, they are not included within the scope of the copolymer component (VIII).

Especially preferably, both of L$_1$ and L$_2$ represent

in the above formula (VIII).

Preferred species of B' are the same as those of R given above.

When both of L$_1$ and L$_2$ are

the difunctional copolymer component (VIII) reacts with the difunctional compound (VII) and introduced into the main chain of the nitro-containing polymer as a copolymer component.

When $L_1$ and $L_2$ in formula (VIII) are other than

the compound (VIII) reacts with the difunctional compound (VII) and/or the aromatic halogen compound (VI) and introduced into the main chain of the nitro-containing aromatic polymer as a copolymer component. When either one of $L_1$ or $L_2$ is

and the other is >NH, —NH$_2$ salt or —OH, the difunctional copolymer component (VIII) itself self-condenses and also reacts with the difunctional compound (VII) and/or the aromatic dihalogen compound (VI) and thus is introduced into the main chain of the nitro-containing aromatic polymer.

It is not necessary at all for the group B in the general formula (VIII) represents the difunctional copolymer component to contain a nitro group, but it can contain a nitro group as a pendant group.

By causing the difunctional copolymer component (VIII) to participate in the reaction between the aromatic dihalogen compound (VI) and the difunctional compound (VII), a nitro-containing aromatic copolymer [to be referred to as (V-a)] can be formed which comprises (1) at least 40 mol%, based on its entire recurring units, of a recurring unit of the following formula

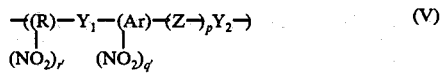

wherein (R), $Y_1$, (Ar), Z, $p$, $Y_2$, $q'$ and $r'$ are the same as defined hereinabove.

and (2) the remainder being a recurring unit of the following formula

     (III)

wherein B and R''' are identical or different and represent the same groups as does (R) in formula (V), and also B and R''' may be identical to or different from R; and $Q_1$ and $Q_2$ are identical or different and selected from the group consisting of

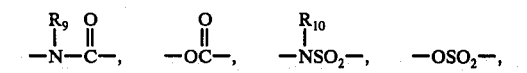

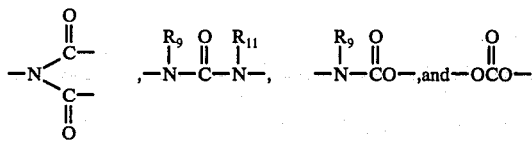

in which $R_9$, $R_{10}$ and $R_{11}$ are identical or different, and represent a hydrogen atom, a monovalent or divalent hydrocarbon residue or a mere bond, and when these groups represent a divalent hydrocarbon residue or a bond, they can be bonded to R''' or B, or can be directly bonded to each other.

Of the above nitro-containing polymers (V) or (V-a), those which are substantially linear have good solubility in solvents, and are advantageous for converting at least a part, preferably substantially all, of the nitro groups in the polymers to amino groups by reduction. However, the nitro-containing polymers or copolymers (V) or (V-a) are not necessarily linear, but may, for example, be those which have been partially cross-linked to an extent such that they are gelled in solvents. By reducing such partially cross-linked nitro-containing polymers in the gelled state, the nitro groups can be converted at least partially to amino groups. These partially cross-linked nitro-containing polymers or copolymers (V) or (V-a) can be easily prepared, for example, by replacing a part of the difunctional compound of formula (VII) and/or the copolymer component of formula (VIII) by a trifunctional or higher compound, and causing such compounds to participate in the polymerization reaction.

The details of the nitro-containing polymers or copolymers (V) or (V-a) and processes for preparing them are disclosed in the specification of our co-pending Patent Application Ser. No. 550,738 filed Feb. 18, 1975 claiming Convention priority from Japanese Pat. Application No. 19373/1974 filed on Feb. 20, 1974, and reference may be had to them.

Briefly, the processes for preparing the nitro-containing polymers (V) or (V-a) are described below.

The aromatic dihalogen compound (VI) and the difunctional compound (VII) or further the above copolymer component (VIII) are reacted in an inert organic solvent, preferably an aprotic organic polar solvent such as N-methyl pyrrolidone, dimethyl sulfoxide or tetramethylene sulfone in the presence of an acid acceptor preferably such as sodium carbonate, lithium carbonate, calcium carbonate or triethylamine at a temperature of 0° to 170° C. to the desired degree of polymerization, the molar ratio of the recurring unit of formula (V) derived from the compounds of formulae (VI) and (VII) being adjusted to the desired value.

Preparation of the amino-containing polymers (I) or (I-a) by reducing the nitro-containing polymers (V) or (V-a) to convert the nitro groups to amino groups can usually be performed also in accordance with any method by which nitro groups can be converted to amino groups, except that consideration must be given to the fact that the reactant is a polymer. For example, a method using a chemical reducing agent and a method utilizing catalytic hydrogenation are preferred.

The method using a chemical reducing agent involves the use of, for example, a combination of a metal such as iron, zinc or tin, a metalic salt with low valence, and an acid such as hydrochloric acid or an alkali, or only a sulfur compound such as sodium hydrosulfite or sodium sulfide.

Since it is a polymer that is reduced, it is preferred to carry out the reducing reaction in the presence of a solvent for the polymer even when the reducing agent is used, or to carry out the reaction using a strong reducing agent which enables the reduction to proceed even in a heterogeneous system. Examples of suitable solvents used for this purpose are N,N-disubstituted amide-type solvents, such as N-methyl pyrrolidone or dimethyl acetamide, which are inert under the reducing conditions. The reaction may proceed conveniently in the presence of water depending upon the type of the reducing agent. Suitable strong reducing agents which enable the reduction of nitro groups to proceed even in a heterogeneous system include, for example, sodium hydrosulfite. If reducing agents having not so strong reducing ability, such as lithium aluminum hydride or sodium borohydride, are used not only the nitro groups but also the arylenether bond, arylenimine bond, and aromatic nucleus may possibly be hydrogenated, and therefore, a special care is required in such a case. Accordingly, this method is used only in a very special case.

The catalytic hydrogenation is carried out in the presence of various hydrogenation catalysts usually employed to convert nitro groups to amino groups, for example, a noble metal catalyst such as platinum, a nickel catalyst, a cobalt catalyst or a copper catalyst. Preferably, the polymer is used in the reducing reaction as a uniform solution in an inert aprotic polar solvent such as N-methyl pyrrolidone or dimethyl acetamide of a heterogeneous system such as a suspension.

The advance of the reducing reaction can be ascertained by measuring the infrared absorption spectrum or the ultraviolet absorption spectrum of the polymer. If the reducing reaction is carried out under severe conditions, it is likely to cause the cleavage of the main chain; and therefore, it is not preferred.

By reducing the nitro-containing polymer (V) containing at least 40 mol%, based on the entire recurring units, of the recurring unit of formula (V) in accordance with the procedure described above for example, the amino-containing aromatic polymers of this invention containing at least 40 mol%, based on the entire recurring units, of the recurring unit of formula (I-a) can be formed.

Furthermore, by reducing the nitro-containing aromatic polymers (V-a) in a similar manner, the amino-containing aromatic copolymers can be prepared which comprises (1) at least 40 mol%, based on the entire recurring units, of the recurring unit of formula (I-a) and (2) the remainder being the recurring unit of formula (III).

As previously stated, nitro groups can be substituted as pendant groups at the group B and/or R''' of the recurring unit (III), and needless to say, in such a case, the above reducing reaction results in the reduction of at least a part, preferably substantially all, of the nitro groups to primary amino groups to form the above copolymers.

R, R' and Ar in formulae (I), (I-a) and (IV), $Ar_1$, $Ar_2$ and R'' in formula (II), (R), (Ar) and R' in formulae (V) and (VII), B' in formula (VIII), and B and R''' in formula (IIII) all may have substituents other than $W_1$, $W_2$, $W'_1$, $W'_2$ and nitro group, such as a lower alkyl group, a lower alkoxy group, a cyano group, a carboxyl group or a sulfonic acid group, which do not impede the formation of the polymer.

The definition of formula (I-a), that an average of $(q + r)$ is at least 0.2" means that if at least one of $q$ and $r$ in at least one of average five recurring units of formula (I-a) is at least 1, the other of $q$ or $r$ in the above unit and $q$ and $r$ in the other average four recurring units may be zero.

In the preferred amino-containing aromatic polymers of this invention, an average of $(q + r)$ in formula (I-a) is at least 0.5. This shows that at least one primary amino group is bonded to either one of group Ar or group R in at least one of average two recurring units of formula (I-a).

The average of $(q' + r')$ in formulae (V) and (V-a) above has the same significance as above.

Preferred species of the primary amino-containing polymers of this invention are those of formula (I-a) in which

is expressed by the following formula

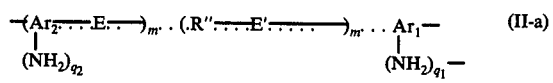

wherein $Ar_1$ is an aromatic ring group containing 6 to 20 carbon atoms having a valence of $(q_1 + 2)$ or $(q_1 + 3)$; $Ar_2$ is an aromatic ring group having a valence of $(q_2 + 2)$ or $(q_2 + 3)$; $Ar_1$ may be identical to, or different from, $Ar_2$; $q_1$ is an integer of 0 to 4 and $q_2$ is an integer of 0 to 4, and an average of $(q_1 + q_2 + r)$ is at least 0.2; $m$ and $n$ are 0 or 1, and when $m$ is 0, $n$ is also 0; the symbol . . . . represents the presence or absence of a bond; E and E' are identical or different and represents a non-aromatic bridging group, preferably at least one bridging group selected from the group consisting of —SO₂—,

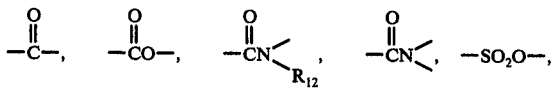

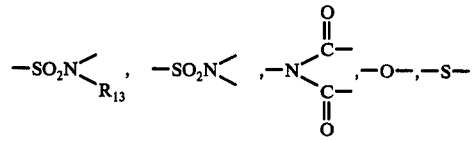

and alkylene groups containing 1 to 6 carbon atoms, $R_{12}$ and $R_{13}$ being identical or different and representing a hydrogen atom or an organic group containing 1 to 6 carbon atoms; and R'' represent an organic group having a valence of 2 to 4 and containing 2 to 30 carbon atoms or two divalent alkylene groups, and —R— is an organic group containing 2 to 50 carbon atoms.

It will be clear from the above description that such suitable primary amino-containing aromatic polymers of this invention are prepared by reducing nitro-containing polymers comprising at least 40 mol%, based on the entire recurring units, of a recurring unit expressed by formula (II - a) above except that the primary amino groups are changed to nitro groups.

[I-2] Detailed description of the nitro-containing polymers and the primary amino-containing polymers of this invention derived therefrom:-

Some details of the nitro-containing polymers or copolymers (V) or (V-a) and processes for their preparations have been cited from the specification of the copending Patent Application mentioned above, and will be given below.

(A) Raw materials for preparation of the polymers

The above nitro-containing polymers or copolymers (V) or (V-a) are prepared by reacting the aromatic dihalogen compounds of the formula

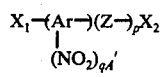 (VI)

wherein $X_1$, $X_2$, Z, p, q' and (Ar) are the same as defined hereinabove,
with the difunctional compounds of the formula

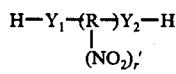 (VII)

wherein $Y_1$, $Y_2$, (R) and r' are the same as defined hereinabove, or further with the difunctional copolymer components of the formula

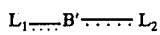 (VIII)

wherein $L_1$, $L_2$, B and the symbol ..... are the same as defined above.

These raw materials will be described further below.

(A) AROMATIC DIHALOGEN COMPOUNDS (VI)

Specific examples of $X_1$ and $X_2$ in the above formula (VI) are fluorine, chlorine, bromine and iodine. Of these, chlorine is most preferred for commercial purposes although having a lower specific activity than the other halogens. These halogen atoms represented by $X_1$ and $X_2$ are directly bonded to the nuclear carbon atoms of the aromatic group (Ar), and $X_1$ and $X_2$ are located at positions other than the ortho-position or the periposition.

Preferred species of the divalent aromatic group (Ar) in the aromatic dihalogen compound of the general formula (VI) are those containing 6 to 50 carbon atoms, preferably 6 to 45 carbon atoms. The rings forming these aromatic groups include not only wholly conjugated aromatic ring groups such as a benzene, naphthalene, anthracene, biphenyl or terphenyl ring, but also polynuclear aromatic ring groups formed by bridging at least two of identical or different wholly conjugated aromatic ring groups of the exemplified type by various bridging groups. Examples of suitable bridging groups for bridging at least two such wholly conjugated aromatic rings are at least one member selected from the group consisting of

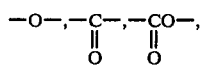

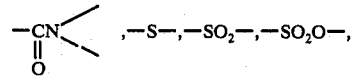

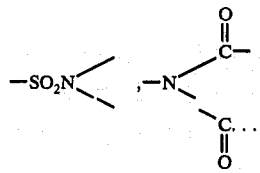

and alkylene groups containing 1 to 6 carbon atoms (in the above formulae, the symbol ..... represents a hydrogen atom or the presence of a bond). It is necessary that such (Ar) must contain an electron-attracting group capable of activating the halogen groups, in addition to the nitro groups and electron-attracting groups in the above bridging groups.

Especially advantageous aromatic dihalogen compounds used in this invention are those expressed by the following formula

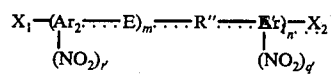 (VI-1)

wherein $Ar_1$, $Ar_2$, q', r', m, n, E, E' and R'' are the same as defined above. Especially preferred species of formula (VI-1) are those in which —R''— is selected from the group consisting of

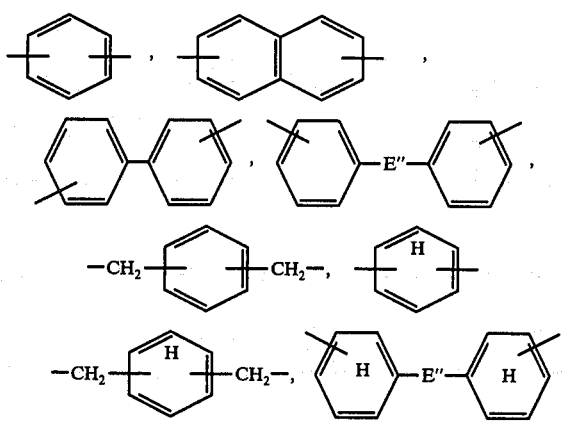

wherein E'' is a non-aromatic bridging group same as defined with regard to E or E' above, the above —R''— optionally having an inert substituent such as halogen atoms or an alkyl or alkoxy group containing 1 to 4 carbon atoms,
and alkylene groups containing 2 to 15 carbon atoms.

Specific examples of the above aromatic dihalogen compounds of formula (VI) are given below.

(1) Compounds of formula (VI) wherein p=0 and q'=0:

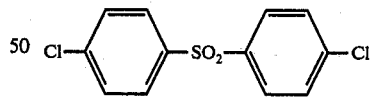

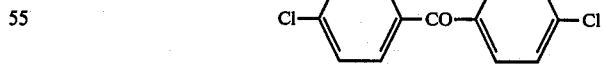

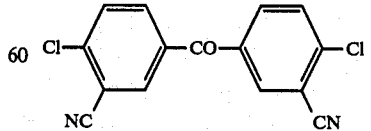

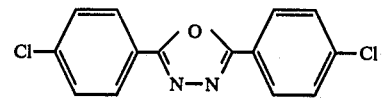

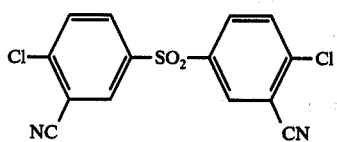
(2) Compounds of formula (VI) wherein $p=0$ and $q'=1-4$:
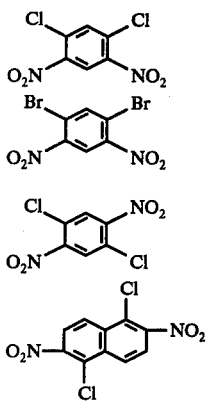
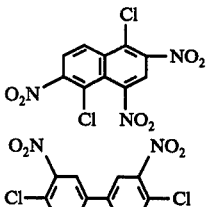
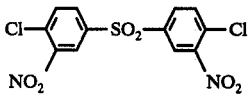
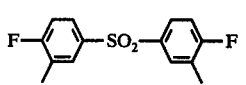
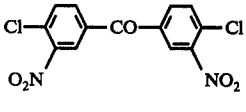
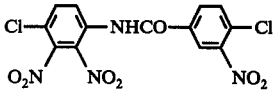
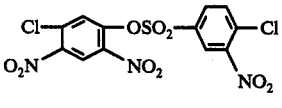
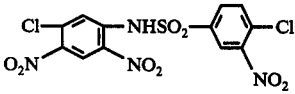
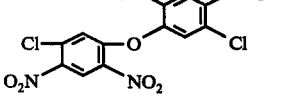
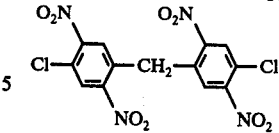
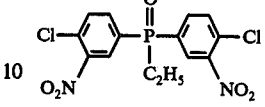
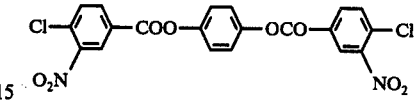
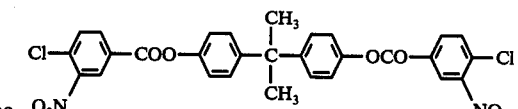
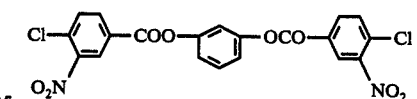
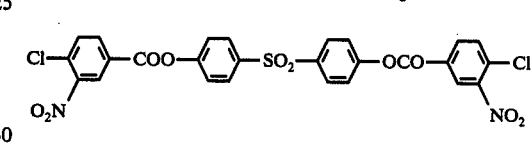
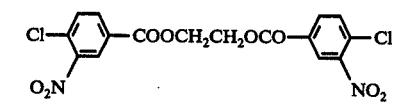
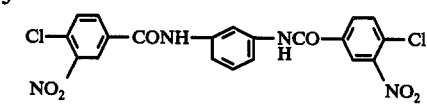
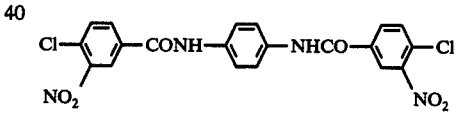
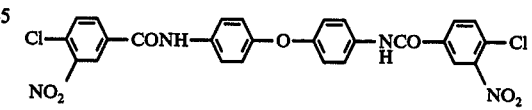
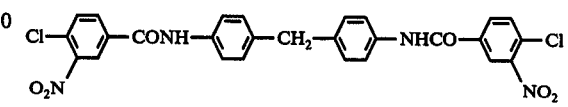
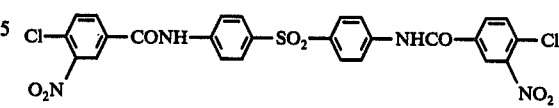
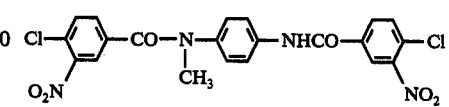
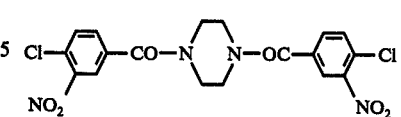

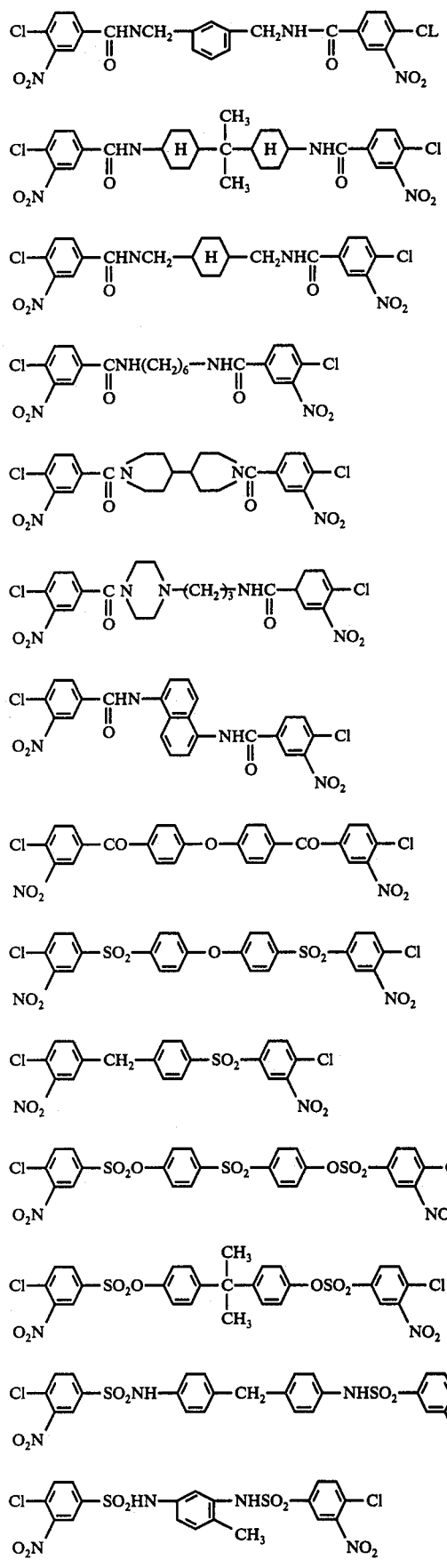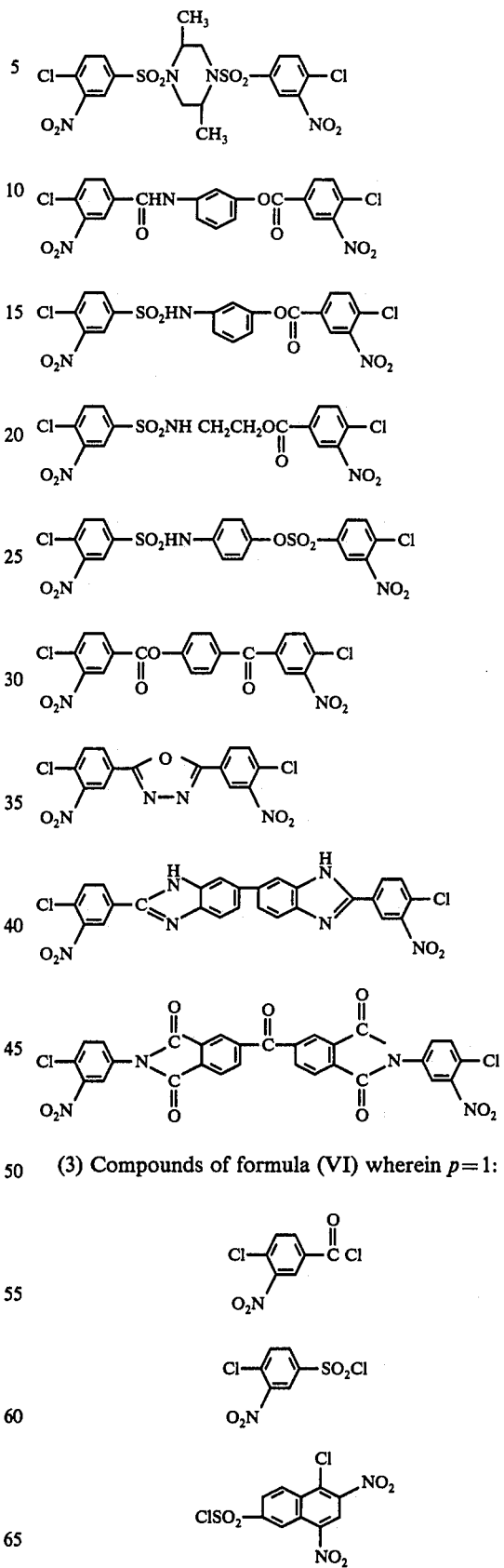
(3) Compounds of formula (VI) wherein $p=1$:

-continued

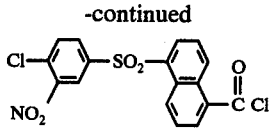

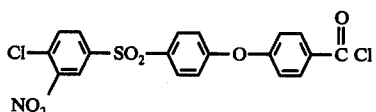

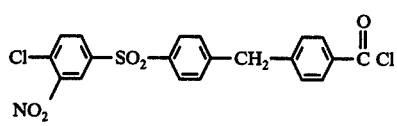

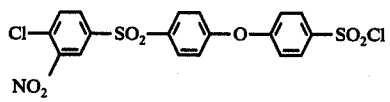

(B) DIFUNCTIONAL COMPOUNDS OF FORMULA (VII)

In formula (VII), (R) is preferably an organic group containing 2 to 50 carbon atoms, and especially preferably selected from the following groups:

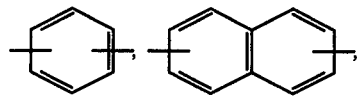

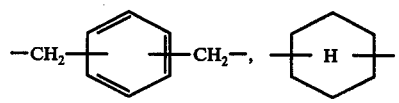

and alkylene groups containing 2 to 15 carbon atoms, in which E″ is a non-aromatic bridging group, preferably at least one bridging group selected from —SO$_2$—,

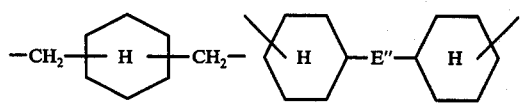

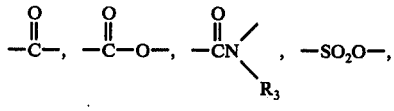

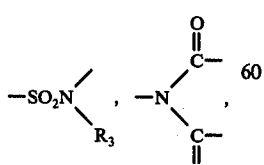

—O—, —S— and alkylene groups containing 1 to 6 carbon atoms, R$_3$ being a hydrogen atom or an alkyl group containing 1 to 6, preferably 1 to 3 carbon atoms.

Specific examples of preferred difunctional compounds of formula (VII) are shown below.

(1) Difunctional compounds of formula (VII) wherein both Y$_1$ and Y$_2$ are

 
 

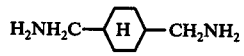

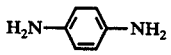 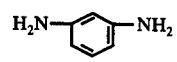

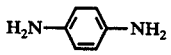 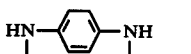

 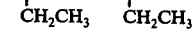

 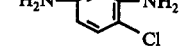

 

 

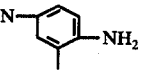 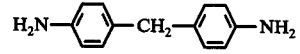

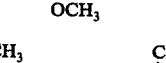 

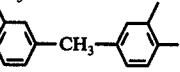 

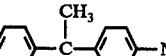 

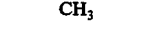 

 

 

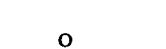 

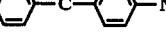 

 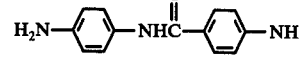

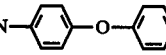 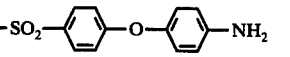

 

 

-continued

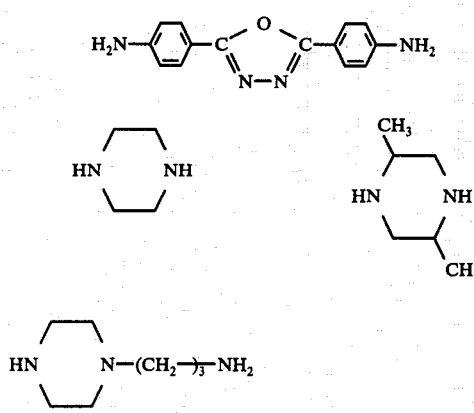

(2) Difunctional formula of formula (VII) wherein $Y_1$ is $$-\underset{R_1}{\overset{|}{N}}-,$$

and $Y_2$ is —O—:

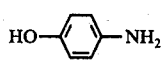 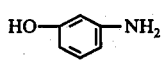

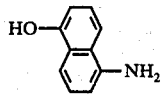 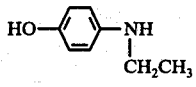

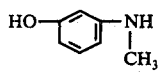 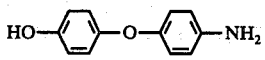

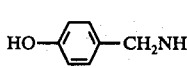 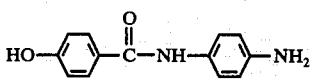

(3) Compounds of formula (VII) wherein both $Y_1$ and $Y_2$ are —O—:

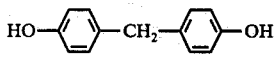

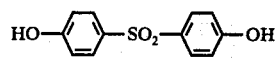

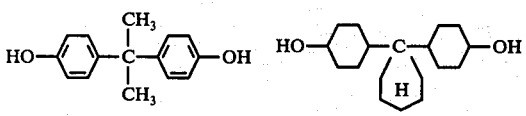

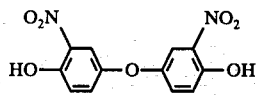

(c) Difunctional copolymer component of formula (VIII):

(i) Monohydroxymonocarboxylic acids or their functional derivatives such as:

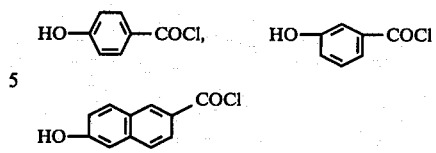

(ii) Monohydroxymonosulfonic acid or their functional derivatives such as:

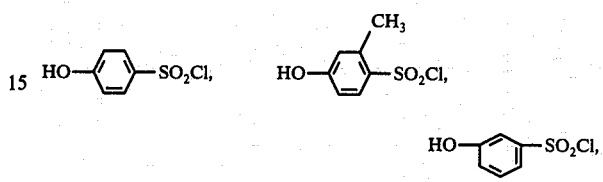

(iii) Monohydroxydicarboxylic anhydrides or their functional derivatives such as:

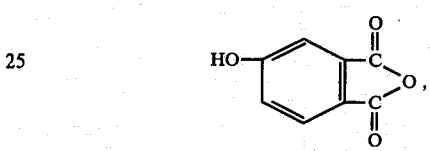

(iv) Monoaminocarboxylic acids or their functional derivatives such as:

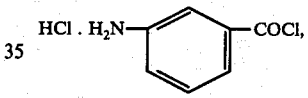

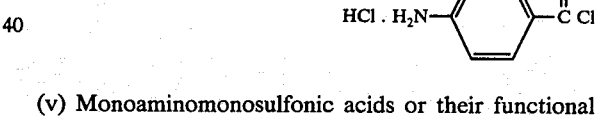

(v) Monoaminomonosulfonic acids or their functional derivatives such as:

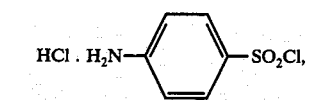

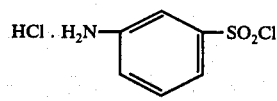

(vi) Dicarboxylic anhydride monosulfonic acids or their functional derivatives such as:

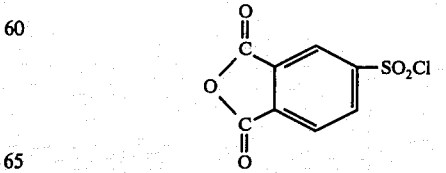

(vii) Dicarboxylic acids or their functional derivatives such as:

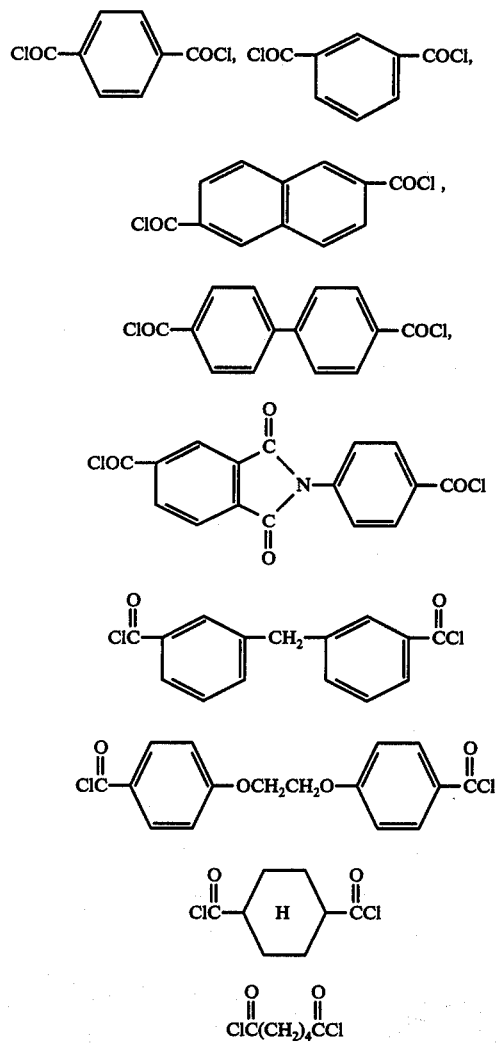

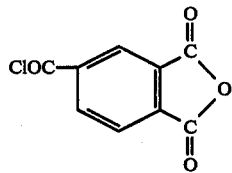

(viii) Tricarboxylic monoanhydrides or their functional derivatives such as:

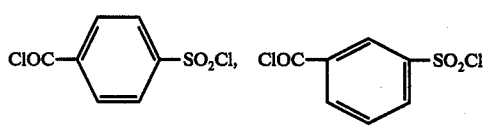

(ix) Monocarboxymonosulfonic acids or their functional derivatives such as:

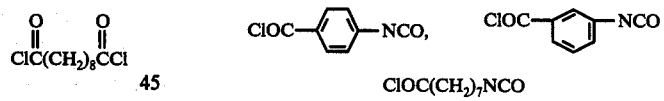

(x) Tetracarboxylic dianhydrides or their functional derivatives such as:

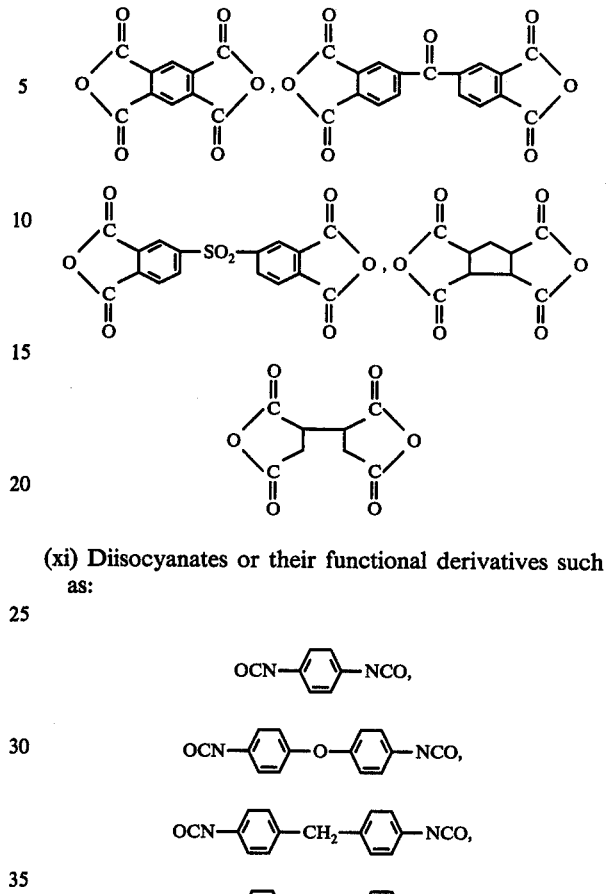

(xi) Diisocyanates or their functional derivatives such as:

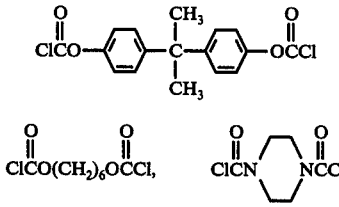

(xii) Monoisocyanatemonocarboxylic acids or their functional derivatives such as:

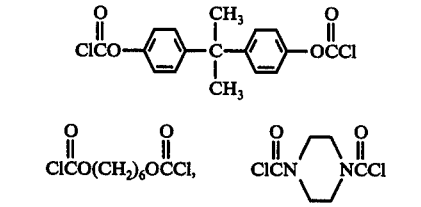

(xiii) Bishaloformates such as:-

Of these difunctional copolymer components of formula (VIII), the dicarboxylic acids or their functional derivatives (vii), the tricarboxylic monoanhydrides or their functional derivatives (viii), the monocarboxymonosulfonic acids or their functional derivatives (ix), the tetracarboxylic dianhydrides or their functional derivatives (x), and the diisocyanates or their functional derivatives (xi) are preferred. Dicarboxylic acid halides in (vii) and the diisocyanates or their functional derivatives (xi) are especially preferred.

Some typical examples of the recurring unit of formula (I-a) and the copolymerizable recurring unit of formula (III) are given below. These examples merely facilitate the understanding of the present invention, and in no way limit the invention.

Specific Examples of the Recurring Unit of Formula (I-a)

(1) When $Y_1$ and $Y_2$ are respectively

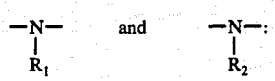

p=0

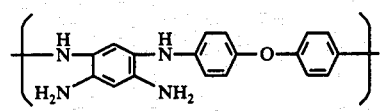

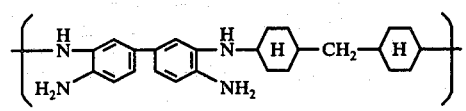

p=1

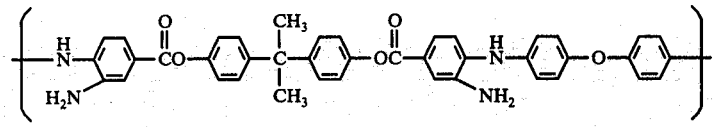

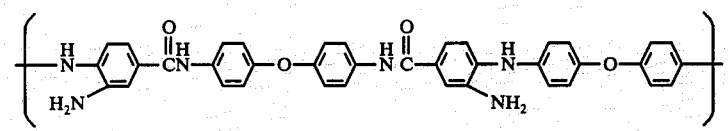

(2) When $Y_1$ is

and $Y_2$ is —O—:

p=0

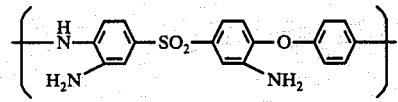

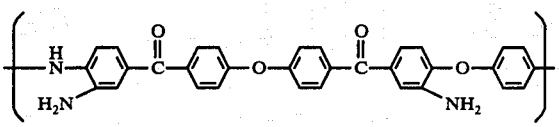

(3) When both $Y_1$ and $Y_2$ are —O—:

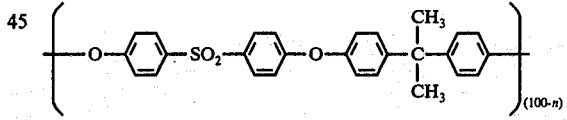

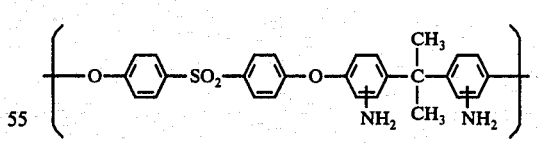

(n representing mol %)

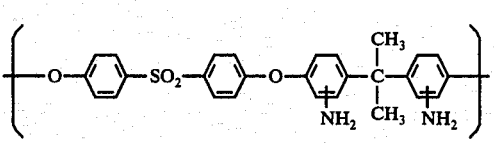

Specific Examples of Recurring Unit (III) (copolymer component)

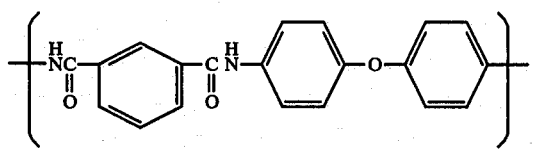

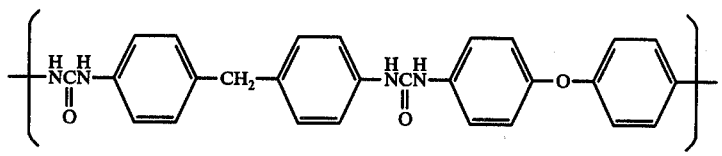

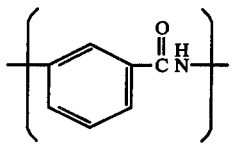

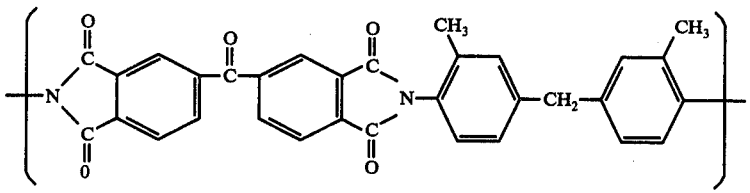

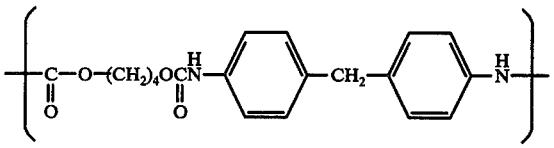

[II] Substituted N-containing aromatic polymers of this invention and processes for preparing them:

Substantially linear polymers of this invention comprising at least 40 mol%, based on the entire recurring units, of a recurring unit of formula (I) in which at least a part of $W_1$ and/or $W_2$ is a derivative group other than primary amino groups, and at least partially crosslinked polymers of this invention comprising at least 40 mol%, based on the entire recurring units, of a recurring unit of formula (IV) can be easily derived from the primary amino-containing polymers of this invention comprising at least 40 mol%, based on the entire recurring units, of the recurring unit of formula (I-a).

Preferred species of these polymers, and typical methods for preparing them will be described below.

[II-1] When $W_1$ and/or $W_2$ in formula (I) are (b)

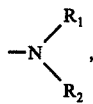

and $W'_1$ and/or $W'_2$ in formula (IV) are (b')

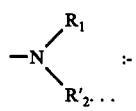

As hereinabove stated, $R_1$ in (b) represents a hydrogen atom or an organic group containing 1 to 20 carbon atoms which in principle has a valence of 1 and $R_2$ in (b) is identical to, or different from, $R_1$ and represents an organic group containing 1 to 20 carbon atoms which in principle has a valence of 1. Also, in (b'), $R_1$ is the same as defined above, at least a part of $R'_2$ represents an organic group having a valence of at least 2 and forms an intermolecular bridging group together with $W'_1$ and/or $W'_2$ of another molecule through a bond, and the remainder of $R'_2$ represents the same organic group as $R_2$. These groups $R_1$, $R_2$ and $R'_2$ are common in that the terminal carbon atoms of the hydrocarbon residues are bonded to the above nitrogen atom. So long as this requirement is met, these organic groups can contain other hetero atoms such as oxygen, nitrogen, sulfur, phosphorus or silicon. Furthermore, in formula (b), $R_1$ and $R_2$ can form a ring directly or through the above hetero atoms. In formula (b'), there is the same relation between $R_1$ and $R'_2$.

Accordingly, the polymers of this invention containing substituted N-containing groups of formula (b) and (b') can be prepared basically by N-alkylating or N-arylating the primary amino-containing polymers of this invention having the recurring unit of formula (I-a). Various known N-alkylating agents or N-arylating agents and various known N-alkylating and N-arylating methods can be used in this invention, if only consideration is given to the fact that amino-containing compounds to be so treated are the polymers.

Examples of general alkylating agents are alkyl, cycloalkyl or aralkyl halides, and strong acid esters of the residues of these, such as sulfuric acid esters or sulfonic acid esters.

Typical examples of such alkylating agents include monofunctional compounds such as $CH_3I$, $CH_3CH_2Br$, $CH_3(CH_2)_7$—Br, $(CH_3)_2SO_4$, $(C_2H_5)_2SO_4$ or

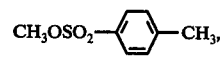

and polyfunctional compounds such as Br-$CH_2CH_2$—Br, $Br(CH_2)_3Br$, $CH_3SO_2O(CH_2)_4OSO_2CH_3$, Br-$(CH_2)_8$-Br, or

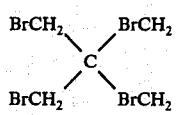

Of the difunctional alkylating agents, Br(CH$_2$)$_2$-Br and Br(CH$_2$)$_3$Br tend to form a 5- or 6-membered cyclic amino group such as a pyrrolidine or piperazine group rather than act as an intermolecular crosslinking agent, during their reaction with —NH$_2$. Generally, the above alkylating agents, in many cases, yield mixtures of the primary amino group with a secondary amino group, a tertiary amino group and in some cases, a quaternary ammonium group, depending upon the mol ratio thereof to the primary amino group to be reacted.

It is generally known that such alkylating agents improve their alkylating ability by introducing a double bond or triple bond into their α-position. Since unique characteristics can be imparted by the introduction of such alkyl groups containing multiple bonds, these activated alkylating agents can be used especially preferably in the present invention.

Examples of suitable alkylating agents are shown below.

(a-1) Those containing a double bond —C═C— of the vinyl, vinylidene or vinylene type at the α-position:

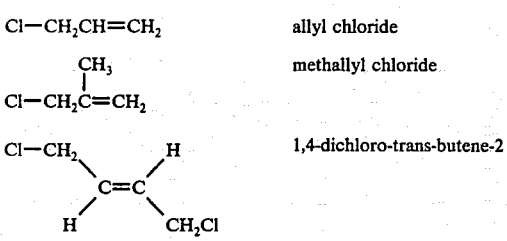

| | |
|---|---|
| Cl—CH$_2$CH═CH$_2$ | allyl chloride |
| (CH$_3$)Cl—CH$_2$C═CH$_2$ | methallyl chloride |
| Cl—CH$_2$\C═C/H, H\CH$_2$Cl | 1,4-dichloro-trans-butene-2 |

(a-2) Those containing a carbon-oxygen or carbon-nitrogen double or triple bond at the α-position:

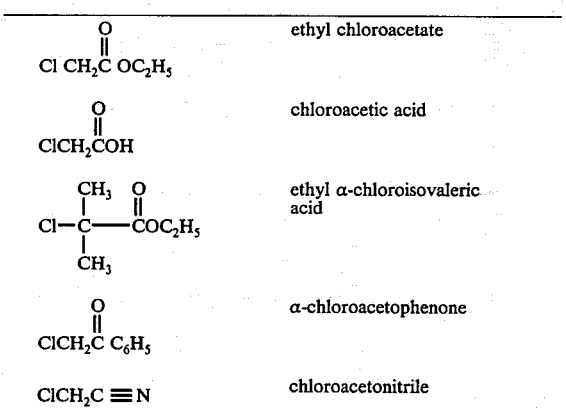

| | |
|---|---|
| ClCH$_2$COOC$_2$H$_5$ | ethyl chloroacetate |
| ClCH$_2$COH | chloroacetic acid |
| Cl—C(CH$_3$)(CH$_3$)—COOC$_2$H$_5$ | ethyl α-chloroisovaleric acid |
| ClCH$_2$COC$_6$H$_5$ | α-chloroacetophenone |
| ClCH$_2$C≡N | chloroacetonitrile |

(a-3) Those containing an aromatic group at the α-position:

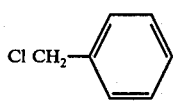

| | |
|---|---|
| Cl CH$_2$—C$_6$H$_5$ | benzyl chloride |

-continued

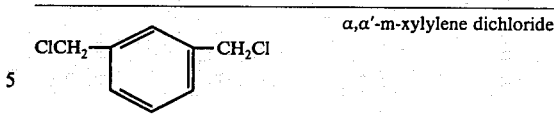

α,α'-m-xylylene dichloride

α,α'-o-xylylene dichloride

These alkylating agents, too, can alkylate one or two hydrogens of the —NH$_2$ group depending upon their mol ratios to the primary amino group. Difunctional or higher alkylating agents can be used for crosslinking or reduction, as stated above.

Of these alkylating agents, those belonging to the type (a-1) can cause crosslinkage by utilizing the polymerizability of the double bond after the alkylation.

Furthermore, of the alkylating agents of the type (a-2), in the case of ethyl chloroacetate, chloroacetic acid or chloroacetonitrile which can convert the primary amino groups to iminoacetic acid type groups, the polymers can be utilized as polymeric ligands utilizing the chelateforming ability of the iminoacetic acid or N,N-diacetic acid substituted amino group. Furthermore, the iminoacetic acid group can advantageously be converted to a hydantoin group by reaction with a monoisocyanate or polyisocyanate or to a sydnone group by nitrosation.

Other alkylating agents that can be suitably used in the present invention are alkylating agents capable of causing a Michael-type addition reaction, that is, unsaturated compounds having a carbon-carbon double bond of the vinyl, vinylidene or vinylene type to which a strong electron-attracting group is directly attached.

Examples of suitable unsaturated compounds used as alkylating agents are derivatives, such as esters, amides or nitriles, of acrylic acid, methacrylic acid or other α,β-unsaturated carboxylic acids, for example

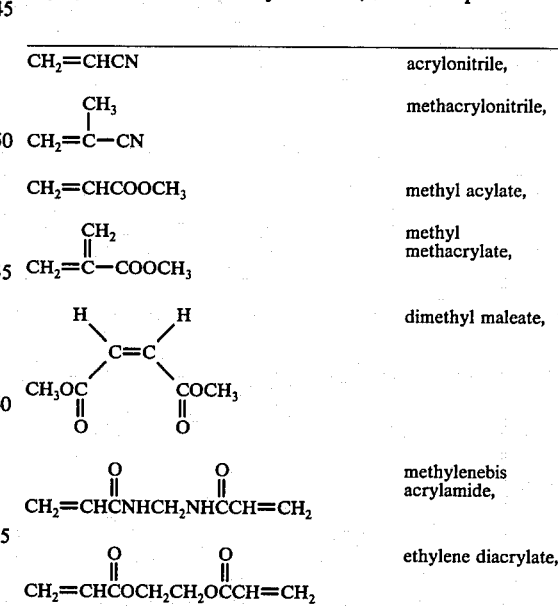

| | |
|---|---|
| CH$_2$═CHCN | acrylonitrile, |
| CH$_2$═C(CH$_3$)—CN | methacrylonitrile, |
| CH$_2$═CHCOOCH$_3$ | methyl acylate, |
| CH$_2$═C(CH$_2$)—COOCH$_3$ | methyl methacrylate, |
| CH$_3$OC(O)—CH═CH—C(O)OCH$_3$ | dimethyl maleate, |
| CH$_2$═CHCNHCH$_2$NHCCH═CH$_2$ (with C═O) | methylenebis acrylamide, |
| CH$_2$═CHCOCH$_2$CH$_2$OCCH═CH$_2$ (with C═O) | ethylene diacrylate, |

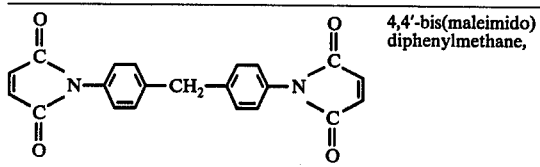 4,4'-bis(maleimido)diphenylmethane, and

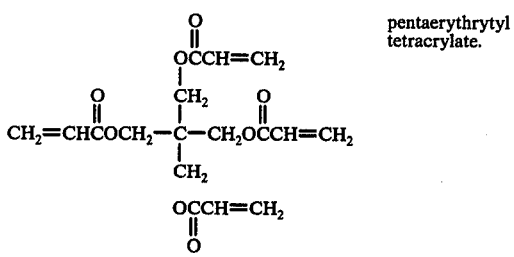 pentaerythrytyl tetracrylate.

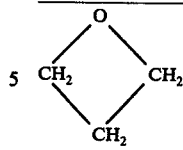 oxacyclobutane, and

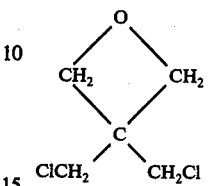 3,3'-bis(chloromethyl)oxacyclobutane.

Generally, these alkylating agents can convert amino groups to derivative groups of β-iminopropionic acid, and by utilizing the reactivity of these derivative groups, they can be further converted to other pendant groups. For example, these groups can be converted to a diketopiperimidine ring by reaction with an isocyanate.

Cross-linked polymers can be obtained by using the difunctional or higher unsaturated compounds such as bisacrylates, bismethacrylates, tetraacrylates, or bismaleimides. Above all, polymaleimides such as bismaleimides give cured products having superior thermal stability, and they can be used suitably as thermally stable resins.

In alkylation using the alkyl halide, the strong acid ester or the α,β-unsaturated compound capable of performing a Michael addition reaction, a basic catalyst such as potassium tert-butoxide accelerates the alkylation reaction. Furthermore, in many cases, the reaction is accelerated when it is carried out in an aprotic polar solvent.

Other useful alkylating agents are 3- or 4-membered alkylene oxides such as:

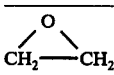 ethylene oxide,

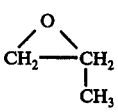 propylene oxide,

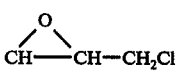 epichlorohydrin,

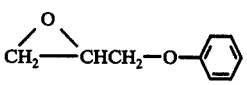 phenyl glycidyl ether,

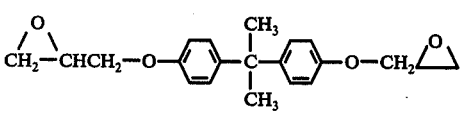 bisphenol A-bisglycidyl ether,

Ethylene oxide and propylene oxide can convert primary amino groups to groups of the monoethanolamine type or di-ethanolamine type by an addition reaction. Likewise, oxacyclobutanes can convert primary amino groups to groups of γ-propanolamine type. The resulting hydroxyl groups can increase the hydrophilicity of the polymers. Or by utilizing the reactivity of the hydroxyl groups, they can be converted to other derivatives. Polyfunctional alkylene oxides such as bisphenol A-bisglycidyl ether can be used to obtain cross-linked polymers. It is very interesting that epoxy resins can be used as such. The use of epoxy resins is expected to afford cured resins of superior properties, and in this case, it may be considered that the amino-containing polymers of this invention are used as a curing agent for the epoxy resins.

Of the above-illustrated alkylene oxides, epichlorohydrin behaves interestingly. Seemingly, it is a monoepoxide, and in the presence of alkali, regenerates a glycidyl group by the following reaction and can thus act as a crosslinking agent.

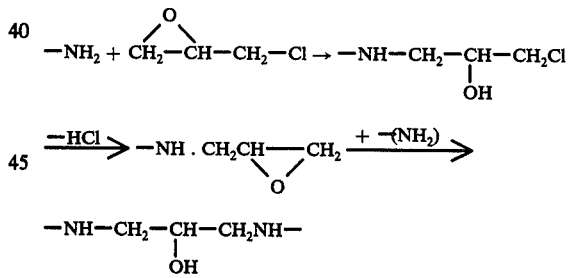

Compounds capable of easily forming alkylene oxides in the presence of alkali, such as β-chloroethanol, can also be used as alkylating agents having high activity. 5- and 6-membered alkylene oxide have lower alkylating ability because the rings are stable, but can be converted to cyclic imines by reacting under severe conditions.

As special cases, acetal-type cyclic oxides such as 1,3-dioxolane or 1,3-dioxane, although being 5- or 6-membered, easily act as an alkylating agent for amino groups. It is interesting to note that by reacting polyspiroacetyl obtained by the reaction of pentaerythritol with a dialdehyde, with the primary amino-containing polymer of this invention and thus repeating ring-opening addition, it can be cured in the same way as in the case of epoxy resins.

As a special case of general procedures of alkylation, a reductive alkylating method can be cited. This method comprises reducing nitro groups to amino groups and simultaneously alkylating them, in the presence of an aliphatic carbonyl compound such as a ketone or an aldehyde, thereby to convert them to secondary or tertiary amino groups. Examples of such carbonyl compounds are formaldehyde, acetaldehyde, and acetone. The mechanism of the reduction alkylation is considered to be that, as schematically shown below, a primary amino group once formed reacts with the carbonyl compound to form a Schiff base which is then reduced to an alkylated amino group. Hence, a Schiff base is formed by reacting the primary amino-containing polymer with the carbonyl compound, and then reduced, with the result that the alkylation has also been effected.

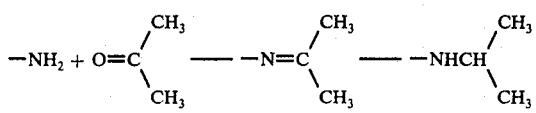

Functional derivatives of formaldehyde, trioxane or chloromethyl ether can methylolate or chloromethylate primary or secondary amino groups, but since they easily form a methylene bridge ($>N-CH_2N<$) by reaction with other amino groups, they can be used as an alkylene bridging agent.

Reaction of compounds containing a methylol group or a dimethylol ether-type bond, such as a xylene formaldehyde resin or a resol-type phenol resin, with the primary amino- or secondary amino-containing polymer of this invention can cause the substitution of a benzyltype aralkyl group for the amino group.

Diazomethane can be cited as an alkylating agent having especially strong activity, but is not usually feasible.

The characteristic feature of the N-alkylated amino-containing polymers of this invention described above is that as a result of introducing new functional groups into the polymers, new properties are imparted to the polymers. For example, the hydrophilicity of the polymers increases, or chelate forming ability or new reactivity, for example, the ability to form a hydantoin ring, can be imparted to the polymers. Furthermore, the polymers become cured polymers having superior thermal stability. General characteristics brought about by very ordinary alkylation, for example, the introduction of a methyl group, are that the amino-containing polymers can be stabilized by rendering the amino groups resistant to oxidation through the extraction of hydrogen, while maintaining their characteristics such as hydrophilicity or electron donatability.

On the other hand, examples of general arylating agents are aryl mono- or poly-halides activated with electronattracting groups, e.g., 2,4-dinitrochlorobenzene, picryl chloride, and 3,3'-dinitro-4,4'-dichlorodiphenylsulfone. These arylating agents can easily arylate primary amino groups or monoalkylated secondary amino groups, but it is difficult for them to arylate secondary amino groups of the diarylamine type in an attempt to form amino groups of the triarylamine type.

By such arylation, the polymers of this invention gain a new reactivity by the functional group in the arylating agent. But the arylation is less important than the alkylation mentioned above, since the polymers of this invention include those which contain a diarylamine-type bond in the main chain.

[II-2] When $W_1$ and/or $W_2$ in formula (I) is (c)

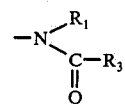

and $W'_1$ and/or $W'_2$ in formula (IV) is (c')

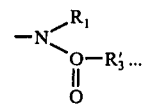

In the formulae (c) and (c'), $R_1$ is the same as defined above; $R_3$ represents a hydrogen atom or an organic group containing 1 to 20 carbon atoms which in principle has a valence of 1; and $R'_3$ shows at least a part of $R_3$ forms a polyfunctional group having a valence of 2 or more and forms an intermolecular bridging group with $W'_1$ and/or $W'_2$ of another molecule. $R_1$ and $R_3$ or $R_1$ and $R'_3$ not forming the bridging group may respectively form a ring either directly or through the hetero atoms mentioned above.

The primary amino groups or the secondary amino groups substituted with $R_1$ of the primary amino-containing polymers of formula (I-a) can be converted to substituted N-containing groups by reacting the primary amino- or secondary amino-containing polymers with a carboxylic acid containing

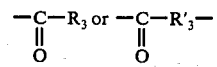

or its reactive derivatives such as carboxylates, carboxylic anhydrides or carboxylic acid halides in the presence of an inert organic solvent capable of swelling the polymer at least to an extent such that the primary or secondary amino groups are activated to a degree sufficient for reaction. Depending upon the type of the carboxylic acid or its derivative, it can be directly reacted with the polymer in the molten state.

When the carboxylic acid or its reactive derivative is monofunctional, a pendant group of formula (c) is formed. When at least a part of it is difunctional or higher, there can be formed a polymer which is at least partially cross-linked with the intermolecular bridging group for formula (c').

The reaction of forming the pendant group and/or the intermolecular bridging group of formula (c) or (c') is N-acylation well known to those skilled in the art. Any type of this known reaction can be used in the present invention.

Examples of N-acylating agents usually employed include carboxylic acids, carboxylic anhydrides, carboxylic acid halides, carboxylic acids esters, carboxylic acid imidazolides, and mixed acid anhydrides of carboxylic acids and sulfonic acids.

Examples of suitable N- acylating agents are (1) carboxylic acids such as acetic acid, propionic acid, or benzoic acid, (2) carboxylic anhydrides such as acetic anhydride, phthalic anhydride or benzoic anhydride, (3) carboxylic acid halides such as acetyl chloride, acryloyl chloride, crotonyl chloride, cyclohexanecarboxylic acid chloride, benzoyl chloride, phenylacetic acid chloride, cinnamoyl chloride, 4-chloroformylphthalic anhydride, or pyridinecarboxylic acid chloride, (4) carboxylic acid esters such as phenyl acetate, methyl benzoate, or 2,4-dinitrophenyl acetate, (5) carboxylic acid imidazolides such as acetic acid imidazolide or benzoic acid imidazolide, and (6) mixed anhydrides of carboxylic acid/sulfonic acid such as benzoic 2-sulfonic anhydride or benzoic methanesulfonic anhydride.

Difunctional or higher acylating agents are any compounds which contain at least two carboxyl groups or their functional derivatives in the molecule. Specific examples of these acylating agents include (1) dicarboxylic acids or their functional derivatives such as maleic acid dichloride, diphenyl isophthalate, isophthaloyl dichloride, terephthaloyl dichloride or sebacoyl dichloride, (2) tricarboxylic acids or their functional derivatives such as trimesic acid trichloride, 4-chloroformylphthalic anhydride, trimellitic acid trichloride, 4-phenyloxycarbonyl phthalic anhydride, trimellitic anhydride or ditrimellitic trianhydride, and (3) tetracarboxylic acids or their functional derivatives such as pyromellitic dianhydride, benzophenonetetracarboxylic dianhydride, 2,3,6,7-naphthalenetetracarboxylic dianhydride or diethyl pyromellitate.

The acylating reaction of the primary amino- and/or secondary amino-containing polymers of this invention is preferably carried out under mild conditions because it is a polymer reaction and is likely to cause side-reactions. For this reason, and since the reaction is carried out at low temperatures or at temperatures in the vicinity of room temperature, highly active acylating agents such as the acid halides, acid anhydrides and carboxylic acid imidazolides are preferred.

When, however, cross-linking and acylation are performed at the time of shaping the polymer as will be described later on, the amino-containing polymer needs to be present in the uncrosslinked state in a mixed solution of it with the acylating agent. Accordingly, in this case, carboxylic acid esters or carboxylic acids having a medium degree of activity which do not react at low temperatures in the vicinity of room temperature but act as acylating agents at high temperatures, for example, above 100° C. are preferred.

When $Y_1$ or $Y_2$ is

and the amino group is positioned adjacent to $Y_1$ or $Y_2$ in formula (I-a), cyclodehydration occurs between the amido proton of a converted carbonamide group and

to form a benzimidazole ring. Thus, it is preferred to render the reaction conditions mild and use the acid halides (3), or the acid anhydrides (2) which have a high acylating ability.

When a 5-membered or 6-membered intramolecularly cyclic acid anhydride is used as an acylating agent, cyclodehydration occurs similarly to form an imide group. Therefore, in this case, the reaction is carried out preferably at temperatures in the vicinity of room temperature.

When the acylation is carried out using the carboxylic acid (1), mere heating can induce amide formation. If, however, a dehydration reagent such as dicyclohexyl carbodiimide or tetraethyl pyrophosphite is used except the case of $Y_1$ or $Y_2$ being

and the amino group being positioned adjacent to $Y_1$ or $Y_2$, the acylation can be carried out under relatively mild conditions.

In order to obtain cross-linked polymers, the difunctional or higher acylating agents are used either alone or together with the monofunctional acylating agents. One method for obtaining such crosslinked polymers comprises reacting a highly active difunctional or higher carboxylic acid halide, carboxylic anhydride or carboxylic acid imidazolide with the amino-containing polymer shaped into a film or fibers, etc., in the heterogeneous state. In many cases, this reaction is preferably carried out in the presence of a solvent capable of swelling the polymer to some extent so that the acylating agent can approach the amino groups.

In order to obtain shaped articles of cross-linked polymers in general, the amino-containing polymer is mixed in the solution or melt state with the carboxylic acid ester or carboxylic acid having a relatively low activity, and curing of the polymer is performed while shaping it. This method can be applied also to polyfunctional compounds containing acylating groups of different activities in the same molecule, such as methyl 4-chloroformylbenzoate or 4-phenyloxycarboxylphthalic anhydride in which one of the functional groups has a strong activity, but the others are relatively low in activity.

When $R_1$ is an aryl group or an aralkyl group, considered to cause great steric hindrance, the reaction of the amino group with the acylating agent is difficult in the above-described acylating reaction, and severe reaction conditions are required. Accordingly, $R_1$ is advantageously a hydrogen atom, a lower alkyl group containing 1 to 6 carbon atoms or an alkylene group, the hydrogen atom and methyl and ethyl groups being especially preferred.

When $R_1$ and $R_3$ form an intramolecular ring, that is, a lactam ring, there can be used a method in which, for example, a γ- or δ-haloalkylcarboxylic acid derivative is caused to react. This can result in an intramolecular cyclization reaction to form a 5- or 6-membered lactam such as γ-pyrrolidone or γ-piperidone.

As described above, when $Y_1$ or $Y_2$ is

and the amino group is positioned adjacent to $Y_1$ or $Y_2$ in formula (I-a), cyclodehydration occurs between the amido proton of a converted carbonamide group and

to form a benzimidazde ring, whereby the polymer is stabilized. When a 5- or 5-membered intramolecularly cyclic acid anhydride is used as the acylating agent, an imide ring is formed to stabilize the polymer.

When an acid halide or acid anhydride is used as the acylating agent, the reaction sometimes yields by-product acidic substances such as hydrogen halides and/or one fragment of acid anhydrides. These acidic substances may react with the unreacted amino group to form salts, and thus to impede the smooth advance of the subsequent reaction. In such a case, it is preferred to use an acid acceptor.

Examples of acid acceptors used for this purpose include tertiary amines such as trimethylamine or N-methyl morpholine, and alkali metal or alkaline earth metal carbonates, bicarbonates or hydroxides, such as sodium carbonate, potassium carbonate or sodium bicarbonate. A reaction solvent, for example, an amide-type solvent such as N-methyl pyrrolidone or N,N-dimethyl acetamide, or a sulfoxide-type solvent such as dimethyl sulfoxide has a certain degree of acid acceptability, and may sometimes be able to advance the reaction smoothly without the presence of an acid acceptor.

When a carboxylic acid ester is used as the acylating agent, phenol or alcohols are formed by the reaction. These alcohols or phenol are desirably distilled out of the reaction system from the viewpoint of equilibrium.

The amount of the acylating agent can be varied according to the desired extent of acylating the amino group. When it is desired to acylate all of the amino groups, it is generally used in an amount equivalent to, or in slight excess of, the content of the amino group in the amino-containing polymer.

The N-acylated derivatives so obtained, when $R_1$ is a hydrogen atom, have a medium degree of hydrophilicity because of their ability to form hydrogen bonds, and because of their rigid main chain, can be suitably used as separating membranes.

Polymers acylated under mild conditions using an acylating agent having a vinyl, vinylidene or vinylene type —C═C— double bond as $R_3$, such as acryloyl chloride, methacryloyl chloride or cinnamoyl chloride, are first isolated, and then can be formed into desired shaped articles by a post-crosslinking reaction caused by a polymerization reaction such as radical polymerization or photopolymerization. When photopolymerization is used, a relief having the same pattern as an image can be prepared by utilizing its difference in solubility. This can be used, for example, for preparing photoresists.

When the polymer is crosslinked using a polyfunctional acylating agent, especially an aromatic polycarboxylic acid residue such as a terephthalic acid, isophthalic acid or trimellitic acid residue, the crosslinked polymers have thermal stability and can be used for a wide range of applications.

[II-3] When $W_1$ and/or $W_2$ in formula (I) is (d)

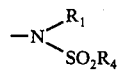

and $W'_1$ and/or $W'_2$ in formula (IV) is (d')

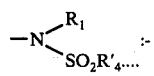

$R_1$ in formulae (d) and (d') is the same as defined above; $R_4$ represents a hydrogen atom or an organic group containing 1 to 20 carbon atoms which in principle has a valence of 1; and $R'_4$ shows that at least a part of $R_4$ forms a divalent or higher functional group and forms an intermolecular bridging group with $W'_1$ and/or $W'_2$ of another molecule. $R_1$ and $R_4$ or $R_1$ and $R'_1$ not forming the bridging group may respectively form a ring directly or through the hetero atoms described hereinabove.

The primary amino group or secondary amino group of the primary amino-containing polymer of formula (I-a) or the secondary amino-containing polymer resulting from the conversion of the primary amino group of the above polymer to —NHR' by the method described in [II-1] above can be converted to the form (d) and/or (d') mentioned above by reacting the polymer with a sulfonamidating agent containing the group —$SO_2R_4$ or —$SO_2R'_4$ such as a sulfonic anhydride or sulfonic acid halide in the presence of an inert organic solvent of the same type as described in [II-2] above. In this case, too, if the sulfonic acid or its reactive derivative is monofunctional, a pendant group (d) is formed. If it is difunctional or higher, polymers at least partially cross-linked with the intermolecular bridging group (d') are formed. This reaction is also well known to those skilled in the art as an N-sulfonylation reaction. Any type of this known reaction can be utilized in the present invention.

The sulfonylating agent used for this purpose includes, for example, alkyl, cycloalkyl or aralkyl sulfonic acid halides or sulfonic acid anhydrides of these residues.

Examples of preferred sulfonylating agents are sulfonic acid halides such as chlorosulfonic acid, methanesulfonyl chloride, benzenesulfonyl chloride, p-toluenesulfonyl chloride or cyclohexanesulfonyl chloride, and sulfonic acid anhydrides such as methanesulfonic anhydride or benzenesulfonic anhydride.

Difunctional or higher sulfonylating agents having at last two sulfonic acid groups or their functional derivatives in the same molecule can also be used. Examples of preferred sulfonylating agents of this kind are disulfonic acids, trisulfonic acid halides such as 1,3-benzenesulfonyl chloride, 4,4'-diphenyl ether disulfonyl chloride, 1,4-butanedisulfonyl chloride or 2,4,4'-biphenyltrisulfonyl chloride.

Of these sulfonylating agents, benzenesulfonyl chloride, toluenesulfonyl chloride, methanesulfonyl chloride and 1,3-benzenesulfonyl chloride are especially preferred.

Sulfonylating of the primary amino- and/or secondary amino-containing polymers of this invention is carried out preferably under mild conditions because it is a polymer reaction, and is likely to cause side-reactions. Because of their high reactivity, the above sulfonic acid halides and sulfonic anhydrides are suitable for reaction at low temperatures or at temperatures in the vicinity of room temperature.

In order to obtain cross-linked polymers, the difunctional or higher sulfonylating agents are used either alone or together with the monofunctional sulfonating agents.

One method for preparing these cross-linked polymers involves reacting the sulfonic anhydride or sulfonic acid halide with the amino-containing polymer shaped into films or fibers, in the heterogeneous state. In many cases, the reaction is carried out preferably in the presence of a solvent capable of swelling the polymer to some extent so that the sulfonylating agent can approach the primary amino group.

When $R_1$ is an aryl group or an aralkyl group considered to cause a great steric hindrance in the above sulfonylating reaction, the reaction of the amino group with the sulfonylating agent is difficult, and severe reaction conditions are required. Accordingly, $R_1$ is preferably a hydrogen atom, a lower alkyl group containing 1 to 6 carbon atoms, or an alkylene group, especially a hydrogen atom, and ethyl and methyl groups.

When such a sulfonic acid halide or sulfonic anhydride is used as the sulfonylating agent, the reaction sometimes yields by-product acidic substances such as hydrogen halides and/or one fragment of acid anhydrides and/or one fragment of acid anhydrides. These acidic substances may react with the unreacted amino group to form salts, and thus to impede the smooth advance of the subsequent reaction. In such a case, it is preferred to use an acid acceptor.

Examples of acid acceptors used for this purpose include tertiary amines such as triethylamine or N-methyl morpholine, and alkali metal or alkaline earth metal carbonates, bicarbonates or hydroxides, such as sodium carbonate, potassium carbonate or sodium bicarbonate. A reaction solvent, for example, an amide-type solvent such as N-methyl pyrrolidone or N,N-dimethyl acetamide, or a sulfoxide-type solvent such as dimethyl sulfoxide has a certain degree of acid acceptability, and may sometimes be able to advance the reaction smoothly without the presence of an acid acceptor.

The amount of the sulfonylating agent can be varied according to the desired extent of sulfonylating the amino group. When it is desired to sulfonylate all of the amino groups, it is generally used in an amount equivalent to, or in slight excess of, the content of the amino group in the amino-containing polymer.

As mentioned in (II-2), $R_1$ and $R_4$ may cause an intramolecular linking reaction to form a 5- or 6-membered sultam, for example.

When chlorosulfonic acid is added as a sulfonylating agent, there can be obtained a polymer in which the rigid aromatic main chain contains a side chain of sulfamic acid. This polymer can be used as a strongly electrolytic polymer, and as a cation component of a polyion complex. Furthermore, by utilizing its very strongly hydrophilic groups, this polymer can be utilized as a material for separating membranes such as ion-exchange membranes or reverse osmosis membranes.

The sufonamide-containing polymers in accordance with this invention can be suitably used as materials for diaphragms and separating membranes such as reverse osmosis membranes or ultrafiltration membranes because of the hydrophilicity of the sulfonamide group and the rigidity of the main chain. They can also find utility as thermally stable resins utilizing their superior thermal stability.

[II-4] when $W_1$ and/or $W_2$ in formula (I) is (e)

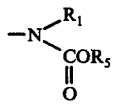

and $W'_1$ and/or $W'_2$ in formula (IV) is (e')

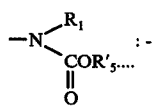

$R_1$ is (e) and (e') is the same as defined above; $R_5$ represents a monovalent organic group containing 1 to 20 carbon atoms; and $R_5$ shows that at least a part of $R_5$ forms an intermolecular bridging group with the other molecule mentioned above. $R_1$ and $R_5$ or $R_1$ and $R'_5$ not forming the above bridging group can respectively form a ring directly or through the hetero atoms.

This reaction is a urethanization reaction of the primary amino- or secondary amino-containing polymer mentioned in (II-1) above. Such a reaction itself is well known to those skilled in the art, and any type of such known urethanization can be utilized in the present invention.

The urethanizing agent generally includes, for example, compounds containing at least one haloformate or carbonate group. Examples of suitable urethanizing agents include

| | |
|---|---|
| $\text{ClCOC}_2\text{H}_5$ with C=O | ethyl chloroformate, |
| $\text{ClCOC}_6\text{H}_5$ with C=O | phenyl chloroformate, |
| $\text{ClCO(CH}_2)_4\text{OCCl}$ | tetramethylene bischloloformate, |
| $\text{ClCO—}\bigcirc\text{—C(CH}_3)_2\text{—}\bigcirc\text{—OCCl}$ | bisphenol-A bischloroformate |
| $\text{ClCO—}\bigcirc\text{—COC}_2\text{H}_5$ | 4-ethoxycarbonylphenyl chloroformate, |
| $\text{O}_2\text{N—}\bigcirc\text{—OCO—}\bigcirc\text{—NO}_2$ | bis(p-nitrophenyl) carbonate, |
| $\text{O}_2\text{N—}\bigcirc\text{—OCOC}_2\text{H}_5$ | 4-nitrophenylethyl carbonate, |
| $\bigcirc\text{—OCO—}\bigcirc$ | diphenyl carbonate, |
| ethylene carbonate structure | ethylene carbonate |
| bisphenol A-bisethylene carbonate structure | bisphenol A-bisethylene carbonate, and |
| $\bigcirc\text{—OCO—}\bigcirc\text{—C(CH}_3)_2\text{—}\bigcirc\text{—OCO—}\bigcirc$ | bisphenol A-bisphenylcarbonate. |

From the viewpoint of reactivity, mono- and polyhaloformates are especially preferred.

Preferably, the reaction is carried out at room temperature or at a lower temperature using an acid acceptor, as in the case of using carboxylic acid halides mentioned above; especially preferable it is carried out in solution. When a difunctional or higher polyhaloformate is used, it is very likely that gellation of the polymer occurs in solution. Accordingly, it is necessary to use it for crosslinking the polymer after shaping in the same way as in the case of carboamidation, or to use carbonates having lower activity.

Generally, carbonates have lower reactivity than haloformates, and high temperatures, for example, temperatures of 80° C. or higher, are required for urethanization. Further, catalysts such as triethylamine, magnesium oxide or lithium hydroxide can be effectively used.

The amount of the urethanizing agent may be one sufficient to urethanize the amino group according to the purpose as in the case of amidation.

The characteristic feature of the urethanized polymers in accordance with this invention is that since the amino groups can be stabilized and the hydrophilicity of the polymers can be suitably controlled, polymers having superior properties as separating membranes or for medical application can be obtained. In addition, since the urethane group has higher reactivity than acid amide groups or urea groups, these urethanized polymers can be used as precursors of other polymers. Aryl or alkyl urethanes act as a stabilized isocyanate in the presence of a tin-type or tertiary amine-type catalyst, and can react with a wide range of compounds having active hydrogens. For example, by reacting the urethane with a compound containing a primary amino group or a secondary amino group, it can be converted to urea. Reaction of it with a compound containing an iminoacetic acid group can give a hydantoin group. Such a reaction can of course be utilized as a cross-linking reaction. Specifically, if the polymer of this invention urethanized with the difunctional haloformate is admixed with a polyamine compound and heated during or after shaping, a polymer crosslinked with a urea linkage can be obtained. Partially urethanized polymers are also generally crosslinked as a result of forming a urea linkage together with the unreacted amino group.

When an amino-containing polymer in which $Y_1$ or $Y_2$ is —NH— and a primary or secondary amino group is positioned adjacent thereto is urethanized, heating of the urethanized product frequently results in the occurrence of a reaction in which the urethanized group reacts with —NH— of $Y_1$ or $Y_2$ to form an intramolecular ring and thus to afford a polymer having a benzimidazolone group with greater stability.

As a special case of (e) and (e'), $R_1$ and $R_5$ and/or $R'_5$ are bonded to form a cyclic urethane. A suitable example is an oxazolone group.

A suitable method for preparing such a ring involves reacting an aryl or alkyl urethane

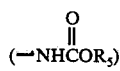

with an epoxy compound preferably in the presence of a catalyst such as tertiary amines, as schematically shown below.

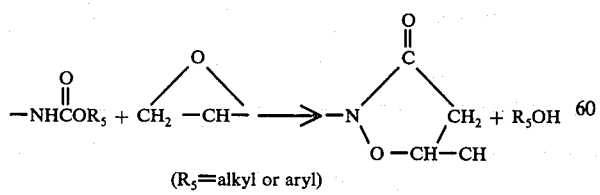

($R_5$=alkyl or aryl)

The oxazolone ring is more stable thermally and chemically than ordinary urethane groups. Accordingly, by co-curing the polymer of this invention having a urethane group in the case of $R_1$=H and an epoxy resin, there can be obtained a resin containing an oxazolone ring and having superior thermal stability.

Another method for preparing oxazolone-containing polymers comprises reacting a β-hydroxyethyl-containing polymer (obtained by adding an epoxy compound to primary amino-containing polymer . . . see the description of alkylation in II-1 above) with phosgene, or a haloformate or carbonate compound.

[II-5] When $W_1$ and/or $W_2$ in formula (I) is (f)

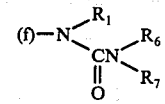

and $W'_1$ and/or $W'_2$ in formula (IV) is (f')

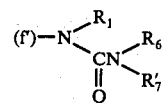

$R_1$ in (f) and (f') is the same ad defined hereinabove; $R_6$ and $R_7$ represent a hydrogen atom or an organic group containing 1 to 20 carbon atoms which in principle has a valence of 1; and $R'_7$ shows that at least a part of $R_7$ forms an intermolecular bridging group with the other molecule described hereinabove. $R_1$ and $R_6$, $R_7$ or $R'_7$, or $R_6$ and $R_7$ or $R'_7$ may respectively form a ring directly or through the hetero atoms.

This reaction is a urea-forming reaction of the primary amino- or secondary amino-containing polymer, which is well known to those skilled in the art. Any type of such urea-forming reaction can be used in this invention if only attention is paid to the fact that an amine compound to be so reacted is a polymer.

The urea-forming agent used for this purpose includes, for example, compounds containing at least one isocyanate group, stabilized isocyanate, group, N-haloformyl group, or N-aryloxycarbonyl group.

Examples of suitable isocyanates are

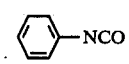 phenylisocyanate,

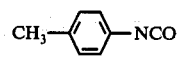 p-toluyl-isocyanate, $CH_3(CH_2)_5NCO$ n-hexyl isocyanate,

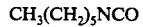 cyclohexyl isocyanate, $CH_2=CHNCO$ Vinyl isocyanate, $OCN(CH_2)_6NCO$ Hexamethylene diisocyanate,

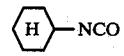 diphenyl methanediisocyanate,

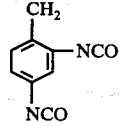 toluylene-diisocyanate,

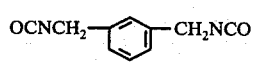 m-xylylenediisocyanate 1,5-naphthylene diisocyanate, 4,4'-diphenyletherdiisocyanate, (Desmodure AP®), and N,N',N''-2-isocyanate-4-toluyl-isocyanurate.

The stabilized isocyanates are obtained by stabilizing the above isocyanates with, for example, phenols or lactams, and when exposed to high temperatures, dissociate isocyanates and have the same reactivity with the isocyanates.

Compounds capable of yielding isocyanate groups easily by heating, for example, amineimide $$[-\overset{O}{\underset{\ominus}{C}}\overset{}{\underset{\oplus}{N}}N-(CH_3)_3],$$

can also be used, although they are not isocyanates themselves.

Compounds having N-haloformyl groups are obtained by reacting amines containing secondary amino groups with phosgene, for example, and may be called acid halides of N-carboxylic acids.

Examples of suitable N-haloformyl-containing compounds are

N-chloroformyl diethylamine, n-chloroformyl pyrrolidine

N-chloroformylpiperidine,

N,N'-bis(chloroformyl) piperazine,

N,N'-bis(chloroformyl)-2,5-dimethyl-piperazine, and

N,N'-bis(chloroformyl)-4,4'-bipiperidyl.

N-aryloxycarbonyl groups are obtained by reacting the haloformyl groups with phenols to reduce the reactivity of the haloformyl groups. Examples of compounds containing the N-aryloxycarbonyl groups are N-phenoxy carbonylpiperidine, and N,N'-bis(phenoxycarbonyl) piperazine.

When it is necessary to perform the urea-forming reaction at low temperatures, the isocyanate compounds and N-haloformyl compounds are preferred from the viewpoint of reactivity.

Almost the same care as mentioned with regard to the use of the carboxylic acid halides is required in the urea-forming reaction. Since, however, isocyanates do not form hydrogen halides as by-products, the presence of an acid acceptor is not necessary.

When a difunctional or higher polyisocyanate or poly-N-haloformyl compound is used, the polymer is readily cross-linked and gelled in solution. Therefor, such an isocyanate or N-haloformyl compound is used preferably for crosslinking in a heterogeneous system after shaping the polymer, or a method is used in which the stabilized isocyanate compound, isocyanate precursor compound or N-aryloxycarbonyl compound having reduced activity is used so that a crosslinking reaction does not proceed in solution at room temperature, but does upon heating during the shaping of the polymer.

The amount of the urea-forming agent is one sufficient to convert the amino group to a urea group according to the purpose intended just the same as in the case of the amidation and urethanization described above. Two or more types of the urea-forming agent can of course be used together.

In addition to the method involving reacting the amino-containing polymer with the urea-forming agent, the polymer containing a pendant urea group in accordance with this invention can also be prepared by a method which comprises reacting the pendant urethane-containing polymer with a primary amino- and/or secondary amine-containing compound to form a urea group, as described in paragraph [II-4] above. Especially when R₆ and R₇ are both hydrogen atoms, it is convenient to use a method which comprises reacting the active urethane-containing polymer obtained in [II-4] above with amine.

The most general cyclic group formed by the linking of R₁ with R₆ or R₇ is an N,N'-ethylene urea cyclic group

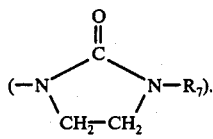

Such a cyclic group can be formed by a known method, for example, by (1) isomerization of an N,N-ethylene urea group schematically shown nelow

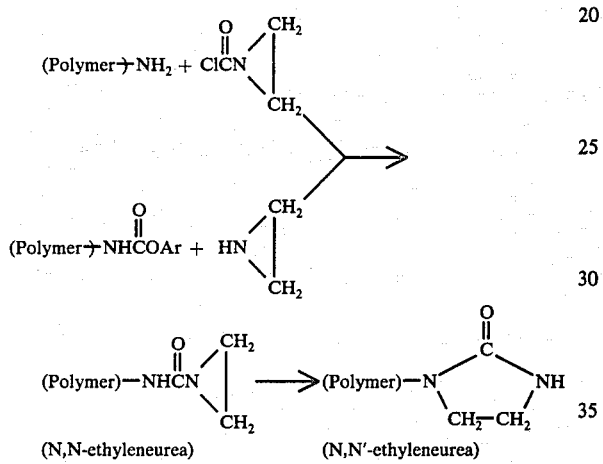

or (2) reaction of ethylene diamine and carbonate schematically shown below

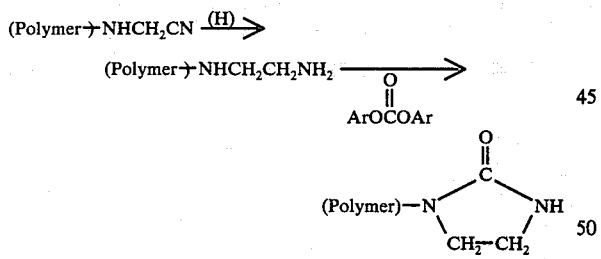

A special case of the cyclic group formed by the linking of R₁ with R₆ or R₇ is a hydrantoin ring. As described in [II-4] above, a hydrantoin group pendant to the polymer chain at its 3-position can be obtained from the urethane-containing polymer in accordance with this invention and an iminoacetic acid via an intermediate of the urea type, as schematically shown below.

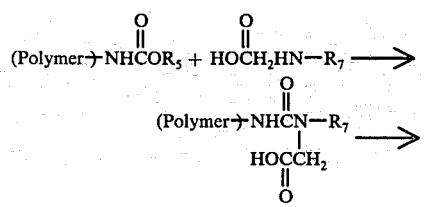

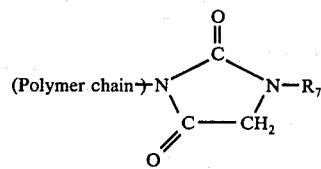

On the other hand, as described in [II-1], a polymer having an iminoacetic acid group as a pendant group is obtained by reacting the primary amino group with a chloroacetic acid, and by reacting this polymer with an isocyanate compound, a pendant hydrantoin ring bonded to the polymer chain at the 1-position of the hydantoin group can be obtained via a urea-type intermediate (hydantoic acid), as schematically shown below.

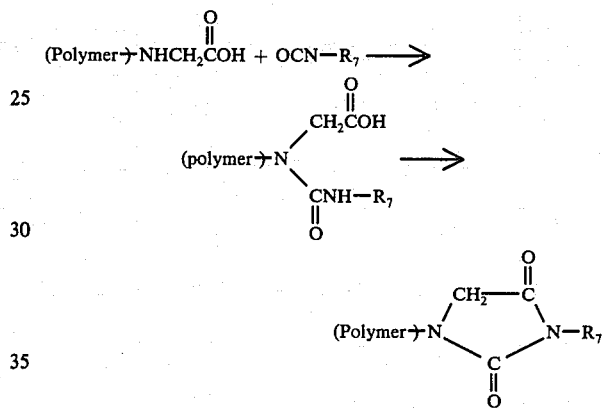

Such a hydantoin group is stable both thermally and chemically, and has moderate polarity. Accordingly, the polymers can be used especially suitably as a thermally stable resin in the form of a linear, or preferably crosslinked, polymer.

Another modification of the urea-containing polymer in accordance with this invention is one in which the molecular chains are directly linked through a urea as shown below and thus, is crosslinked.

Cross-linkage of this type can be obtained also by a heating reaction of the partially urethanized product as mentioned above, but such a crosslinkage can be introduced by direct reaction with phosgene or by reaction of two amino groups with carbon dioxide gas in the presence of a triaryl phosphite and/or diaryl phosphite.

The formation of pendant urea-containing polymers described above results in converting the amino group to a group stable to oxidation and in controlling the hydrophilicity of the polymer properly. Therefore, these polymers can be suitably used as separating membranes in reverse osmosis or ultrafiltration.

[II-6] When W₁ and/or W₂ in formula (I) is (g)

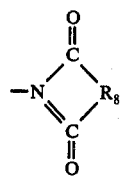

and W′₁ and/or W′₂ in formula (IV) is (g′)

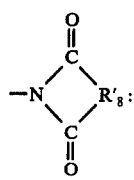

R₈ in (g) or (g′) is the same as defined hereinabove. R′₈ shows that at least a part of R₈ forms an intermolecular bridging group with the other molecule as mentioned above and therefore, partially contains a group having a valence of at least 3.

The reaction of introducing an imide group in this paragraph is the imidization of the amino group of the primary amino-containing polymer of this invention as described above. This imidization reaction itself is also well known to those skilled in the art. Any type of this known imidization reaction can be used in this invention so long as attention is paid to the fact that an amine compound to be imidized is a polymer.

This imidizing agent is generally a compound having at least one cyclic carboxylic anhydride group or a group readily convertible thereto (a precursor group). The precursor group means a group which can easily form an acid anhydride group by heating, for example, and it denotes, for example, a group obtained by ring-opening an acid anhydride with an alcohol or water.

The compounds containing cyclic carboxylic anhydride groups may be any aromatic, aliphatic and alicyclic polycarboxylic anhydrides. Compounds containing two or more acid anhydride groups can also be used. Compounds containing at least one precursor group can also be used equivalently to the compounds containing at least one acid anhydride group.

The above compounds may contain other substituents which have far lower reactivity with acid anhydride groups than with amino groups, and have lower reactivity with acid anhydride groups than the amino groups.

Examples of such compounds are phthalic anhydride, succinic anhydride, maleic anhydride, 2,3-naphthalenedicarboxylic anhydride, 2,3-pyridinedicarboxylic anhydride, cyclohexane-1,2-dicarboxylic anhydride, 4-hydroxyphthalic anhydride, 4-acetamidephthalic anhydride, trimellitic anhydride, 4-sulfophthalic anhydride, pyromellitic dianhydride, benzophenonetetracarboxylic dianhydride, butane-tetracarboxylic dianhydride, and cyclopentanetetracarboxylic dianhydeide.

There can also be used polycarboxylic acid or esters thereof obtained by partially or wholly ring-opening the above acid anhydrides with water or a lower alcohol such as methanol or ethanol.

The above compounds can be chosen as desired according to the purpose of using the final polymers. Two or more of the acid anhydrides and/or the precursors thereof may be used at the same time.

Generally, the above imide compound is used in an amount substantially equivalent to the primary amino group content of the above amino-containing polymer, but can be varied suitably according to the purpose of using the final polymer.

Preferably, the amino-containing polymer is reacted with the imidizing agent generally in the presence of an inert organic solvent capable of dissolving or at least swelling the polymer. Sometimes, the imidizing agent itself may act as a solvent.

Examples of such inert organic solvents include amide-type solvents such as N-methyl pyrrolidone, N,N-dimethyl acetamide, hexamethyl phosphoramide or tetramethyurea, sulfoxide- or sulfone-type solvents such as dimethyl sulfoxide or tetramethylene sulfone, tetrahydrofuran, methyl ethyl ketone, cyclohexanone, and acetonitrile.

The reaction is carried out generally at room temperature to a temperature of 250° C. The imide group-forming reaction proceeds as schematically shown below

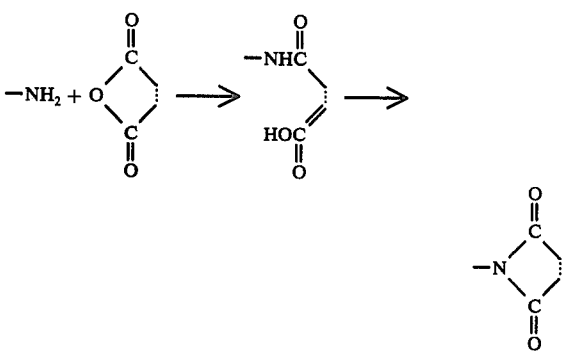

In this reaction amide-acid is first formed, and then an imide group is formed by cyclodehydration.

Formation of the amide-acid occurs readily even at temperature near room temperature, but formation of the imide group generally requires a temperature of 60° to 300° C. when it is to be done only by heating. It is sometimes preferable to carry out the reaction while distilling off the by-product water out of the reaction system.

If a solvent forming an azeotrope with water, such as toluene, benzene or xylene, is added, the water can be smoothyl removed by distillation.

An imidization promotor, such as pyridine, acetic anhydride or acylimidazolide, can also be used in the imidization reaction. Addition of the imidization promotor enables the imidization to be performed even at low temperatures.

When the compound containing at least two acid anhydride groups and/or precursors thereof is used, the resulting polymer is cross-linked during the reaction and also is likely to be gelled. Except when it is desired to obtain gelled polymers, it is preferred to employ a method wherein a polymer having the recurring unit of formula (I) is shaped, and the resulting shaped article is swollen and reacted with the compound containing at least two acid anhydride groups and/or precursors thereof, or a method wherein the compound having the precursor groups is used and reacted with the polymer during its shaping thereby to afford a cured shaped article. This is the same as in the case of (II-1) to (II-5) described above.

Needless to say, imide groups can be introduced by other known methods, such as the reaction of a stabilized isocyanate group (for example, a phenylphthalein group ... see [II-4] above) pendant to the polymer with an acid anhydride, the reaction of a urea group (see [II-5]) with an acid anhydride, or the reaction of a silylated amino group (to be described hereinbelow) with an acid anhydride.

Since imide groups are very stable both thermally and chemically, the pendant imide-containing polymers described above can be suitably used as thermally stable resins. The cross-linked polymers are especially suitable as the thermally stable resins. By using an acid anhydride group containing a carboxyl or sulfonic acid group, there can be obtained polymers having a pendant dissociable group, which can be used as polyelectrolytes, or whose hydrophilicity renders them suitable for use as reverse osmosis membranes.

[II-7] When $W'_1$ and/or $W'_2$ in formula (IV) are bridged in different forms:

The $W_1$ and/or $W_2$ or $W'_1$ and/or $W'_2$ are not limited to 1 in number, but two or more of them can be contained in the same polymer. Naturally, this generally results from the reaction of two or more compounds with the primary amino-containing polymer.

One special example of polymer including at least two types of $W'_1$ and/or $W'_2$ is that by using a reaction reagent having at least two different functional groups for the primary amino-containing polymer, $W'_1$ and/or $W'_2$ are bonded in the form of different groups, and cross-linked.

For example, when 4-chloroformylbenzenesulfonyl chloride is used as the reaction reagent, $W'_1$ and/or $W'_2$ take the form of carbonamide and sulfonamide groups which are linked by a benzene nucleus. Such two functional groups can be used especially suitably when the two functional groups have different reactivities with amino groups.

In the case of a compound containing both a sulfonic acid halide and a carboxylic acid halide, the reactivity of the sulfonic acid halide with an aromatic primary amino group differs from that of the carboxylic acid halide with the amino group. When the primary amino-containing compound is mixed with the above reactive compound in a solvent below room temperature only the carboxylic acid halide group reacts with the amino group to afford a carbonamide group, but the sulfonyl halide group remains unreacted. Hence, the polymer is not cross-linked, and remains soluble. When the solution in this state is cast, heated and dried to form a film, the sulfonyl halide reacts during the film formation to form crosslinkage between the sulfonamide group and the carbonamide group.

Examples of such compounds containing at least two functional groups are 4-chloroformylbenzyl chloride, maleic anhydride, itaconic anhydride, 4-chloro-3-nitrobenzoyl chloride, 4-chloro-3-nitrobenzenesulfonyl chloride, 4-chloromethylphenyl isocyanate, 3-maleimideethyl chloroformate, 3-chlorolformylbenzenesulfonyl chloride, 3-phenoxycarbonylbenzenesulfonyl chloride, 4-chloroformylphenyl chloroformate, 4-chloroformylphenyl isocyanate, N-(4-chloroformylphenyl)-o-phenylurethane, 4-chlorosulfonylphenyl chloroformate, 4-chlorosulfonylphenyl isocyanate, 4-isocyanatephenyl chloroformate, 4-chloroformylphthalic anhydride, 4-phenyloxycarbonylphthalic anhydride, 4-chlorosulfonylphthalic anhydride, 4-chlorocarbonyloxyphthlic anhydride, and 4-phenoxycarbonyliminophthalic anhydride.

In the case of a reactive compound having at least two functional groups which although giving $W'_1$ of the same kind, have very different reactivities, for example, monomethyl terephthalate monochloride, the crosslinking reaction can sometimes be carried out advantageously in a similar fashion.

[II-8] When $W_1$ and/or $W_2$ in formula (I) or $W'_1$ and/or $W'_2$ in formula (IV) is other than those described above:

In paragraph [II-1] to [II-6] above, we have described especially useful pendant groups derived from the primary amino groups, the method for derivation, the reaction reagents for use in derivation, and the properties, characteristics and utility of the resulting polymers. However, pendant groups $W_1$, $W_2$, $W'_1$ and $W'_2$ derived from the primary amino group and being included within the scope of this invention are in no way limited to the above illustrated species, but include groups derived from amino groups by reactions known to those skilled in the art. Some of major examples of the other groups are described below.

[II-8-1] Cyclic groups:

A hydantoin group obtained via urea or urethane is especially useful, as described in [II-4] and [II-5] above. A cyclic carboxylic sulfonic mixed imide ring

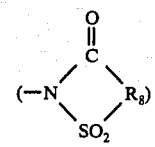

having a structure similar to the cyclic dicarbonimide described in [II-6] can also be introduced, but is less advantageous than the cyclic dicarbonimide ring. According to the method of Rosenmund [Angew. Chem., 80, 702 (1968)], a pyrrole ring

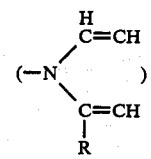

can also be introduced. [II-8-2] Sulfur-containing groups:

By using a corresponding thiocarbonyl compound instead of the carbonyl compounds used in [II-2], [II-4] and [II-5], a group having a

bond instead of

bond can be obtained. For example, by using a thioisocyanate instead of the isocyanate compound, a thiourea group or a thiohydantoin group can be introduced. A thiolurethane group can be introduced by using chlorothiol formate

instead of chloro-formate.

Furthermore, a thiourea group, a dithiocarbamic acid group, and a sulfenylamide group, etc. can be introduced by performing the following reactions which are characteristic because of different behaviours of the thiocarbonyl compounds from the corresponding carbonyl compounds.

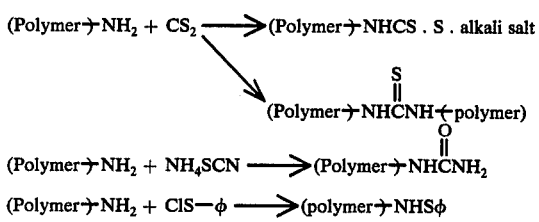

A thionyl amine group or N-sulfinyl amine group (—N=SO) obtained by the reaction of a primary amino group with thionyl chloride can be introduced. These groups are extremely reactive, and can induce various known reactions [see, for example, Tetrahedron 18, 1527 (1962)].

[II-8-3] Hetero element-containing groups such as a phosphorus-containing group or a silyl-containing group:

It is well known that amino groups can be converted to phosphonamide or phosphoramide groups by various phosphoric acid halides or phosphonic acid halides. This can be applied to the polymers in accordance with this invention. Such phosphonating agents include, for example, phosphorus oxychloride, o-phosphoric acid diester monochloride, and benzenephosphonyl dichloride. Generally, phosphorus-containing polymers have superior fire retardancy, and the polymers of this invention containing such phosphorus-containing groups can be used as fire-retardants. Primary amino groups can be converted to silyl-containing groups by reacting them with chlorosilanes such as trimethyl chlorosilane. These silazine groups are active and have greater nucleophilicity than the original amino groups. For example, it is known that such silazine groups are rendered very reactive with electron-attracting reagents such as isocyanate compounds or cyclic acid anhydeides to give urea, for example, which is partly substituted with a silyl group. Thus, the polymers of this invention containing silyl-containing groups can be used as reactive polymers.

[II-8-4] Diazotization, nitrosation, and the formation of azide group:

Reaction of aromatic primary amino groups with nitrous acid affords diazonium salt groups, and reaction of secondary amines with it yields N-nitroso compounds.

The diazonium salts have high reactivity, and the polymers of this invention containing the diazonium salt groups can be used as various reactive polymers. For example, these polymers can be used as various photosensitive resins by utilizing their photo-decomposability, oxygen-fixing carriers by reaction with an active group of oxygen, or polymeric azo dyes by utilizing a coupling reaction.

The diazonium salt group is converted to an azide group by reaction with sodium azide, for example. This group is also active, and the polymers of this invention containing this group can also be used as photosensitive resins.

[II-8-5] Oxidation:

Oxidation of aromatic primary amino groups yields diazo groups or diarylamine-type groups, and it is known that further oxidation converts them to various nitrogen-containing rings. These oxidized products are generally colored deep, and can be used, for example, as pigments.

Oxygen oxidation of the amino-containing polymers of this invention using, for example, a chromic acid or manganic acid salt or a copper-tertiary amine complex as a catalyst can yield oxidation products which can be used as polymeric pigments and organic semiconductors. In particular, by oxidizing shaped articles, such as films or fibers, of the amino-containing polymers of this invention in this manner, the shaped articles themselves can be colored or formed into semiconductors. This is one of the greatest features of this invention.

[II-8-6] Others:

It is known, as hereinabove stated in connection with the alkylation, that a primary amino group and an aldehyde or ketone group can form a Schiff base

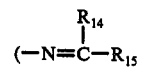

wherein $R_{14}$ and $R_{15}$ represent a hydrocarbon group which in principle has a valence of 1, and may be linked together to form a cyclic group) preferably in the presence of an acid or base. Accordingly, reaction of the primary amino-containing polymer of this invention with a carbonyl compound containing at least one aldehyde or ketone group can give polymers containing a Schiff base group as a pendant group or a crosslinking groups.

Examples of such agents for forming Schiff bases include acetaldehyde, crotonaldehyde, acetone, methyl ethyl ketone, glyoxal, benzaldehyde, and isophthaladehyde.

By introducing Schiff bases, the amino groups can be protected from oxidation or other reactions while maintaining their basicity. This means that the Schiff base group can be returned to the amino group with relative ease, and can be converted to a secondary amino group by reduction. Since the Schiff base has the ability to form a chelate with heavy metal ions, the polymers containing the Schiff base groups can be used as polymer ligands.

The reactions described in paragraphs [II-1] to [II-8] above are known per se as reactions of primary amino groups, and are described in a number of literature references, typical examples of which are listed below. The specific reactions disclosed in these references can be applied to the reaction of the primary amino groups of the primary amino-containing polymers of this invention as described above after making any modification which those skilled in the art could easily perform.

(1) W. J. Hickinbottom and Z. E. Jolles, in "Chemistry of Carbon Compounds" (Ed. E. H. Rodd), Elsevier Publishing Co., New York, 1954, pages 159 and 249.

(2) R. B. Wagner, H. D. Zook, "Synthetic Organic Chemistry," John Wiley and Sons, New York, 1961.

(3) B. C. Challis and A. R. Butler, in "The Chemistry of the Amino Group" (Ed. S. Patai), Interscience Publishers, New York, 1968, page 277.

(4) C. A. Buehler and D. E. Pearson, "The Survey of Organic Syntheses," Wiley Interscience, New York, 1970

[III] Characteristics and Application of the Aromatic Polymers of This Invention Containing Primary Amino Groups and/or Substituted N-Containing Groups:

Aromatic polymer containing primary amino groups and/or substituted N-containing groups in accordance with this invention, if they are linear, are soluble in polar solvents although the type of the solvent differs according to the type of the N-containing group. Various articles such as coatings, films, fibers and laminated structures with other materials can be shaped from solutions of the polymers in these solvents. Examples of such polar solvents generally used are aprotic polar solvents such as N-methyl pyrrolidone, N-methyl caprolactam, N,N-dimethyl acetamide, dimethyl formamide, N,N-dimethyl propionamide, hexamethyl phosphoramide, tetramethylurea, tetramethylene sulfone, or dimethyl sulfoxide. Depending upon the type of the N-containing group, such polar solvents as acetone, methyl ethyl ketone, methyl isobutyl ketone, acetophenone, nitrobenzene, ethyl acetate, acetonitrile, nitromethane, nitropropane, chloroform, water, ethanol, cresol, or chlorophenol or their mixtures can also be used.

Depending upon the type of polymer, it can be shaped in the molten or softened state by such means as press-forming.

Shaped articles of crosslinked polymers of this invention can be obtained by reacting a highly active crosslinking group-forming agent with shaped articles of the linear polymers in the heterogeneous state, or shaping the linear polymers together with the crosslinking group-forming agent and inducing a crosslinking reaction during or after the shaping.

When the substantially linear amino-containing polymers and the substantially linear polymers derived therefrom and containing linear mono- and di-substituted N-containing groups as pendant groups are directly used as base polymers for the various shaped articles described above, these polymers should have a degree of polymerization at least sufficient for film formation. When the above polymers are used as final shaped articles in the at least partially crosslinked state, they can have various degrees of polymerization, ranging from low degrees of oligomers to high degrees which render the polymers film-forming. Since, as stated hereinabove, the characteristic feature of the polymers of this invention contain pendant groups having various functionalities and reactivities, it is not altogether necessary for even substantially linear polymers to have film-forming ability, but polymers with a wide range of molecular weights can be used according to the functionalities or reactivities of the pendant groups and their uses.

The polymers of this invention having primary amino groups or mono- or di-substituted N-containing groups, when being substantially linear and soluble, have an inherent viscosity, as measured at 30° C on an N-methyl pyrrolidone or at least 95% by weight conc. sulfuric acid solution of the polymer in a concentration of 0.5 g/100 ml., of 0.05 to 2.0 or even more. Preferably, the polymers have an inherent viscosity of at least 0.1, especially at least 0.2. Those having an inherent viscosity of about 0.4 to 1.0 have especially good processability, and are suitable, for example, for shaping into films.

The details of the characteristics of the polymers of this invention, and their applications have been described hereinbefore. Generally, the polymers in accordance with this invention are especially suitable as thermally stable polymers and as separating membranes for reverse osmosis or ultrafiltration. This will be described below at some length.

[III-1] Application as thermally stable polymers:

Suitable substituted N-containing groups for obtaining thermally stable polymers are, for example, carbonamide, sulfonamide, imide, hydrantoin, oxazolidone, and ethyleneurea groups. Of these, the carbonamide, imide, and hydantoin groups are especially preferred. Those containing no bond weak to heat in which the portion other than the above functional group is composed of aromatic groups are preferred. Groups constituting the main chain preferably have as large an aromatic group content as possible. Structures composed only of thermally stable bridging groups such as a sulfone, ketone, amide, ester or heterocyclic group and aromatic groups are especially preferred. $Y_1$ and $Y_2$ may be

and —O— in the thermally stable polymers, but preferably, $Y_1$ and $Y_2$ are —O—.

Cross-linked polymers especially exhibit the characteristics of the polymers of this invention as thermally stable resins. In particular, it is preferred to form a crosslinkage by heat-treatment during or after the shaping of the polymers.

The main chain structure of the polymers of this invention has good solubility and lends itself to easy processing. By crosslinking such polymers after shaping by utilizing the reactivity of the pendant groups, such properties of the polymers as the melting point, softening point, solvent resistance, and thermal stability, etc. can be greatly improved. These polymers have both processability and thermal stability, and can find a wide range of applications for electric insulation and machine parts, etc. in the form of a coating, film, fiber or other shaped articles.

[III-2] Application as permselective membranes:

In order to use the polymers of this invention as permselective membranes for ultrafiltration and reverse osmosis whereby water and the solute are separated from each other by pressure driving, the polymers must have moderate hydrophilicity and contain a rigid main chain. N-containing groups suitable for affording such polymers are primary, secondary and tertiary amino, iminoacetic acid, carbonamide, sulfonamide, hydantoin, urea and urethane groups, for example. The sulfonamide, carbonamide, urea and urethane groups are especially preferred.

The main chain is preferably composed of rigid groups having a large content of aromatic groups, alicyclic groups or heterocyclic groups. $Y_1$ and $Y_2$ may be both

and —O—, but preferably the former.

The polymers for use as separating membranes are required to have the ability to form self-supporting films, and preferably to have an inherent viscosity of at least 0.4, especially at least 0.6.

Permselective membranes can be formed from a solution of such a polymer in a solvent consisting mainly of an organic solvent. The organic solvent used for this purpose is a compound which is inert to the polymer and has the ability to substantially dissolve the polymer. Examples of suitable organic solvents are amide-type solvents such as N-methyl pyrrolidone, N-methyl caprolactam, N,N-dimethyl acetamide, hexamethyl phosphoramide or tetramethylurea, sulfoxide-type solvents such as dimethyl sulfoxide, and phenol-type solvents such as phenol, cresol or chlorophenol. Other solvents can also be used depending upon the type of the polymer. These solvents can be used either alone or as an admixture of two or more.

In the preparation of the polymer solution using such an organic solvent, suitable diluent can be used to adjust the solubility, drying property or coagulability, etc. of the polymer. If the polymer can be obtained as a uniform solution in the process of its preparation, the solution can be directly used as a dope for film formation.

The permselective membranes thus formed are molded into various forms such as flat plates, tubes or hollow filaments according to the desired form in which they are used. The permselective membranes are preferably as thin as possible from the viewpoint of the efficiency of permeation, but also are required to have sufficient mechanical strength in order to withstand high pressures.

With a view to meeting these contradictory requirements, composite membranes composed of a porous support and an ultrathin membrane formed thereon and anisotropic membranes developed previously by Loeb et al. which have a double structure consisting of a thin dense skin layer and a thick porous layer. The details of the method for prepearing these membranes are disclosed, for example, in U.S. Pat. No. 3,567,632.

The polymers of this invention can be formed into films by the same method as that described in this Patent. After film formation, a crosslinkage can be formed in the films by introducing suitable crosslinking groups using a polyfunctional compounds as described hereinabove to a suitable degree of crosslinking in order to increase the anti-compaction of the films.

Whilst we have described the utility of the novel polymers of this invention above with particular reference to thermally stable polymers and permselective membranes, it should be understood that the utility of the polymers of this invention is in no way limited to the above-exemplified uses.

As described hereinabove, the polymers of this invention can contain N-containing pendant groups having various functionalities and reactivities in the desired concentrations. Hence, according to the number and type of these pendant groups, the polymers of this invention can have various properties such as hydrophilicity, oxidative reducibility, photosensitivity, color formability, the ability to form coordination bonds, or ion dissociability, and also can be not only linear polymers but also three-dimensional network polymers having cross-linkages in the desired density. Hence, the polymers can be used for various end uses and as compositions, shaped articles or composite structures adapted to such final uses, according to these functionalities and/or reactivities.

The following Referential Examples and Examples illustrate the present invention in greater detail.

Part A contains the Referential Examples which illustrate the nitro-containing aromatic polymers used to produce the novel nitrogen-containing aromatic polymers of this invention, and the method for their preparation. As previously stated, the nitrogen-containing aromatic polymers of this invention are not limited to those prepared from the polymers obtained in these Referential Examples.

Part B illustrates the novel nitrogen-containing aromatic polymers of this invention, the method for their preparation, and the properties of these polymers.

Unless otherwise specified, the inherent viscosity ($\eta_{inh}$) of the polymer is measured at 30° C. on an N-methyl pyrrolidone solution of the polymer in a concentration of 0.5 g/100 ml.

PART A (PREPARATION OF NITRO-CONTAINING AROMATIC POLYMERS)

Referential Example 1

In a 300 ml. three-necked flask equipped with a nitrogen introducing tube, a cooler and a stirrer, 10.0 g (0.05 mol) of 4,4'-diaminodiphenyl ether and 10.6 g (0.1 mol) of sodium carbonate were dissolved in 120 ml. of dimethyl sulfoxide. The sodium carbonate remained insoluble in the solution. With stirring, 18.85 g (0.05 mol) of 3,3'-dinitro-4,4'-dichlorodiphenylsulfone was poured into the solution. The solution became reddish brown. The temperature was raised to 120° C., and the reaction was continued for 20 hours. A reddish brown viscous solution was obtained.

The solution was poured into water, and the precipitate was thoroughly washed and dried to afford a reddish orange powder. This polymer had an inerent viscosity ($\eta_{inh}$) of 1.00, and was soluble in amide-type solvents such as N-methyl pyrrolidone, N,N-dimethyl acetamide, or dimethyl formamide, dimethyl sulfoxide, tetramethylene sulfone, nitrobenzene, tetramethyleneurea, and pyridine.

A film prepared from an N-methyl pyrrolidone solution of the polymer was tough, and its infrared absorption spectrum showed an absorption ascribable to the imine at 3350 cm$^{-1}$, and an absorption ascribable to the nitro group at 1560 cm$^{-1}$.

The elemental analysis values for this polymer were as follows:

Found: C 56.14%, H 3.0%, N 10.95%, S 6.72%; Calculated: C 57.13%, H 3.17%, N 11.11%, S 6.35%.

From the results of the infrared absorption spectrum and the elemental analysis values, the polymer was found to be polyimine having the following recuring unit

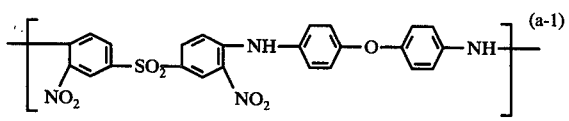

(a-1)

A thermogravimetrical analysis of the polymer showed that there was scarcely any weight decrease, nor was it softened, in atmospheric air up to a temperature of 300° C. at a temperature raising rate of 5° C/min.

A 15.0% by weight N-methyl pyrrolidone solution of this polymer was cast on a glass plate, and dried at 150° C. for 20 minutes and at 220° C. for 30 minutes to form a film having a thickness of 50 microns. A rectangular piece with a width of 1 cm was cut off from this film. It was found to have a tensile strength of 10 Kg/mm$^2$ and an elongation of 10% by meas of an Instron Tensile Tester.

REFERENTIAL EXAMPLE 2

The various raw materials shown in Table 1 were polymerized in the same way as in Referential Example 1 to form polymers having recurring units (a-2) to (a-10).

Where there is a reference to ($H_2SO_4$) in the column of [$\eta_{inh}$] in Table 1 [polymer (a-2)], the inherent viscosity was measured in conc. sulfuric acid because the polymer (a-2) was insoluble in amide-type solvents.

Table 1

| | |
|---|---|
| Raw Materials | [structure: 1,2-difluoro-4,5-dinitrobenzene] |
| | [structure: $H_2N$—C$_6$H$_4$—O—C$_6$H$_4$—$NH_2$] |
| Polymer | [structure (a-2)] |
| $\eta_{inh}$ | 0.23 ($H_2SO_4$) |
| Raw Materials | [structure: 2,2'-dichloro-3,3'-dinitrobiphenyl] |
| | [structure: $H_2N$—(H)—$CH_2$—(H)—$NH_2$ (cis/trans mixture)] |
| Polymer | [structure (a-3)] |
| $\eta_{inh}$ | 0.38 |
| Raw Materials | [structure: bis(4-chloro-3-nitrophenyl)sulfone] (0.1 mol) |
| | [structure: $HN(CH_3)$—C$_6$H$_4$—$NH_2$ (0.02 mol)]   [structure: $H_2N$—C$_6$H$_4$—O—C$_6$H$_4$—$NH_2$ (0.08 mol)] |
| Polymer | [structure (a-4), two recurring units of 0.8 and 0.2] |
| $\eta_{inh}$ | 0.42 |

Table 1-continued

Raw Materials (a-5):

Cl–C₆H₃(NO₂)–SO₂–C₆H₃(NO₂)–Cl (0.1 mol)

H₂N–C₆H₄–O–C₆H₄–NH₂ (0.02 mol)   HO–C₆H₄–C(CH₃)₂–C₆H₄–OH (0.08 mol)

Polymer (a-5):

$+\!\!\left[O\text{–}C_6H_3(NO_2)\text{–}SO_2\text{–}C_6H_3(NO_2)\text{–}O\text{–}C_6H_4\text{–}C(CH_3)_2\text{–}C_6H_4\text{–}O\right]_{0.8}$ $+\!\!\left[NH\text{–}C_6H_4\text{–}SO_2\text{–}C_6H_4\text{–}NH\text{–}C_6H_4\text{–}O\text{–}C_6H_4\right]_{0.2}$ $\eta_{inh}$ 0.90

Raw Materials (a-6):

Cl–C₆H₃(NO₂)–SO₂–C₆H₃(NO₂)–Cl

HO–C₆H₄–SO₂–C₆H₄–OH

Polymer (a-6):

$+\!\!\left[O\text{–}C_6H_3(NO_2)\text{–}SO_2\text{–}C_6H_3(NO_2)\text{–}O\text{–}C_6H_4\text{–}SO_2\text{–}C_6H_4\right]\!\!+$ (a-6)

$\eta_{inh}$ 0.80

Raw Materials (a-7):

Cl–C₆H₃(NO₂)–SO₂–C₆H₃(NO₂)–Cl

HO–C₆H₃(NO₂)–SO₂–C₆H₃(NO₂)–OH

Polymer (a-7):

–O–C₆H₃(NO₂)–SO₂–C₆H₃(NO₂)–O–C₆H₃(NO₂)–SO₂–C₆H₃(NO₂)– (a-7)

$\eta_{inh}$ 0.48

Raw Materials (a-8):

Cl–C₆H₃(NO₂)–CO–O–C₆H₄–C(CH₃)₂–C₆H₄–O–CO–C₆H₃(NO₂)–Cl

H₂N–C₆H₄–O–C₆H₄–NH₂

Polymer (a-8):

$+\!\!\left[NH\text{–}C_6H_3(NO_2)\text{–}CO\text{–}O\text{–}C_6H_4\text{–}C(CH_3)_2\text{–}C_6H_4\text{–}O\text{–}CO\text{–}C_6H_3(NO_2)\text{–}NH\text{–}C_6H_4\text{–}O\text{–}C_6H_4\right]\!\!+$ (a-8)

$\eta_{inh}$ 0.65

Table 1-continued

Raw Materials:

Cl—(ring)(O₂N)—C(=O)NH—(ring)—O—(ring)—NHC(=O)—(ring)(NO₂)—Cl

H₂N—(ring)—O—(ring)—NH₂

Polymer:

[—NH—(ring)(NO₂)—C(=O)—NH—(ring)—O—(ring)—NH—C(=O)—(ring)(NO₂)—NH—(ring)—O—(ring)—]  (a-9)

η_inh   0.36

Raw Materials:

Cl—(ring)(O₂N)—C(=O)—N(piperazine)N—C(=O)—(ring)(NO₂)—Cl

H₂N—(ring)—O—(ring)—NH₂

Polymer:

[—NH—(ring)(O₂N)—C(=O)—N(piperazine)N—C(=O)—(ring)(NO₂)—NH—(ring)—O—(ring)—]  (a-10)

η_inh   0.45

REFERENTIAL EXAMPLE 3

In a three-necked flask equipped with a nitrogen introducing tube, a distilling device and a stirrer, 10.9 g (0.1 mol) of p-aminophenol, 120 ml. of dimethyl sulfoxide and 100 ml. of chlorobenzene were mixed, and 0.1 mol of sodium hydroxide was added as a 50% aqueous solution to the resulting solution. With stirring, water was removed by azeotropic distillation in an atmosphere of nitrogen. The temperature was further raised to 155° to 160° C. to distill off chlorobenzene. There was obtained an anhydrous dimethyl sulfoxide solution of a sodium salt of p-aminophenol. The distilling device was replaced by a cooler.

To the resulting solution were added 21.2 g (0.2 mol) of sodium carbonate and 37.70g (0.1 mol) of 3,3'-dinitro-4,4'-dichlorodiphenylsufone. The temperature was gradually raised, and the reaction was performed at 120° to 140° C. for 10 hours to afford a light yellow viscous solution.

The solution was poured into water. The precipitate was thoroughly washed, and dried to afford a polymer as a light yellow powder. The resulting polymer had an inherent viscosity of 0.49, and was soluble in amide-type solvents such as N-methyl pyrrolidone or dimethyl formamide. A tough film could be prepared from an N-methyl pyrrolidone solution of the polymer. The elemental analysis values of the polymer were as follows:

Found: C 51.96, H 2.98%, N 10.01%, S 7.54%; Calculated: C 52.30, H 2.69%, N 10.17%, S 7.76%.

From the results of the infrared absorption spectrum and the elemental analysis values, the polymer obtained was found to be polyether imine having the following recurring unit

[—NH—(ring)(NO₂)—SO₂—(ring)(NO₂)—O—(ring)—]  (a-11).

According to a thermogravimetric analysis, this polymer hardly showed any decrease in weight up to a temperature of 350° C. at a temperature raising rate of 5° C./min. in an atmosphere of nitrogen.

REFERENTIAL EXAMPLE 4

The various raw materials shown in Table 2 were polymerized in the same way as in Referential Example 3 to form polymers having recurring units (a-12) and (a-13).

Table 2

Raw Materials:

Cl—(ring)(O₂N)—C(=O)—(ring)—O—(ring)—C(=O)—(ring)(NO₂)—Cl

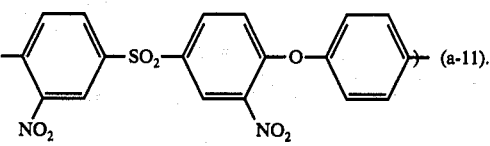

HO—(ring)—NH₂

Table 2-continued

| Polymer |  (a-12) |
|---|---|
| ηinh | 0.45 |

| Raw Materials | 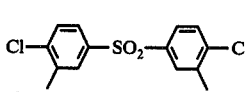 |
|---|---|
| | (0.1 mol)     (0.9 mol) |
| | 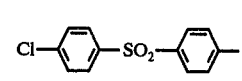 |
| Polymer | 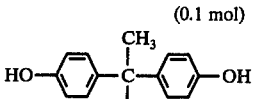 |
| | 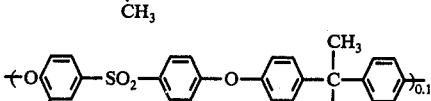 (a-13) |
| ηinh | 0.43 |

REFERENTIAL EXAMPLE 5

In a 100 ml. three-necked flask equipped with a nitrogen introducing tube, a cooler, and a stirrer, 2.00 g (0.01 mol) of 4,4'-diaminodiphenyl ether and 1.57 g (0.02 mol) of lithium carbonate were dissolved in 25 ml. of Npmethyl pyrrolidone. The lithium carbonate remained undissolved in the solution. While cooling the reaction system with an ice bath, 2.20 g (0.01 mol) of 3-nitro-4-chlorobenzoyl chloride was poured into the solution. The reaction solution turned green. Stirring was continued for about 1 hour on an ice bath, and then the temperature was raised to 100° C. The reaction was performed for another 10 hours at this temperature, when the reaction mixture turned deep red to form a viscous solution.

The solution was poured into a large quantity of water. The precipitate was washed fully, and dried to afford a polymer as a red powder having an inherent viscosity of 0.51. The polymer was soluble in amide-type solvents such as N,N-dimethyl acetamide, and dimethyl sulfoxide.

The infrared absorption spectrum of the polymer showed characteristic absorptions at 1660 cm$^{-1}$ and 1530 cm$^{-1}$ ascribable to the amide group.

The elemental analysis values of the polymer were as follows:

Found: C 65.43%, H 3.97%, N 11.90%; Calculated: C 65.69%, H 3.78%, N 12.10%.

From the results of the elemental analysis and the infrared absorption spectrum, the resulting polymer was identified as a polymer having the following recurring unit

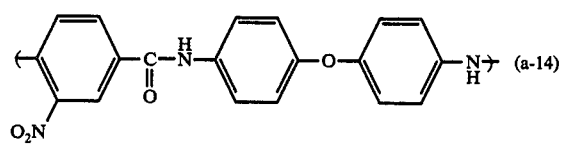 (a-14)

REFERENTIAL EXAMPLE 6

The various raw materials shown in Table 3 were polymerized in the same way as in Referential Example 4 to form polymers having recurring units (a-15) and (a-16).

Table 3

| Raw Materials | |
|---|---|
| | Cl—⟨⟩—SO₂Cl, O₂N |
| | H₂N—⟨⟩—O—⟨⟩—NH₂ |
| Polymer | ⁺N—⟨⟩—SO₂NH—⟨⟩—O—⟨⟩⁺ (a-15), H, O₂N |
| ηinh | 0.41 |

Table 3-continued

| Raw Materials | |
|---|---|
| | Cl—⟨⟩—COCl with O$_2$N (0.5 mol)    Cl—⟨⟩—SO$_2$—⟨⟩—Cl with O$_2$N, NO$_2$ (0.5 mol) |
| | H$_2$N—⟨⟩—O—⟨⟩—NH$_2$ |
| Polymer | $\left(\text{N}\overset{H}{-}\text{⟨⟩}\overset{O}{\underset{\|}{-}C}\overset{H}{-N}\text{—⟨⟩—O—⟨⟩}\right)_{0.5}$ |
| | $\left(\overset{H}{N}\text{—⟨⟩—SO}_2\text{—⟨⟩—}\overset{H}{N}\text{—⟨⟩—O—⟨⟩}\right)_{0.5}$ (a-16) with O$_2$N, NO$_2$ |
| $\eta_{inh}$ | 0.52 |

REFERENTIAL EXAMPLE 7

2.0 g of polyether sulfone having an inherent viscosity of 0.48 obtained by reacting a sodium salt of bisphenol A and 4,4'-dichlorodiphenyl sulfone in dimethyl sulfoxide and precipitating the reaction product from water was suspended in 50 ml. of glacial acetic acid, and the suspension was stirred in an ice bath held at 0° to 5° C. To the suspension was added 25 ml. of fuming nitric acid (d=1.50) gradually. After the addition, the mixture was stirred for an additional 3 hours at 5° C. There was observed a decrease in the amount of the insoluble part. The suspension was added to a large excess of ice water. The polymer precipitated was filtered, stirred for 2 hours in an aqueous solution of sodium carbonate, washed with water, and dried to afford a light brown powder. The resulting polymer had an inherent viscosity of 0.39, and was soluble in amide-type solvents such as N-methyl pyrrolidone or N,N-dimethyl acetamide, and dimethyl sulfoxide.

A film prepared from an N-methyl pyrrolidone solution of the polymer was self-supporting, and its infrared absorption spectrum showed absorptions ascribable to the nitro group at 1530 cm$^{-1}$ and 1350 cm$^{-1}$.

The elemental analysis values of the polymer were as follows:

Found: C 69.82%, H 4.92%, N 1.39%, S 6.83%.

These values corresponded well with the values calculated on the assumption that the original polymer contained about 0.46 nitro group for each skeleton.

Calculated: C 70.00%, H 4.70%, N 1.39%, S 6.92%.

The polymer was identified as a polymer having the following recurring unit

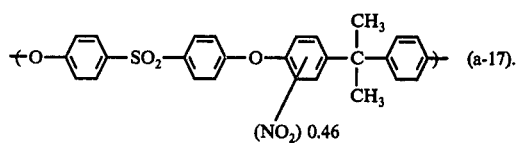

REFERENTIAL EXAMPLE 8

In a three-necked flask equipped with a nitrogen introducing tube, a cooler and a stirrer, 2.00g (0.01 mol) of 4,4'-diaminodiphenyl ether and 1.57 g (0.02 mol) of lithium carbonate were dissolved in 25 ml. of N-methyl pyrrolidone. At this time, the lithium carbonate did not dissolve completely. While cooling the reaction system with an ice bath, 1.01 g (0.005 mol) of isophthaloyl chloride and 1.88 g (0.005 mol) of 4,4'-dichloro-3,3'-dinitrodiphenyl sulfone were added. After stirring for about 1 hour on an ice bath, the reaction temperature was raised to 100° C., and the reaction was continued for another 10 hours at this temperature to afford a red viscous solution. The solution was poured into a large quantity of water to form a polymer as a red solid having an inherent viscosity of 0.64. The polymer was suluble in amide-type solvents, dimethyl sulfoxide and tetramethylene urea. The infrared absorption spectrum of the polymer showed absorptions ascribable to the amide group at 1650 cm$^{-1}$ and 1530 cm$^{-1}$. From the infrared absorption spectrum and elemental analysis values, the polymer was identified as a polymer having the following recurring unit

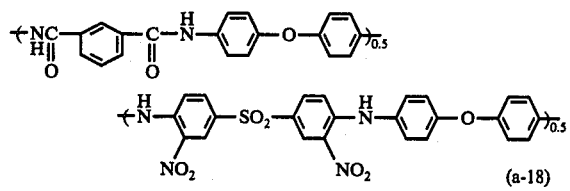

REFERENTIAL EXAMPLE 9

Referential Example 8 was repeated except that 1.25g (0.005 mol) of 4,4'-diphenylmethane diisocyanate was used instead of isophthaloyl chloride. The inherent viscosity of the polymer was 0.88.

From the infrared absorption spectrum and elemental analysis values of this polymer, it was identified as a polymer having the following recurring unit

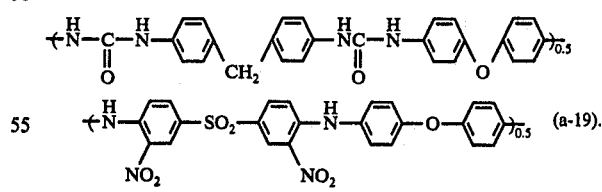

REFERENTIAL EXAMPLE 10

In a three-necked flask equipped with a nitrogen introducing tube, a calcium chloride tube, and a stirrer, 2.00 g (0.01 mol) of 4,4'-diaminodiphenyl either was dissolved in 25 ml. of N-methyl pyrrolidone. The solution was fully cooled on an ice bath. To the solution was added 0.35 g (0.002 mol) of m-aminobenzoyl chloride hydrochloride, and the mixture was stirred further for about 1 hour. 1.96g (0.025 mol) of lithium carbonate was added to the mixture, and after stirring for 10 minutes, 3.77 g (0.01 mol) of 4,4'-dichloro-3,3'-dinitrodiphenylsulfone was added. The temperature was raised to 100° C., and the polymerization reaction was continued at this temperature for 10 hours to afford a red viscous solution. When the solution was poured into a large quantity of water, a polymer was obtained as a red powder. The polymer had an inherent visocisty of 0.53. The infrared absorption spectrum of the polymer showed absorptions ascribable to the amide group at 1650 cm$^{-1}$ and 1530 cm$^{-1}$. From the results of the elemental analysis and infrared absorption spectrum, this polymer was identified as a polymer having the following recurring unit The solution was poured into a large quantity of water to afford a polymer as a red powder having an inherent viscosity of 0.52. The infrared absorption spectrum of this polymer showed characteristic absorptions ascribable to the imide group at 1780 cm$^{-1}$ and 1720 cm$^{-1}$ and an absorption ascribable to the imino group at 3350 cm$^{-1}$. From the results of the elemental analysis values and infrared absorption spectrum, this polymer was identified as a polymer having the following recurring unit

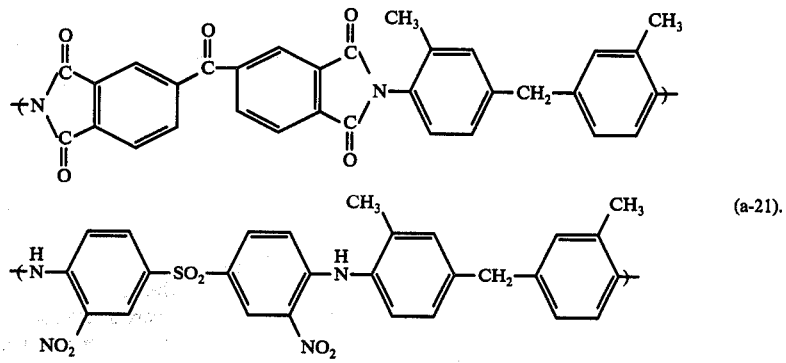

(a-21).

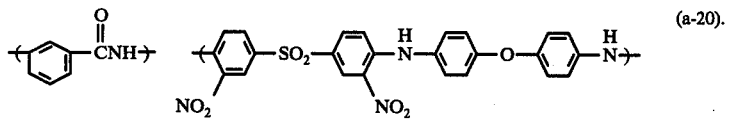

(a-20).

REFERENTIAL EXAMPLE 11

In a three-necked flask equipped with a nitrogen introducing tube, a distilling device and a stirrer, 11.32g (0.05 mol) of 4,4'-diamino-3,3'-dimethyldiphenylmethane was dissolved in 130 ml. of N-methyl pyrrolidone. To the solution 3.22g (0.01 mol) of benzophenonetetracarboxylic anhydride and 30 ml. of xylene were added. The mixture was further heated at 180° to 200° C. to distill off the xylene and to remove water by azeotropic distillation. After a theoretical amount of water distilled out, the distilling device was replaced by a cooler equipped with a calcium chloride tube. The reaction system was cooled to 60° C., and with stirring, 7.84g (0.1 mol) of lithium carbonate and 15.09g (0.04 mol) of 4,4'-dichloro-3,3'-dinitrodiphenylsulfone were added, and the mixture was heated. Stirring was continued for 10 hours at 100° C. to afford a red viscous solution.

REFERENTIAL EXAMPLE 12

In a three-necked flask equipped with a nitrogen introducing tube, a cooler and a stirrer, 0.90 g (0.01 mol) of 1,4-butanediol and a catalytic amount of triethylene diamine and tin (II) octenate were dissolved in 50 ml. of N-methyl pyrrolidone under ice cooling. Then, 5.02 g (0.02 mol) of diphenylmethane-4,4'-diisocyanate was added. After stirring for about 1 hour, 4.01 g (0.02 mol) of 4,4'-diaminodiphenyl ether was added. Stirring was continued for another one hour. Then, 3.77 g (0.01 mol) of 4,4'-dichloro-3,3'-dinitrodiphenylsulfone and 1.57 g (0.02 mol) of lithium carbonate was added to the reaction system. The ice bath was replaced by an oil bath, and the mixture was stirred at 120° C. for 10 hours with stirring. After the reaction, the reaction mixture was added to a large quantity of water to afford a polymer having an inherent viscosity of 0.38. The infrared absorption spectrum of this polymer showed absorptions ascribable to the urethane and urea groups in the vicinity of 1730 cm$^{-1}$ to 1700 cm$^{-1}$.

From the results of the infrared absorption spectrum and the elemental analysis, this polymer was identified as a polymer having the following recurring unit

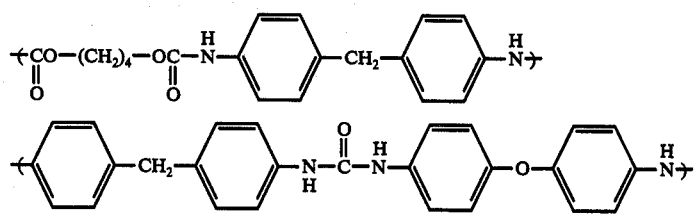

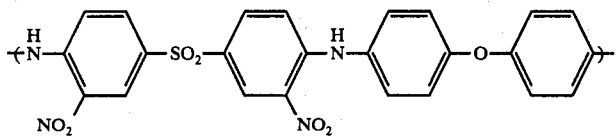

REFERENTIAL EXAMPLE 13

1.07 g of a novolak-type phenol-formaldehyde resin having an average molecular weight of 300 prepared from formaldehyde and phenol in a customary manner, 18.02 g of 4,4'-diaminodiphenyl ether and 15.68 g of lithium carbonate were dissolved in 400 ml. of N-methyl pyrrolidone. With stirring, 37.73 g of 4,4'-dichloro-3,3'-dinitrodiphenyl sulfone was added to the solution. The temperature was kept at 100° C., and the solution was further stirred, whereupon the polymer precipitated from the reaction system. About 10 hours later, the precipitate was added to a large excess of water, and finely divided by a blender to afford a reddish orange polymer. This polymer was insoluble in organic solvents. From this fact and the infrared absorption spectrum, this polymer was identified as a cross-linked polymer having the following recurring unit of water and acetone. The inherent viscosity of the polymer was 0.81.

The elemental analysis values of the resulting polymer were as follows:

Found: C 63.23%, H 4.05%, N 12.85%, S 6.74%.

The calculated values for polyamino imine resulting from the reduction of the nitro group of the original polymer were as follows:

Calculated: C 64.86%, H 4.50%, N 12.61%, S 7.21%. These calculated values substantially corresponded with the values as found.

A thin film prepared from an N,N-dimethyl acetamide solution of this polymer was analyzed for infrared absorption spectrum. It was found that an absorption considered to be ascribable to the nitro group bonded to the aromatic nucleus in the vicinity of 1560 cm$^{-1}$ disappeared completely, and absorptions ascribable to the amino group were observed in the vicinity of 3350

(a-23).

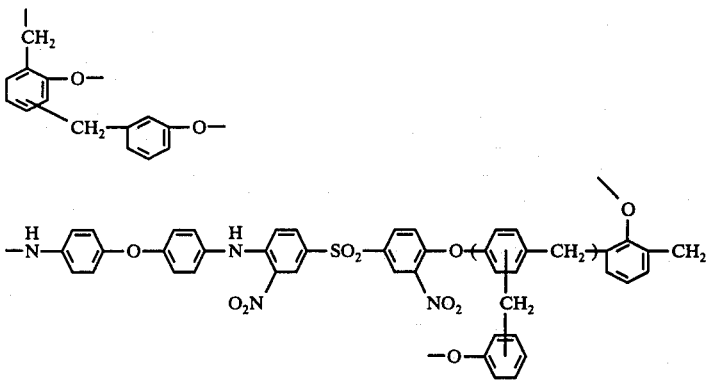

PART B (THE NITROGEN CONTAINING AROMATIC POLYMERS, THE PREPARATION OF THESE POLYMERS, AND THE PROPERTIES OF THE POLYMERS)

In the following Examples, the water flux ($l/m^2$/day) is a value for 1 micron thickness of the film unless otherwise specified.

EXAMPLE 1

10.0 g of the reddish brown flaky polymer (a) obtained by the method of Referential Example 1 was poured into a mixture of 300 ml. of methanol and 500 ml. of water. With stirring, the temperature was maintained at 75° to 80° C., and 150 g of anhydrous sodium hydrosulfite was poured into the mixture over the course of about 30 minutes. The mixture was stirred for another 2 hours at this temperature. The flaky polymer present in the heterogeneous state in the solution gradually turned from reddish brown to white yellow.

After this reducing procedure, the polymer was washed thoroughly with a large quantity of water, and dried at room temperature under reduced pressure.

The resulting white yellow polymer was soluble in amide-type solvents, dimethyl sulfoxide and a mixture cm$^{-1}$ and 3450 cm$^{-1}$.

From the results of the elemental analysis values and the infrared absorption spectrum, the polymer was identified as polyaminoimine having the following recurring unit

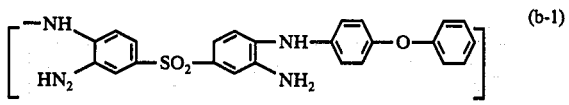

A thin film was prepared from this polymer, and heated on a hot plate to a temperature of 300° C. The shape of the film scarcely changed, and it showed good thermal stability. However, the colorless transparent film gradually began to turn purple at about 120° C., and became insoluble (gel) in organic solvents. Furthermore, this film had high water absorption of 13% at 100% RH.

The polymer was thermogravimetrically analyzed in an atmosphere of nitrogen by heating at a rate of 5° C./min. It was found that at 100° C., adsorbed water separated, and there was hardly any decrease in weight up to 400° C.

0.7 g of the resulting polymer (b-1) was dissolved in 9.3 g of N-methyl pyrrolidone at 60° C. to form a film-forming dope. The dope was cast on a well-polished glass plate using a doctor blade with a clearance of 120 microns, and dried at 130° C. for 30 minutes and at 150° C. for 1 hour. Then, the film was peeled off from the glass plate in water.

A part (larger than a membrane area required for a reverse osmosis test to be described hereinbelow) of the resulting film was placed in a pressurizable vessel together with a filter paper and a perforated plate to set them in the order of the film, the filter paper and the perforated plate. A 0.05% by weight aqueous solution of crystal violet having a molecular weight of 570 and assuming a deep blue color was poured into the space on the film side, and the vessel was placed under a pressure of 1.5 Kg/cm² for about 5 minutes. Then, the pressure was returned to normal atmospheric pressure, and the deep blue aqueous solution was removed from the vessel. The dye adhering to the surface of the film was washed with water, and the film and the filter paper were withdrawn from the vessel. The absence of pin-holes in the film was ascertained from the observation that there was no spot of deep blue on the filter paper.

The resulting film was mounted in a reverse osmosis test cell, and tested for its performance. The reverse osmosis test was conducted by using an experimental cell with an effective membrane area of 11 cm², and mounting the film, a porous base material (Millipore Filter VMWP 04700, a product of Millipore Company) and sintered metal (with a pore size of 3 microns) in this order in the cell. The operating conditions were: a 1.0% aqueous solution of sodium chloride; a pressure of 100 Kg/cm; a temperature of 30° C.; the rate of circulation of water being 100 l/hour. It was found that the water flux was 16.9 l/m²/day. The salt rejection determined by the measurement of electric conductivity was 98.1%. After continuous operation for a week, hardly any change was observed in the properties of the membrane.

EXAMPLE 2

A mixture consisting of 2.52 g of the polymer (a-1), 40 ml. of N-methyl pyrrolidone and 0.3 g of palladium oxide (PdO) was charged into a 100 ml. autoclave, and then hydrogen was introduced into the autoclave to a pressure of 40 Kg/cm². While stirring the solution, the polymer was reacted at 95° to 100° C. for about 80 hours. The catalyst was removed by means of a glass filter, and the reaction product was poured into a large quantity of water. A polymer having an inherent viscosity of 0.68 was obtained as white purple flakes. The polymer was soluble in amide-type solvents and dimethyl sulfoxide. A film prepared from an N-methyl pyrrolidone solution of the polymer showed an infrared absorption spectrum corresponding exactly with that of the polyaminoimine (b-1) obtained in Example 1.

EXAMPLE 3

5.04 g of the polymer (a-1) was dissolved in 100 ml. of N-methyl pyrrolidone. With stirring, 3.0 g of water and 21.0 g of anhydrous sodium hydrosulfite were added. While forming a suspension, the temperature was raised to 60° C. Two hours later, the reaction mixture was poured into a large quantity of water to recover a light red polymer.

The ultraviolet absorption spectrum of an N-methyl pyrrolidone solution each of the nitro-containing polymer (a-1), the polymer (b-1) obtained in Example 1, and the polymer obtained in this Example was measured. The polymer (a-1) had an absorption maximum at 415 nm and a molecular extinction coefficient of $1.18 \times 10^4$ l/mole.cm. On the other hand, the polymer (b-1) did not have an absorption maximum at a longer wavelength than 400 nm.

The content of the nitro group in the polymer obtained in this Example was measured from the absorbance at 415 nm and 500 nm in its ultraviolet spectrum, and found to be about 60%. Accordingly, this polymer was identified as having the following structural unit

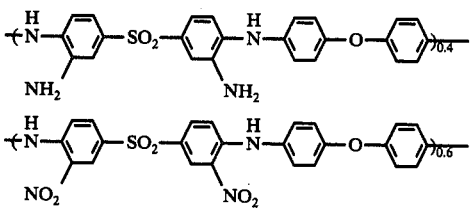

A thin film prepared from an N-methyl pyrrolidone solution of this polymer had an infrared absorption spectrum which showed that there was an absorption ascribable to the amino group in the vicinity of 1600 cm⁻¹ to 1640 cm⁻¹, and an absorption in the vicinity of 1560 cm⁻¹ considered to be ascribable to the nitro group was weaker than that in the polymer (a-1).

The polymer was again dissolved in 100 ml. of N-methyl pyrrolidone, and 3.0 g of water and 21.0 g of anhydrous sodium hydrosulfite were added. The mixture was stirred for 3 hours at 60° C., and the reaction mixture was added to a large quantity of water to afford a grayish white polymer.

In the ultraviolet absorption spectrum of an N-methyl pyrrolidone solution of this polymer, no absorption maximum was observed at 415 nm. Furthermore, in the infrared absorption spectrum of a film prepared from an N-methyl pyrrolidone solution of the polymer, the absorption at 1560 cm⁻¹ completely disappeared, and the absorption spectrum chart corresponded exactly with that of the polymer obtained in Example 1.

EXAMPLE 4

The nitro-containing polymers having the recurring units (a-2) to (a-23) obtained in Referential Examples 1 to 11 were reduced by any of the methods used in Examples 1 to 3 to form amino-containing polymers (b-2) to (b-23) shown in Table 4.

In the Table, the reducing method A is the method used in Example 1; the reducing method B, the method used in Example 2; and the reducing method C, the method of Example 3 by which the reduction was carried out completely.

Table 4

| Polymer No. | Structure of polymer | $\eta_{inh}$ | Reducing method |
|---|---|---|---|
| b-2 | ⁅NH–C₆H₃(NH₂)–NH–C₆H₄–O–C₆H₄⁆ | 0.20 | A |
| b-3 | ⁅NH–C₆H₃(NH₂)–C₆H₃(NH₂)–NH–C₆H₁₀–CH₂–C₆H₁₀⁆ (cis/trans mixture) | 0.35 | B |
| b-4 | ⁅NH–C₆H₃(NH₂)–SO₂–C₆H₃(NH₂)–N(CH₃)–C₆H₄⁆₀.₂ ⁅NH–C₆H₃(NH₂)–SO₂–C₆H₃(NH₂)–NH–C₆H₄–O–C₆H₄⁆₀.₈ | 0.36 | A |
| b-5 | ⁅NH–C₆H₃(NH₂)–SO₂–C₆H₃(NH₂)–NH–C₆H₄–O–C₆H₄⁆₀.₂ ⁅O–C₆H₃(NH₂)–SO₂–C₆H₃(NH₂)–O–C₆H₄–C(CH₃)₂–C₆H₄⁆₀.₈ | 0.61 | C |
| b-6 | ⁅O–C₆H₃(NH₂)–SO₂–C₆H₃(NH₂)–O–C₆H₄–SO₂–C₆H₄⁆ | 0.59 | C |
| b-7 | ⁅O–C₆H₃(NH₂)–SO₂–C₆H₃(NH₂)–O–C₆H₃(NH₂)–SO₂–C₆H₃(NH₂)⁆ | 0.42 | A |
| b-8 | ⁅NH–C₆H₃(NH₂)–CO–O–C₆H₄–C(CH₃)₂–C₆H₄–O–CO–C₆H₃(NH₂)–NH–C₆H₄–O–C₆H₄⁆ | 0.55 | B |
| b-9 | ⁅NH–C₆H₃(NH₂)–CO–NH–C₆H₄–O–C₆H₄–NH–CO–C₆H₃(NH₂)–NH–C₆H₄–O–C₆H₄⁆ | 0.35 | B |
| b-10 | ⁅NH–C₆H₃(NH₂)–CO–N(C₄H₈N)–CO–C₆H₃(NH₂)–NH–C₆H₄–O–C₆H₄⁆ | 0.40 | A |
| b-11 | ⁅NH–C₆H₃(NH₂)–SO₂–C₆H₃(NH₂)–O–C₆H₄⁆ | 0.42 | A |
| b-12 | ⁅NH–C₆H₃(NH₂)–CO–C₆H₄–O–C₆H₄–CO–C₆H₃(NH₂)–O–C₆H₄⁆ | 0.39 | B |
| b-13 | ⁅O–C₆H₃(NH₂)–SO₂–C₆H₃(NH₂)–O–C₆H₄–C(CH₃)₂–C₆H₄⁆₀.₁ ⁅O–C₆H₄–SO₂–C₆H₄–O–C₆H₄–C(CH₃)₂–C₆H₄⁆₀.₉ | 0.40 | A |
| b-14 | ⁅NH–C₆H₃(NH₂)–CO–NH–C₆H₄–O–C₆H₄⁆ | 0.43 | C |
| b-15 | ⁅NH–C₆H₃(NH₂)–SO₂–NH–C₆H₃(NH₂)–O–C₆H₄⁆ | 0.35 | C |
| b-16 | ⁅NH–C₆H₃(NH₂)–CO–NH–C₆H₄–O–C₆H₄⁆₀.₅ ⁅NH–C₆H₃(NH₂)–SO₂–C₆H₃(NH₂)–NH–C₆H₄–O–C₆H₄⁆₀.₅ | 0.45 | C |

Table 4-continued

| Polymer No. | Structure of polymer | $\eta_{inh}$ | Reducing method |
|---|---|---|---|
| b-17 | [structure] | 0.35 | A |
| b-18 | [structure] | 0.60 | A |
| b-19 | [structure] | 0.81 | A |
| b-20 | [structure] | 0.43 | C |
| b-21 | [structure] | 0.45 | A |
| b-22 | [structure] | 0.30 | A |
| b-23 | [structure] | — | A |

EXAMPLE 5

3.38 g of the polymer (b-1) and 1.35 g of calcium carbonate were dissolved in 50 ml. of N-methyl pyrrolidone, and with stirring, 1.90 g of ethyl chloroacetate was added. The mixture was stirred for another 6 hours at 100° C. The reaction mixture obtained was poured into a large excess of water to precipitate the resulting polymer which was then filtered and washed with water. In the infrared absorption spectrum of this polymer, an absorption ascribable to the methylene group was observed in the vicinity of 2900 cm$^{-1}$, and an absorption ascribable to the ester group, in the vicinity of 1740 cm$^{-1}$.

From these absorptions, it was confirmed that this polymer was polyether imine having —NHCH$_2$COOC$_2$H$_5$ as a pendant group.

3.80 g of this polymer was dissolved in 50 ml. of N-methyl pyrrolidone, and 1.16 g of phenyl isocyanate was added. The mixture was stirred for 2 hours at 120° C. The reaction mixture obtained was poured into a large quantity of water. The polymer precipitated was filtered, and dried to afford a light brown polymer. The infrared absorption spectrum of this polymer showed new absorptions ascribable to the hydantoin ring in the vicinity of 1760 cm$^{-1}$ and 1700 cm$^{-1}$.

From these absorptions, this polymer was identified as polyether imine partly having a pendant N-phenyl hydantoin ring.

The polymer was soluble in amide-type solvents such as N,N-dimethyl acetamide or N,N-dimethyl formamide, and had an inherent viscosity of 0.85.

EXAMPLE 6

4.42 g of the polymer (b-1) obtained in Example 1 and 1.70 g of sodium bicarbonate were dissolved in 40 ml. of N-methyl pyrrolidone. 2.60 g of benzyl chloride was added, and the mixture was stirred at 60° C. for 5 hours. After the reaction, the reaction mixture was poured into a large quantity of water, and the polymer was recovered. The polymer was washed thoroughly with water. The amount of the polymer finally recovered was 6.35 g. The inherent viscosity of the polymer was 0.89.

A thin tough film was prepared by casting an N-methyl pyrrolidone solution of the polymer on a glass plate. In the infrared absorption spectrum of this film, an absorption ascribable to the methylene group was observed in the vicinity of 2900 cm$^{-1}$. It was confirmed from this fact that this polymer is polyether imine containing —NHCH$_2$C$_6$H$_5$ as a pendant group.

EXAMPLE 7

3.62 g of the polymer (b-3) and 2.00 g of sodium bicarbonate were dissolved in 40 ml. of anhydrous N-methyl pyrrolidone. With vigorous stirring under cooling on an ice bath, 2.52 g of dimethyl sulfuric acid was added. The mixture was stirred for an additional 20 hours at room temperature. The reaction mixture obtained was added to a large excess of water. The polymer precipitated was filtered, washed thoroughly with water, and stirred together with an aqueous solution of sodium carbonate for 4 hours. The polymer was filtered, washed with water, and dried to obtain a final polymer product in an amount of 3.80 g.

This polymer was insoluble in water and methanol, but soluble in amide-type solvents such as N-methyl pyrrolidone and N,N-dimethyl acetamide. In the infrared absorption spectrum of this polymer, absorptions ascribable to the amino groups in the vicinity of 3400 cm$^{-1}$ and 1600 cm$^{-1}$ became very weak, and an absorption ascribable to the methyl group was observed in the vicinity of 2960 cm$^{-1}$. From this fact, it was judged that this polymer contains —N(CH$_3$)$_2$ as a pendant group.

EXAMPLE 8

2.00 g of the polymer (b-1) was dissolved in 20 ml. of N-methyl pyrrolidone, and 1.37 g of benzoyl chloride was added at room temperature. The reaction was continued for about 2 hours. After the reaction, the reaction mixture was poured into a large quantity of water to precipitate and separate the polymer. The resulting polymer was dissolved in N-methyl pyrrolidone, and a film was prepared from this solution. In the infrared absorption spectrum of this film, characteristic absorptions ascribable to the amide group were observed at 1660 cm$^{-1}$ and 1530 cm$^{-1}$.

The resulting polymer had an inherent viscosity of 0.79. It was soluble in aprotic polar organic solvents such as dimethyl sulfonide, or N,N-dimethyl acetamide. Tough films could be obtained from solutions of the polymer in such solvents.

A thermogravimetric analysis of this polymer showed that at a temperature raising rate of 5° C/min. in atmospheric air, the polymer scarcely decreased in weight, nor was it softened, up to a temperature of 500° C.

EXAMPLE 9

2.00 g of polymer (b-1) was dissolved in 20 ml. of N-methyl pyrrolidone, and with vigorous stirring at room temperature, 0.81 g of acetyl chloride was added. The stirring was continued for about 1 hour, and the reaction mixture was poured into a large excess of water to terminate the reaction. The resulting polymer had an inherent viscosity of 0.80, and was soluble in various aprotic polar organic solvents such as those shown in Example 8.

In the infrared absorption spectrum of a film prepared by casting an N-methyl pyrrolidone solution of the polymer and drying it, absorptions based on the amide group were observed at 1660 cm$^{-1}$ and 1530 cm$^{-1}$. It was confirmed that this polymer was an acetamide derivative containing —NHCOCH$_3$.

In the NMR spectrum of a deuterium-substituted dimethyl sulfoxide solution of the polymer, an absorption of the methyl proton was observed at 2.40 ppm, and its integral value corresponded with the calculated value.

A thermogravimetric analysis of this polymer showed that at a temperature raising rate of 5° C./min. in atmospheric air, there was hardly any decrease in weight, nor was it softened, up to a temperature of 350° C.

A 6.1 micron-thick film was prepared in the same way as in Example 1, and the reverse osmosis test was conducted. The water flux was 13.1 l/m$^2$/day, and the salt rejection was 99.4%.

EXAMPLE 10

1.50 g of the polymer (b-1) was dissolved in 15 ml. of N-methyl pyrrolidone, and with vigorous stirring at room temperature, 0.69 g of acetic anhydride was added. The stirring was continued for 2 hours at room temperature. The reaction mixture was poured into a large quantity of water to precipitate a polymer.

The infrared absorption spectrum of a film prepared from an N-methyl pyrrolidone solution of the resulting polymer corresponded exactly with that of the film obtained in Example 9.

The resulting polymer had an inherent viscosity of 0.78, and exhibited the same solubility as the polymer obtained in Example 9.

EXAMPLE 11

2.76 g of the polymer (b-2) was dissolved in 30 ml. of N-methyl pyrrolidone. With stirring, 4.60 g of 2,4-dinitrophenylacetate was added. While setting the reaction temperature at 60° C., the mixture was stirred for 5 hours. The reaction mixture obtained was poured into a large quantity of methanol to recover the polymer. In the infrared absorption spectrum of this polymer, absorptions based on the amide group were observed at 1660 cm$^{-1}$ and 1530 cm$^{-1}$. The polymer had an inherent viscosity of 0.23, and was soluble in aprotic polar solvents such as N-methyl pyrrolidone, N,N-dimethyl acetamide, tetramethyleneurea, or dimethyl sulfoxide.

EXAMPLE 12

2.47 g of the polymer (b-6) was dissolved in 30 ml. of N-methyl pyrrolidone, and at room temperature, 1.50 g of benzoyl chloride was added. The stirring was continued for about 2 hours, and the reaction mixture was poured into a large quantity of water to precipitate and separate the polymer. In the infrared absorption spectrum of a film obtained by casting an N-methyl pyrrolidone solution of the resulting polymer, characteristic absorptions based on the amide group were observed at 1670 cm$^{-1}$ and 1530 cm$^{-1}$.

The resulting polymer had an inherent viscosity of 0.60, and was soluble in aprotic polar organic solvents such as dimethyl sulfoxide or N,N-dimethyl acetamide. Tough films could be obtained by casting and drying solutions of the polymer in such solvents.

A thermogravimetric analysis of this polymer showed that at a temperature raising rate of 5° C/min. in an atmosphere of nitrogen, there was hardly any decrease in weight, nor was it softened, up to a temperature of 400° C.

EXAMPLE 13

3.00 g of the polymer (b-1) was dissolved in 30 ml. of N-methyl pyrrolidone, and with vigorous stirring at room temperature, 2.13 g of methanesulfonyl chloride was added. The stirring was continued at room temperature for 4 hours. The reaction mixture was poured into a large quantity of water to precipitate the polymer.

In the infrared absorption spectrum of a film prepared from an N-methyl pyrrolidone solution of the polymer, a characteristic absorption band of sulfonamide was observed at 1130 cm$^{-1}$. The polymer had an inherent viscosity of 0.98, and was soluble in aprotic polar organic solvents such as N,N-dimethyl acetamide or dimethyl sulfoxide.

A thermogravimetric analysis of this polymer showed that at a temperature raising rate of 5° C./min. in atmospheric air, there was hardly any decrease in weight up to a temperature of 500° C.

A 3.1 micron thick film was prepared in the same way as in Example 1, and subjected to the reverse osmosis test. The water flux was 383 lm$^2$/day, and the salt rejection was 98.3%.

COMPARATIVE EXAMPLE 0.5 part of cellulose acetate having a degree of polymerization of 170 and a degree of acetylation of 40 was dissolved in acetone, and dried at room temperature for 5 minutes and at 70° C. for 1 hour to form a film having a thickness of 3.3 microns.

The reverse osmosis test was conducted using this film in the same way as in Example 1. The water flux was 87.1 l/m$^2$/day, and the salt rejection was 99.7%.

A comparison of the results with those of Example 13 showed that the film of the methanesulfonamide derivative shown in Example 13 was several times as good as the cellulose acetate film in water flux.

EXAMPLE 14

2.00 g of the polymer (b-1) was dissolved in 20 ml. of N-methyl pyrrolidone, and at room temperature, 1.76 g of benzenesulfonyl chloride was added. The stirring was continued for about 4 hours. After the reaction, the reaction mixture was poured into a large quantity of water to recover the polymer. In the infrared absorption spectrum of the polymer, characteristic absorptions ascribable to sulfonamide were observed at 1130 cm$^{-1}$. From this, it was confirmed that this polymer contains

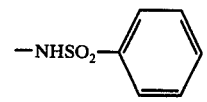

as a pendant group.

A thermogravimetric analysis of this polymer showed that at a temperature raising rate of 5° C/min. in atmospheric air, there was hardly any decrease in weight up to a temperature of 300° C.

A 6.5 micron thick film was prepared in the same way as in Example 1, and subjected to the reverse osmosis test. The water flux was 87.1 l/m$^2$/day, and the salt rejection was 99.7%. Thus, the film was found to have much the same properties as the cellulose acetate film.

EXAMPLE 15

1.50 g of the polymer (b-5) was dissolved in 20 ml. of N-methyl pyrrolidone, and with stirring, 1.88 g of benzenesulfonyl chloride was added at room temperature. The reaction was continued for 4 hours at room temperature, and the reaction mixture was poured into a large quantity of water to precipitate the polymer.

The polymer had an inherent viscosity of 0.80, and exhibited the same solubility as the polymer in Example 14. From the infrared absorption spectrum of this product, it was identified as a polymer having the group

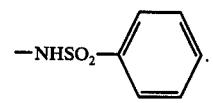

A thermogravimetric analysis of this polymer showed that there was hardly any decrease in weight up to a temperature of 300° C. in atmospheric air.

A 8.5 micron thick film was prepared from an N-methyl pyrrolidone solution of the resulting polymer, and subjected to the same reverse osmosis test as in Example 1. The water flux was 10.3 l/m$^2$/day, and the salt rejection was 99.8%.

EXAMPLE 16

4.50 g of the polymer (b-17) and 0.53 g of sodium carbonate were dissolved in 40 ml. of N-methyl pyrrolidone, and with stirring on an ice bath, 1.50 g of benzenesulfonic anhydride was added. At room temperature, the mixture was stirred for 4 hours. After the reaction, the reaction mixture was poured into a large quantity of water to recover the polymer. The polymer had an inherent viscosity of 0.41. In its infrared absorption spectrum, there was hardly any absorption ascribable to the amino group, but characteristic absorptions ascribable to the sulfonamide group were observed in the vicinity of 1130 cm$^{-1}$. Hence, this polymer was identified as having a structure which contains a benzenesulfonamide pendant group in the main chain of the polyether sulfone.

EXAMPLE 17

3.00 g of the polymer (b-1) was dissolved in 30 ml. of N-methyl pyrrolidone, and with vigorous stirring, 2.69 g of phenyl chloroformate was added to the solution at room temperature. The stirring was continued for about 1.5 hours at room temperature, and the reaction mixture was poured into a large quantity of water to precipitate the polymer. The resulting polymer had an inherent viscosity of 0.72. In the infrared absorption spectrum of a film prepared by casting and drying an N-methyl pyrrolidone solution of the polymer, characteristic absorptions of the urethane group were observed at 1720 cm$^{-1}$ and 1610 cm$^{-1}$. It was confirmed that this polymer is a urethane derivative having the group

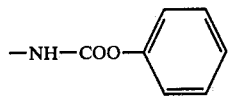

as a pendant group.

The polymer was soluble in aprotic polar organic solvents such as those shown in Example 13, and tough films could be obtained by casting from solutions of the polymers in such solvents.

A thermogravimetric analysis of this polymer showed that at a temperature raising rate of 5° C./min. in atmospheric air, a weight decrease owing probably to elimination of phenol was observed at a temperature in the vicinity of 200° C., and thereafter, no weight decrease was observed up to a temperature of 500° C.

A 3.2 micron thick film was prepared in the same way as in Example 1, and subjected to the reverse osmosis test. The water flux was 73.2 l/m$^2$/day, and the salt rejection was 99.95%. This shows that the polymer obtained in this Example has superior properties for membrane separation.

EXAMPLE 18

2.56g of the polymer (b-12) was dissolved in 25 ml. of N-methyl pyrrolidone, and with vigorous stirring at room temperature, 1.10 g of ethyl chloroformate was added at room temperature. The stirring was continued for 2 hours at room temperature. The reaction mixture was added to a large quantity of methanol to form a polymer. The polymer had an inherent viscosity of 0.51, and was soluble in aprotic polar organic solvents such as those described in Example 13. A characteristic absorption of the urethane group was observed in the infrared absorption spectrum of a film prepared by casting and drying an N-methyl pyrrolidone solution of the polymer.

A 6.5 micron thick film was prepared in the same way as in Example 1, and subjected to the reverse osmosis test. The water flux was 14.3 l/m$^2$/day, and the salt rejection was 98.5%.

EXAMPLE 19

4.85g of the polymer (b-13) was dissolved in 50 ml. of N-methyl pyrrolidone. With vigorous stirring, 0.61 g of 4,4'-dinitrodiphenyl carbonate was added. The stirring was continued for 5 hours at 60° C. Then, a small amount of the insoluble part was separated by filtration, and the reaction mixture was added to a large quantity of methanol to recover the polymer. The polymer was soluble in aprotic polar organic solvents such as those shown in Example 13. In the infrared absorption spectrum of a thin film prepared by casting and drying an N-methyl pyrrolidone solution of the polymer, a characteristic absorption band of the urethane group was observed at 1720 cm$^{-1}$ and 1610 cm$^{-1}$.

When this film was baked at 200° C. for 1 hour and at 300° C. for 30 minutes, a tough film could be obtained.

EXAMPLE 20

2.00 g of the polymer (b-1) was dissolved in 20 ml. of N-methyl pyrrolidone, and at room temperature 1.20 g of phenyl isocyanate was added. The stirring was continued for about 2 hours, and then the reaction mixture was added to a large quantity of methanol to form a polymer.

The polymer had an inherent viscosity of 0.74, and an infrared absorption spectrum of a film prepared by casting and drying a solution of the polymer in N-methyl pyrrolidone showed a characteristic urea absorption at 1640 cm$^{-1}$ and 1530 cm$^{-1}$. It was confirmed that the polymer was a urea derivative having

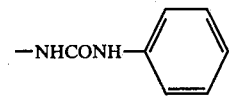

as a pendant group.

The resulting urea-containing polymer was soluble in aprotic polar organic solvents such as N-methyl pyrrolidone, dimethyl sulfoxide and N,N-dimethyl acetamide.

In the same way as in Example 1, a 6.3 micron thick film was prepared from the polymer, and subjected to the reverse osmosis test. The water reflux was 16.5 l/m$^2$/day, and the salt rejection was 99.0%.

EXAMPLE 21

3.17 g of the polymer (b-14) was dissolved in 30 ml. of N-methyl pyrrolidone, and 1.20 g of phenyl isocyanate was used. Otherwise, the reaction was carried out in the same way as in Example 20 to afford a urea derivative having

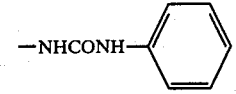

as a pendant group.

The polymer had an inherent viscosity of 0.50, and had the same solubility as the polymer obtained in Example 20.

A tough film was obtained by casting and drying a solution of the polymer in N-methyl pyrrolidone.

EXAMPLE 22

3.00 g of the polymer (b-1) was dissolved in 25 ml. of N-methyl pyrrolidone, and a solution of 2.91 g of trimellitic anhydride in 5 ml. of N-methyl pyrrolidone was added to the solution at room temperature. The reaction solution was heated to 100° C. while being stirred over an oil bath. After heating for about 2 hours, the reaction mixture was poured into a large quantity of methanol to afford an imide-containing polymer.

The polymer had an inherent viscosity of 0.79. In the infrared absorption spectrum of a film prepared by casting and drying a solution of the polymer in N-methyl pyrrolidone, an absorption based on the imide group was observed at 1780 cm$^{-1}$. It was confirmed that this polymer is a polymer having

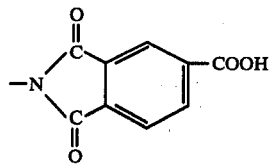

as a pendant group.

A thermogravimetric analysis of the polymer showed that at a temperature raising rate of 5° C./min. in atmospheric air, there was hardly any decrease in weight up to a temperature of 400° C.

When a film prepared from an N-methyl pyrrolidone solution of the polymer was heated at 300° C. for 30 minutes, a tough film insoluble in the solvent was obtained.

EXAMPLE 23

3.00 g of the polymer (b-1) was dissolved in 20 ml. of N-methyl pyrrolidone, and a solution of 2.12 g of phthalic anhydride in 10 ml. of N-methyl pyrrolidone was added to the resulting solution at 60° C. The reaction mixture was stirred for 2 hours while heating at 120° C. over an oil bath.

After the reaction, the reaction mixture was poured into a large quantity of methanol to afford an imide-containing polymer. The polymer had an inherent viscosity of 0.75. In the infrared absorption spectrum of a film prepared by casting and drying an N-methyl pyrrolidone solution of the polymer, a characteristic absorption of the carbonyl of the imide group was observed at 1780 cm$^{-1}$.

EXAMPLE 24

3.86 g of the polymer (b-18) was dissolved in 40 ml. of N-methyl pyrrolidone, and 1.45 g of phthalic anhydride was used. Otherwise, the reaction was carried out in the same way as in Example 23, and the resulting polymer was recovered. In the infrared absorption spectrum of the polymer, a characteristic absorption ascribable to the imide group was observed at 1780 cm$^{-1}$. The polymer had an inherent viscosity of 0.72. A tough film could be obtained by casting and drying a solution of the polymer in N-methyl pyrrolidone.

EXAMPLE 25

2.50 g of the polymer (b-1) was dissolved in N-methyl pyrrolidone, and 0.11 g of stabilized isocyanate prepared by reacting 4,4'-diphenylmethane diisocyanate with phenol was added. The mixture was stirred at room temperature. The resulting solution was cast on a thin glass plate, and baked at 200° C. for 1 hour and at 300° C. for 30 minutes. A very tough film was obtained. The film was no longer soluble in aprotic polar organic solvents such as N-methyl pyrrolidone and also in sulfuric acid, and was thus identified as a crosslinked polymer containing a urea linkage.

A thermogravimetric analysis of the film showed that at a temperature raising rate of 10° C./min. in atmospheric air, there was no decrease in weight up to a temperature of 400° C.

EXAMPLE 26

2.50 g of the polymer (b-1) was dissolved in 25 ml. of N-methyl pyrrolidone, and 0.30 g of diphenyl terephthalate was added to the solution. The mixture was stirred at room temperature. The resulting solution was cast on a glass plate, and baked at 250° C. for 1 hour and 300° C. for 30 minutes to afford a tough film. The film was no longer soluble in aprotic polar organic solvents such as N-methyl pyrrolidone or dimethyl sulfoxide and also in sulfuric acid. In the infrared absorption spectrum of this film, absorptions ascribable to the amide group were observed at 1650 cm$^{-1}$ and 1530 cm$^{-1}$. It was confirmed from this fact that this film is a polymer cross-linked by the amide group.

A thermogravimetric analysis of this film showed that at a temperature raising rate of 10° C./min. in atmospheric air, there was hardly any decrease in weight up to a temperature of 450° C.

EXAMPLE 27

2.50 g of the polymer (b-1) was dissolved in 25 ml. of N-methyl pyrrolidone, and 0.32 g of benzophenonetetracarboxylic anhydride was added to the solution. The mixture was stirred at room temperature. The resulting solution was cast on a glass plate, and baked at 200° C. for 30 minutes and 300° C. for 5 minutes to afford a tough film. In the infrared absorption spectrum of this film, a characteristic absorption of the imide group was observed at 1780 cm$^{-1}$. The film was insoluble in solvent as in the case of Example 26. This fact indicates that the film is a polymer crosslinked by the imide group.

EXAMPLE 28

In the same way as in Example 27, a 10% N-methyl pyrrolidone solution of the polymer (b-1) was prepared, and 0.24 g of maleic anhydride was added to it. The mixture was stirred at room temperature, and then cast on a glass plate. The casting was baked at 150° C. for 1 hour and at 250° C. for 30 minutes to afford a thin tough film. In the infrared absorption spectrum of this film, an absorption ascribable to the maleimide group was observed at 1730 cm$^{-1}$, and a characteristic absorption of the methylene group, in the vicinity of 2930 cm$^{-1}$. This film was no longer soluble in solvents as in Example 26.

It was confirmed from this fact that this film is a polymer crosslinked by the imide group, and as a result of an addition reaction of amine with the ethylenic double bond.

EXAMPLE 29

2.76 g of the polymer (b-2) and 0.20 g of calcium carbonate were added to 30 ml. of N-methyl pyrrolidone. The mixture was stirred for about 1 hour on an ice bath, but the calcium carbonate did not dissolve completely. To the mixture was added 0.25 g of p-chlorosulfonylbenzoyl chloride. The mixture was stirred for about 30 minutes under ice cooling, and at room temperature for 15 minutes. The reaction mixture was filtered by a filter, and cast on a glass plate using a doctor blade with a clearance of 120 microns. The cast solution was heated at 130° C. for 30 minutes, and then at 150° C. for 1 hour. Then, the glass plate was placed in water, and the film was separated.

The film was subjected to the same reverse osmosis test as in Example 1. The water flux was 60 liters/m$^2$/day, and the salt rejection was 98.7%.

The film was no longer soluble in aprotic polar organic solvents, and thus it was confirmed that the film was cross-linked.

Only a brittle film was prepared from an N-methyl pyrrolidone solution of the polymer (b-2), but by this crosslinking, a very tough film was obtained.

EXAMPLE 30

0.31 g of the polymer (b-20) was dissolved in 5 ml. of N-methyl pyrrolidone, and 0.11 g of 4-chloroformylphthalic anhydride was added to this solution with stirring under ice cooling. The mixture was stirred at room temperature for 1 hour. The resulting solution was cast on a glass plate, and baked at 150° C. for 1 hour and then at 250° C. for 30 minutes to afford a thin tough film.

In the infrared absorption spectrum of this film, an absorption ascribable to the imide group was observed in the vicinity of 1780 cm$^{-1}$, and absorptions ascribable to the amide group, at 1650 cm$^{-1}$ and 1530 cm$^{-1}$. The film was no longer soluble in aprotic polar organic solvents such as N-methyl pyrrolidone, and was identified as a polymer crosslinked by the amide and imide groups.

A thermogravimetric analysis of the film showed that at a temperature raising rate of 5° C./min. in atmospheric air, there was hardly any decrease in weight up to a temperature of 450° C.

EXAMPLE 31

A 10% N-methyl pyrrolidone solution of the polymer (b-1) was cast on a glass plate, and dried at 90° C. for 30 minutes to afford a film having a thickness of 3.4 microns. The film was immersed in a solution of 0.07 g of terephthaloyl chloride in 20 ml. of dry methylene chloride, and the solution was stirred at room temperature for 1 hour. After the reaction, the film was washed with methanol, and dried. In the infrared absorption spectrum of the film, a characteristic absorption ascribable to the amide group was observed at 1650 cm$^{-1}$ and 1530 cm$^{-1}$. The film was no longer soluble in N-methyl pyrrolidone, and it was confirmed that this is a cross-linked polymer having the terephthalamide skeleton.

EXAMPLE 32

The film obtained in Example 31 was immersed in a solution of 0.03 g of 4,4'-diphenylmethane diisocyanate in 20 ml. of dry xylene. It was allowed to stand at room temperature for 4 hours. After the reaction, the film was well washed with methanol, and dried. In the infrared absorption spectrum of this film, an absorption ascribable to the urea group was observed in the vicinity of 1720 cm$^{-1}$. The film was no longer soluble in N-methyl pyrrolidone, and it was confirmed that it is a polymer crosslinked by the urea linkage.

EXAMPLE 33

A 10% N-methyl pyrrolidone solution of the polymer (b-8) was cast on a glass plate, and dried at 90° C. for 30 minutes to afford a film having a thickness of 5 microns. The film was immersed in 20 ml. of dry xylene. To the solution was added 0.09 g of bisphenol A bisglycidyl ether. The solution was allowed to stand at room temperature for 1 hour, and then heated at 80° C. for 1 hour. After the reaction, the film was washed well with methanol, and dried. The film so treated was no longer soluble in N-methyl pyrrolidone. In the infrared absorption spectrum of this film, an absorption ascribable to —OH was observed. From this, it was confirmed that the film was a polymer crosslinked by the ring-opening addition of a glycidyl group.

EXAMPLE 34

2.11 g of the polymer (b-1) and 0.37 g of 4,4'-(N,N'-bismaleimide) diphenylmethane were dissolved in 10 ml. of N-methyl pyrrolidone. The solution was cast on a glass plate, and then heated at 100° C. for 15 minutes, and then at 240° C. for 50 minutes to afford a tough thin film.

In the infrared absorption spectrum of this film, a characteristic absorption of bismaleimide in the vicinity of the absorption ascribable to the amino group in the vicinity of 1600 cm$^{-1}$ was reduced. The film so obtained was no longer soluble in N-methyl pyrrolidone. It was confirmed that this film was a crosslinked polymer in which an amino group adds to the double bond of bismaleimide.

A thermogravimetric analysis of the film showed that at a temperature raising rate of 5° C./min. in atmospheric air, there was no decrease in weight up to a temperature of 350° C.

EXAMPLE 35

0.57 g of the polymer (b-6) was suspended in a mixture of 10 ml. of water and 0.7 ml. of conc. hydrochloric acid. The suspension was cooled to 0° C., and with stirring, an aqueous solution of 0.24 g of sodium nitrite in 3 ml. of water was added portionwise. The suspended polymer was initially light yellow, but with the progress of the reaction, turned reddish brown. With cooling, the suspension was filtered to recover the polymer. In the infrared absorption spectrum of the polymer recovered, an absorption ascribable to the amino group in the vicinity of 1600 cm$^{-1}$ was considerably weak, and an absorption ascribable to the diazonium salt was observed in the vicinity of 2270 cm$^{-1}$.

The polymer was dissolved in N-methyl pyrrolidone. The solution was cast on a glass plate, and heated at 120° C. for 20 minutes. There was obtained a cross-linked film insoluble in solvents.

What we claim is:

1. A substantially linear nitrogen-containing aromatic polymer comprising (1) 40 to 100 mol%, based on its entire recurring units, of at least one recurring unit of the formula (I)

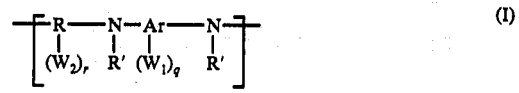

wherein

Ar is an aromatic group of 6 to 50 carbon atoms having a valence of (2 + q) with the two

groups being bonded respectively to the nuclear carbon atoms of the aromatic ring Ar and represented by the formula (II)

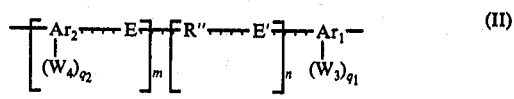

wherein

Ar₁ is an aromatic ring group containing 6 to 20 carbon atoms and having a valence of $(q_1 + 2)$ or $(q_1 + 3)$;

Ar₂ is an aromatic ring group containing 6 to 20 carbon atoms and having a valence of $(q_2 + 2)$ or $(q_2 + 3)$;

$W_3$ and $W_4$ are identical or different and have the same definition as $W_1$ given below;

$q_1$ is an integer of 0 to 4;

$q_2$ is an integer of 0 to 4;

with the proviso that an average of $(q_1 + q_2 + r)$ is at least 0.2;

m and n are 0 or 1, and when m is 0, n is also 0; the symbol . . . represents the presence or absence of a bond;

E and E' are identical or different and each represent at least one non-aromatic bridging group selected from the group consisting of

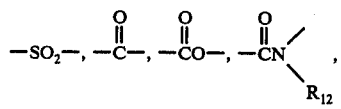

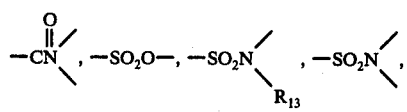

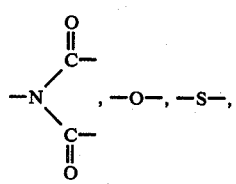

and alkylene groups containing 1 to 6 carbon atoms, $R_{12}$ and $R_{13}$ being identical or different and each representing a hydrogen atoms or an organic group containing 1 to 6 carbon atoms; and R'' represents alkylene of 2 to 15 carbon atoms or a member selected from the group consisting of

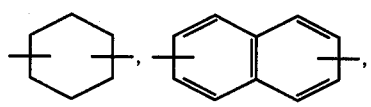

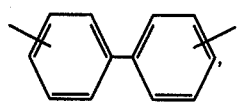

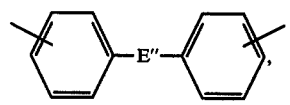

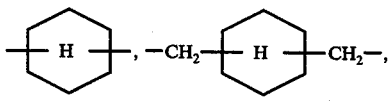

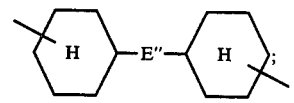

wherein

E'' is a non-aromatic bridging group having the same definition as E above;

$W_1$ and $W_2$ are identical or different and represent at least one group selected from the group consisting of

 (a)

 (b)

 (c)

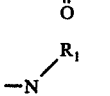 (d)

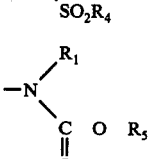 (e)

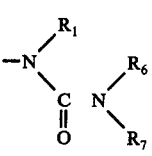 (f)

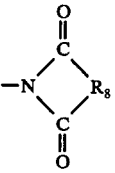 (g)

wherein $R_1$, $R_3$, $R_6$ and $R_7$ are identical or different and represent a hydrogen atom or an organic group containing 1 to 20 carbon atoms which in principle has a valence of 1;

$R_2$ and $R_5$ represent an organic group containing 1 to 20 carbon atoms which in principle has a valence of 1;

$R_4$ represents a hydroxyl group or an organic group containing 1 to 20 carbon atoms which in principle has a valence of 1;

$R_8$ is a divalent organic group containing 1 to 20 carbon atoms; and $R_1$ and $R_2$, $R_1$ and $R_3$, $R_1$ and $R_4$, $R_1$ and $R_5$, $R_1$ and $R_6$, $R_6$ and $R_7$, respectively, can be bonded to each other directly or through a hetero atom;

q is an integer of 0 to 4;

r is an integer of 0 to 4, with the proviso that an average of $(q + r)$ is at least 0.2;

R' is a hydrogen atom or monovalent or divalent hydrocarbon residue of 1 to 20 carbon atoms, and when R' is divalent, it is optionally bonded to R, or R' of one of the

linked to R' of the other

and

R is an organic group of 2 to 50 carbon atoms having a valence of (2 + r), (3 + r) or (4 + r) according to the definition of R'; and (2) 0 to 60 mol% of the remaining recurring units being a recurring unit of the formula (III)

$$\{R'''-Q_1-B-Q_2\}$$ (III)

wherein

B and R''' are identical or different and each represents the group (R) which is an organic group of 2 to 50 carbon atoms having a valence of (2 + r'), (3 + r') or (4 + r'), wherein r' is an integer of 0 to 4, according to the definition of R', the group (R) being identical or different from R; and $Q_1$ and $Q_2$ are identical or different and are each selected from the group consisting of

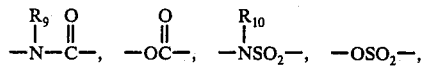

in which $R_9$, $R_{10}$ and $R_{11}$ are identical or different, and each represents a hydrogen atom, a monovalent or divalent hydrocarbon residue or a mere bond, and when these groups represent a divalent hydrocarbon residue or a bond, they can be bonded to R''' or B, or can be directly bonded to each other, and any of the above members may include an inert substituent.

2. The substantially linear nitrogen-containing aromatic polymer of claim 1 wherein R' is a hydrogen atom or an aliphatic hydrocarbon group containing 1 to 6 carbon atoms.

3. A shaped article formed from the polymer of claim 1.

4. A permselective membrane formed from the polymer of claim 1.

5. The substantially linear primary amino-containing polymer of claim 1 wherein R is selected from the group consisting of

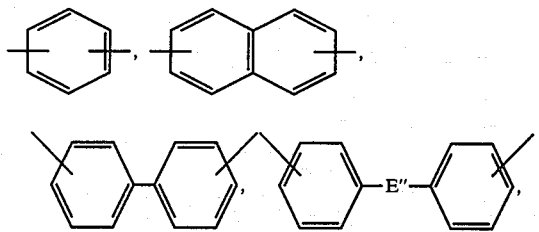

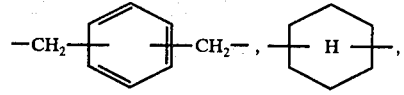

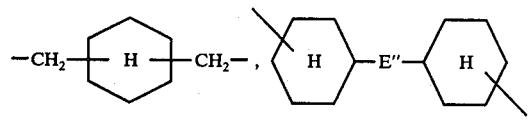

and alkylene groups containing 2 to 15 carbon atoms, in which E'' is a non-aromatic bridging group selected from the group consisting of

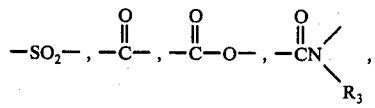

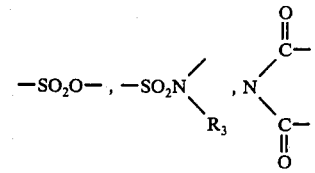

and alkylene groups of 1 to 6 carbon atoms, in which $R_3$ is hydrogen atom or alkyl of 1 to 6 carbon atoms.

6. The substantially linear primary amino-containing polymer of claim 5 in which Ar is an aromatic group of 6 to 45 carbon atoms selected from the group consisting of benzene, naphthalene, anthracene, biphenyl and terphenyl or a polynuclear aromatic ring group formed by bridging at least any two of the foregoing wholly conjugated aromatic groups, which may be the same or different, with a bridging group selected from the group consisting of

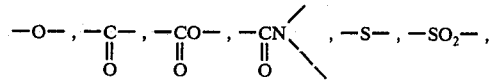

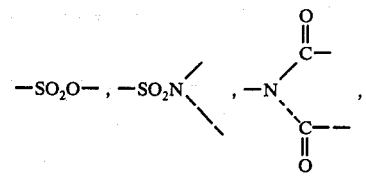

and alkylene groups of 1 to 6 carbon atoms, in which the symbol - - - represent a hydrogen atom or a bond.

7. The substantially linear primary amino-containing polymer of claim 5 wherein R is

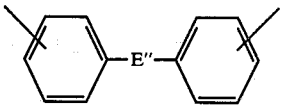

wherein E'' is as defined above.

8. The substantially linear aromatic primary amino-containing polymer of claim 7 wherein E'' is an oxygen atom.

9. The substantially linear primary amino-containing polymer of claim 8 in which Ar is an aromatic group of 6 to 45 carbon atoms selected from the group consisting of benzene, naphthalene, anthracene, biphenyl and terphenyl or a polynuclear aromatic ring group formed by bridging at least any two of the foregoing wholly conjugated aromatic groups, which may be the same or different, with a bridging group selected from the group consisting of

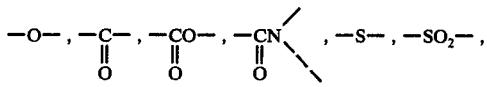

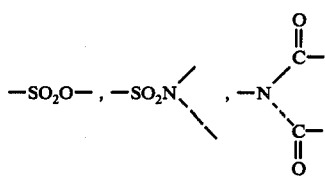

and alkylene groups of 1 to 6 carbon atoms, in which the symbol represent a hydrogen atom or a bond.

10. The substantially linear primary amino-containing polymer of claim 1 in which Ar is an aromatic group of 6 to 45 carbon atoms selected from the group consisting of benzene, naphthalene, anthracene, biphenyl, and terphenyl or a polynuclear aromatic ring group formed by bridging at least any two of the foregoing wholly conjugated aromatic groups, which may be the same or different, with a bridging group selected from the group consisting of

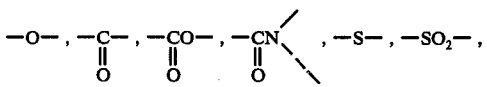

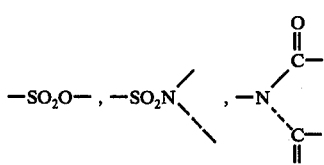

and alkylene groups of 1 to 6 carbon atoms, in which the symbol represent a hydrogen atom or a bond.

11. The substantiallyy linear primary amino-containing polymer of claim 10 in which Ar is said polynuclear aromatic ring group.

12. The substantially linear primary amino-containing polymer of claim 11 wherein said polynuclear aromatic ring group is formed by bridging two benzene groups with one of said bridging groups.

13. The substantially linear primary amino-containing polymer of claim 12 wherein said bridging group is —SO$_2$—.

14. The substantially linear primary amino-containing polymer of claim 13 in which R is selected from the group consisting of

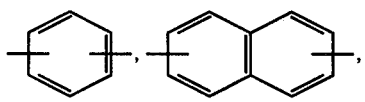

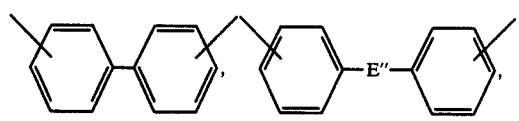

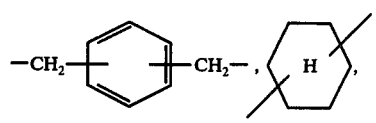

and alkylene groups containing 2 to 15 carbon atoms, in which E″ is a non aromatic bridging group selected from the group consisting of

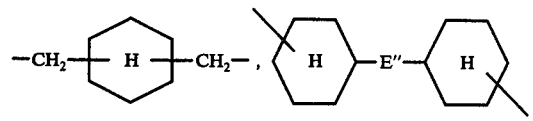

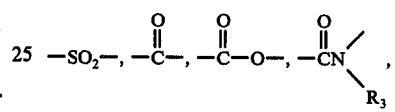

and alkylene groups of 1 to 6 carbon atoms, in which R$_3$ is hydrogen atom or alkyl of 1 to 6 carbon atoms.

15. A substantially linear primary amino containing aromtic polymer comprising (1) 40 to 100 mol%, based on its entire recurring units, of at least one recurring unit of the following formula

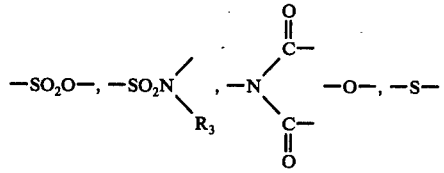

(b-1)

wherein
W$_1$ and W$_2$ are identical or different and represent at least one group selected from the group consisting of (a) —NH$_2$

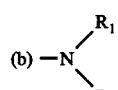

(b) 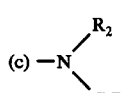

(c) 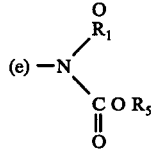

(d) 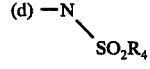

(e) 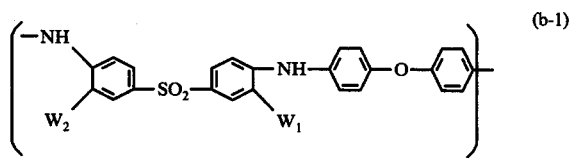

(f) 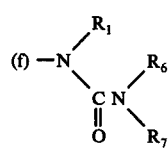

-continued

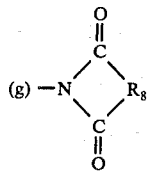

wherein
- $R_1$, $R_3$, $R_6$ and $R_7$ are identical or different and represent a hydrogen atom or an organic group containing 1 to 20 carbon atoms which in principle has a valence of 1;
- $R_2$ and $R_5$ represent an organic group containing 1 to 20 carbon atoms which in principle has a valence of 1;
- $R_4$ represents a hydroxyl group or an organic group containing 1 to 20 carbon atoms which in principle has a valence of 1;
- $R_8$ is a divalent organic group containing 1 to 20 carbon atoms; and
- $R_1$ and $R_2$, $R_1$ and $R_3$, $R_1$ and $R_4$, $R_1$ and $R_5$, $R_1$ and $R_6$, $R_6$ and $R_7$, respectively, can be bonded to each other directly or through a hetero atom.; and (2) 0 to 60 mol%, based on its entire recurring units, of at least one recurring unit of the formula (III)

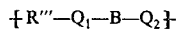   (III)

wherein
- B and R''' are identical or different and each represent the group (R) which is an organic group of 2 to 50 carbon atoms having a valence of (2 + r'), (3 + r') or (4 + r'), wherein
- r' is an integer of 0 to 4, according to the definition of R', the group (R) being identical to or different from R' and
- $Q_1$ and $Q_2$ are identical or different and are each selected from the group consisting of

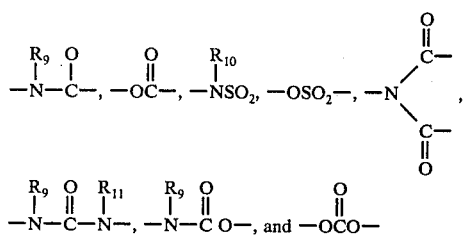

in which $R_9$, $R_{10}$ and $R_{11}$ are identical or different, and each represents a hydrogen atom, a monovalent or divalent hydrocarbon residue or a mere bond, and when these groups represent a divalent hydrocarbon residue or a bond, they can be bonded to R''' or B, or can be directly bonded to each other.

16. A process for preparing a substantially linear primary amino-containing aromatic polymer comprising at least 40 mol%, based on its entire recurring units, of a recurring unit of the formula (I)

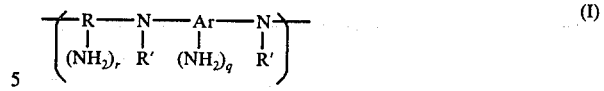   (I)

wherein Ar is an aromatic group of 6 to 50 carbon atoms having a valence of (2 + q) with the two

groups being bonded respectively to the nuclear carbon atoms of the aromatic ring Ar; q is an integer of 0 to 4; r is an integer of 0 to 4, with proviso that an average of (q + r) is at least 0.2; R' is a hydrogen atom or a monovalent or divalent hydrocarbon residue of 1 to 20 carbon atoms, and when R' is divalent, it is optionally bonded to R, or R' of one of the

linked to R' of the other

R is an organic group of 2 to 50 carbon atoms having a valence of (2 + r), (3 + r) or (4 + r) according to the definition of R'; which comprises reacting a substantially linear nitro-containing aromatic polymer comprising at least 40 mol%, based on its entire recurring units, of a recurring unit of the formula (V)

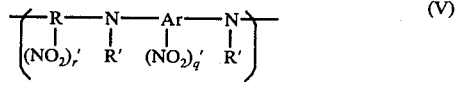   (V)

wherein R' is the same as defined above, Ar is an aromatic group of 6 to 50 carbon atoms having a valence of (2 + q') with the two

groups being bonded respectively to the nuclear carbon atoms of the aromatic ring Ar; q' is an integer of 0 to 4; r' is an integer of 0 to 4, with the proviso that an average of (q' + r') is at least 0.2, and R is an organic group of 2 to 50 carbon atoms having a valence of (2 + r'), (3 + r') or (4 + r'), according to the definition of R' under such conditions as to reduce the nitro group of the polymer having the recurring unit (V) at least partially.

17. The process of claim 16 wherein R' is hydrogen atom or an aliphatic hydrocarbon group containing 1 to 6 carbon atoms.

18. The process of claim 16 wherein the average of (q' + r') is at least 0.5.

19. The process of claim 16 wherein the substantially linear nitro-containing polymer comprising at least 40 mol%, based on its entire recurring units, of the recurring unit of formula (V) is reduced in the presence of an N,N-disubstituted amide-type solvent and water using sodium hydrosulfite as a reducing agent.

20. A substantially linear primary amino containing aromatic polymer comprising at least 40 mol%, based on its entire recurring units, of at least one recurring unit of formula (b-1)

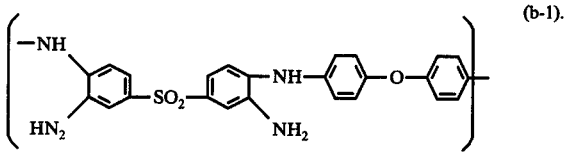

21. The substantially linear primary amino containing aromatic polymer of claim 20 wherein said polyymer further comprises recurring units of the formula (III)

wherein B and R''' are identical or different and each represents the group (R) which is an organic group of 2 to 50 carbon atoms having a valence of $(2 + r')$, $(3 + r')$ or $(4 + r')$, wherein $r'$ is an integer of 0 to 4, according to the definition of R', the group (R) being identical to or different from R' and $Q_1$ and $Q_2$ are identical or different and are each selected from the group consisting of

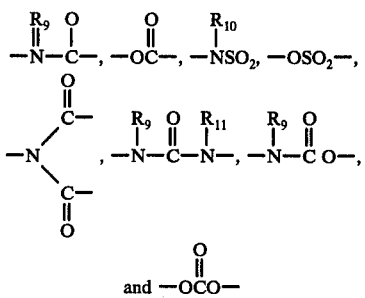

in which $R_9$, $R_{10}$ and $R_{11}$ are identical or different, and each represents a hydrogen atom, a monovalent or divalent hydrocarbon residue or a mere bond, and when these groups represent a divalent hydrocarbon residue or a bond, they can be bonded to R''' or B, or can be directly bonded to each other.

22. The substantially linear primary amino-containing aromatic polymer of claim 20 wherein said polymer further comprises at least one recurring unit selected from the groups consisting of

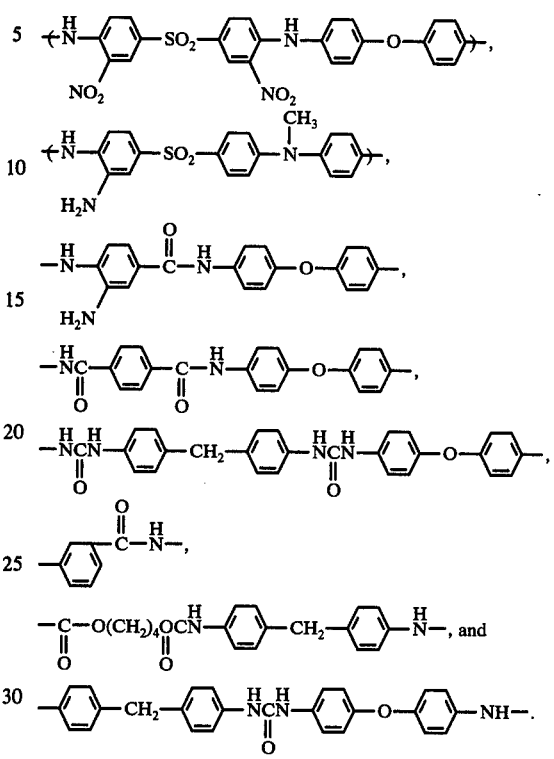

23. A process for preparing the substantially linear primary amino-containing aromatic polymer as defined in claim 20 which comprises at least partially reducing the nitro groups of a substantially linear nitro-containing aromatic polymer which contains at least 40 mol%, based on its entire recurring units, of a recurring unit of the formula (a-1)

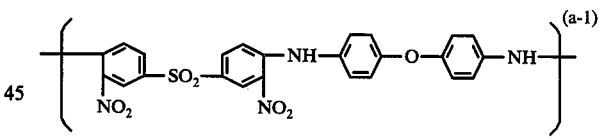

* * * * *

UNITED STATES PATENT AND TRADEMARK OFFICE
CERTIFICATE OF CORRECTION

PATENT NO. : 4,086,209
DATED : April 25, 1978
INVENTOR(S) : Shigeyoshi Hara, et al.

It is certified that error appears in the above-identified patent and that said Letters Patent are hereby corrected as shown below:

Claim 1, column 87, line 35, delete formula and insert--

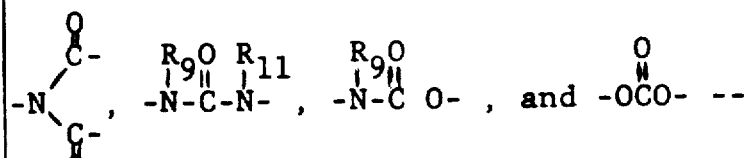

Claim 5, column 88, line 25, delete formula and insert--

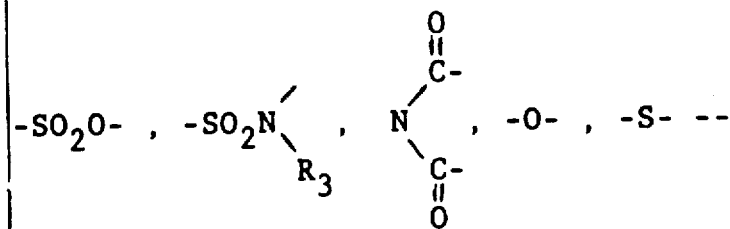

Signed and Sealed this

Twenty-eighth Day of November 1978

[SEAL]

Attest:

RUTH C. MASON
Attesting Officer

DONALD W. BANNER
Commissioner of Patents and Trademarks